(12) United States Patent
Kim et al.

(10) Patent No.: US 10,990,463 B2
(45) Date of Patent: Apr. 27, 2021

(54) SEMICONDUCTOR MEMORY MODULE AND MEMORY SYSTEM INCLUDING THE SAME

(71) Applicant: SAMSUNG ELECTRONICS CO., LTD., Suwon-si (KR)

(72) Inventors: Minsu Kim, Seongnam-si (KR); Jiseok Kang, Hwaseong-si (KR); Minsoo Kim, Suwon-si (KR); Byungjik Kim, Hwaseong-si (KR); Wonjae Shin, Seoul (KR); Donghoon Lee, Hwaseong-si (KR); Yeonhwa Lee, Seoul (KR); Ho-Young Lee, Osan-si (KR); Youjin Jang, Yongin-si (KR); Insu Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 16/218,720

(22) Filed: Dec. 13, 2018

(65) Prior Publication Data
US 2019/0303226 A1    Oct. 3, 2019

(30) Foreign Application Priority Data

Mar. 27, 2018    (KR) .................. 10-2018-0035270
Apr. 4, 2018     (KR) .................. 10-2018-0039206
(Continued)

(51) Int. Cl.
*G06F 11/07*    (2006.01)
*G06F 12/02*    (2006.01)
(Continued)

(52) U.S. Cl.
CPC ........ *G06F 11/073* (2013.01); *G06F 11/0793* (2013.01); *G06F 12/0246* (2013.01);
(Continued)

(58) Field of Classification Search
CPC .......................... G06F 11/073; G06F 11/0793
(Continued)

(56) References Cited

U.S. PATENT DOCUMENTS 6,085,248 A    7/2000 Sambamurthy et al.
6,336,174 B1   1/2002 Li et al.
(Continued)

FOREIGN PATENT DOCUMENTS

JP    2013-140546       7/2013
KR    10-2011-0116404   10/2011
KR    10-2017-0096277   8/2017

OTHER PUBLICATIONS

Office Action dated Jan. 16, 2020 in corresponding U.S. Appl. No. 16/205,357.
(Continued)

*Primary Examiner* — Chae M Ko
(74) *Attorney, Agent, or Firm* — F. Chau & Associates, LLC

(57) ABSTRACT

A semiconductor memory module may include a random access memory, a nonvolatile memory, a buffer memory, and a controller configured to execute a reading operation on the buffer memory in response to an activation of a control signal. The controller may be further configured to execute a flush operation of storing first data, which are stored in the random access memory, in the nonvolatile memory, according to a result of the reading operation.

19 Claims, 67 Drawing Sheets

(30) Foreign Application Priority Data

| Apr. 4, 2018 | (KR) | .................. | 10-2018-0039208 |
| Apr. 6, 2018 | (KR) | .................. | 10-2018-0040148 |
| Apr. 16, 2018 | (KR) | .................. | 10-2018-0043848 |

(51) Int. Cl.
*G06F 12/0804* (2016.01)
*G06F 11/14* (2006.01)

(52) U.S. Cl.
CPC ...... *G06F 12/0804* (2013.01); *G06F 11/1441* (2013.01); *G06F 2212/7201* (2013.01)

(58) Field of Classification Search
USPC ........................................... 714/6.1, 6.11, 42
See application file for complete search history.

(56) References Cited

U.S. PATENT DOCUMENTS

| 6,378,059 | B1 | 4/2002 | Miyoshi |
| 6,633,936 | B1 | 10/2003 | Keller et al. |
| 6,779,065 | B2 | 8/2004 | Murty et al. |
| 7,447,943 | B2 | 11/2008 | Vu et al. |
| 8,365,015 | B1 | 1/2013 | Yu et al. |
| 8,375,191 | B2 | 2/2013 | Kim |
| 8,589,763 | B2 | 11/2013 | Fukuda |
| 8,626,997 | B2 | 1/2014 | Qawami et al. |
| 8,856,503 | B2 | 10/2014 | Shim |
| 9,176,808 | B2 | 11/2015 | Shim et al. |
| 9,552,175 | B2 | 1/2017 | Takefman et al. |
| 9,727,462 | B2 | 8/2017 | Nguyen et al. |
| 9,753,793 | B2 | 9/2017 | Kumar et al. |
| 9,779,016 | B1 | 10/2017 | Shen et al. |
| 9,836,404 | B2 | 12/2017 | Ummadi et al. |
| 9,852,060 | B2 | 12/2017 | Berke et al. |
| 2005/0141535 | A1* | 6/2005 | Kuo ..................... H04L 1/0072 370/412 |
| 2007/0055843 | A1 | 3/2007 | Lameter |
| 2007/0186040 | A1 | 8/2007 | Kasahara et al. |
| 2007/0271495 | A1 | 11/2007 | Shaeffer et al. |
| 2010/0293337 | A1* | 11/2010 | Murphy .............. G06F 12/0897 711/136 |
| 2012/0230122 | A1 | 9/2012 | Chandra et al. |
| 2013/0036261 | A1 | 2/2013 | Kim et al. |
| 2013/0080858 | A1 | 3/2013 | Lee et al. |
| 2014/0056068 | A1 | 2/2014 | Strasser et al. |
| 2014/0223226 | A1 | 8/2014 | Yigzaw et al. |
| 2014/0337589 | A1 | 11/2014 | Carpenter et al. |
| 2015/0186278 | A1 | 7/2015 | Jayakumar et al. |
| 2016/0103613 | A1* | 4/2016 | Oshins .................. G06F 3/0605 711/170 |
| 2016/0188414 | A1 | 6/2016 | Jayakumar et al. |
| 2016/0342330 | A1 | 11/2016 | Chen et al. |
| 2016/0357454 | A1 | 12/2016 | Lee et al. |
| 2016/0357665 | A1* | 12/2016 | Lee ....................... G06F 3/0653 |
| 2016/0371187 | A1 | 12/2016 | Roberts |
| 2017/0060434 | A1 | 3/2017 | Chang et al. |
| 2017/0075818 | A1 | 3/2017 | Liu et al. |
| 2017/0115920 | A1 | 4/2017 | Subramanian et al. |
| 2017/0153826 | A1* | 6/2017 | Cho ....................... G06F 13/16 |
| 2017/0160991 | A1 | 6/2017 | Choi et al. |
| 2017/0235524 | A1 | 8/2017 | Yoo et al. |
| 2017/0249266 | A1 | 8/2017 | Nale et al. |
| 2017/0262344 | A1 | 9/2017 | Shaw et al. |
| 2017/0286305 | A1 | 10/2017 | Kalwitz |
| 2017/0300419 | A1 | 10/2017 | Yang et al. |
| 2017/0344489 | A1 | 11/2017 | Kapoor |
| 2017/0371776 | A1 | 12/2017 | Riley et al. |
| 2018/0004591 | A1 | 1/2018 | Volentine et al. |
| 2018/0011714 | A1 | 1/2018 | Han et al. |
| 2018/0018095 | A1 | 1/2018 | Lee et al. |
| 2018/0024609 | A1 | 1/2018 | Bolt et al. |
| 2018/0077236 | A1 | 3/2018 | Niikura et al. |
| 2019/0179750 | A1* | 6/2019 | Moyer .................... G06F 3/065 |
| 2019/0294548 | A1 | 9/2019 | Kraipak et al. |
| 2020/0050362 | A1* | 2/2020 | Lee ....................... G06F 3/0659 |

OTHER PUBLICATIONS

Office Action dated Apr. 16, 2020 in corresponding U.S. Appl. No. 16/164,103.
Office Action dated Aug. 3, 2020 in related U.S. Appl. No. 16/162,821.
Office Action dated Apr. 3, 2020 in related U.S. Appl. No. 16/162,821.

* cited by examiner

SEMICONDUCTOR MEMORY MODULE AND MEMORY SYSTEM INCLUDING THE SAME

CROSS-REFERENCE TO RELATED APPLICATIONS

This U.S. non-provisional patent application claims priority under 35 U.S.C. § 119 to Korean Patent Application Nos. 10-2018-0035270, filed on Mar. 27, 2018, 10-2018-0039208, filed on Apr. 4, 2018, 10-2018-0039206, filed on Apr. 4, 2018, 10-2018-0040148, filed on Apr. 6, 2018, and 10-2018-0043848, filed on Apr. 16, 2018, in the Korean Intellectual Property Office, the disclosures of which are incorporated by reference herein in their entireties.

TECHNICAL FIELD

Exemplary embodiments of the inventive concept relate to a semiconductor device, and in particular, to a semiconductor memory module and a memory system including the same.

DISCUSSION OF RELATED ART

A semiconductor memory is a semiconductor device that is used to store data. There are two kinds of semiconductor memory: volatile memories (e.g., dynamic and static random access memory devices) and non-volatile memories (e.g., FLASH, phase-change, ferroelectric, magnetic, and resistive memory devices).

In general, volatile memory is used as a main memory of a computing system, such as a personal computer, a server, or a workstation, and is configured to allow for high-speed random access. Nonvolatile memory is used as an auxiliary storage of the computing system and is configured to have a large storage capacity.

Storage class memory (SCM) allows for a non-volatile large storage capacity and a high-speed random access. Storage class memory can be realized using a non-volatile memory device.

To realize compatibility with existing main memory, storage class memory is researched and developed based on a memory module of a main memory. However, due to a difference in operational characteristics between a dynamic random access memory (DRAM) and a nonvolatile memory, which have been used as the main memory and the storage class memory, respectively, the storage class memory has an operation speed that is slower than the existing main memory.

SUMMARY

According to an exemplary embodiment of the inventive concept, a semiconductor memory module may include a random access memory, a nonvolatile memory, a buffer memory, and a controller configured to execute a reading operation on the buffer memory in response to an activation of a control signal. The controller may be further configured to execute a flush operation of storing first data, which are stored in the random access memory, in the nonvolatile memory, according to a result of the reading operation.

According to an exemplary embodiment of the inventive concept, a semiconductor memory module may include a random access memory, a nonvolatile memory, a buffer memory, and a controller. The controller may be configured to execute a reading operation on the buffer memory and the random access memory, and to execute a flush operation, in response to an activation of a control signal. The flush operation may include storing first data, which are read from the buffer memory, in the nonvolatile memory and storing second data, which are read from the random access memory, in the buffer memory.

According to an exemplary embodiment of the inventive concept, a memory system may include a semiconductor memory module including a random access memory, a nonvolatile memory, and a controller, and a central control block configured to activate a control signal to be transmitted to the controller when an access error is detected during an attempt to access the semiconductor memory module. The controller may be configured to read first data, which are a part of data stored in the random access memory, and then to store the first data in the nonvolatile memory as second data, in response to an activation of the control signal.

BRIEF DESCRIPTION OF THE DRAWINGS

The above and other features of the inventive concept will be more clearly understood by describing detail exemplary embodiments thereof with reference to the accompanying drawings.

DETAILED DESCRIPTION OF THE EMBODIMENTS

Figure 1:
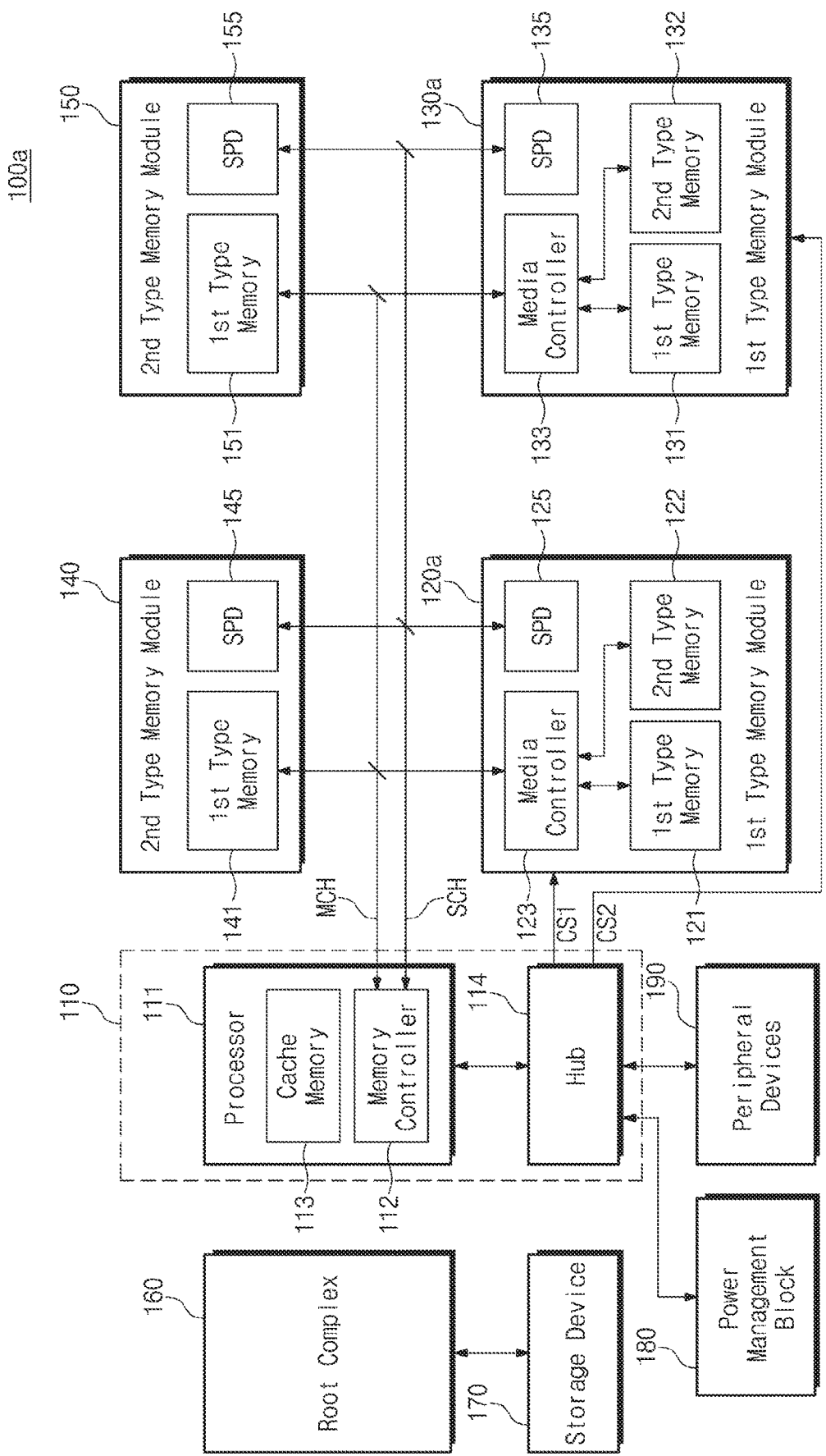
FIG. 1 is a block diagram illustrating a memory system according to an exemplary embodiment of the inventive concept.

Exemplary embodiments of the inventive concept provide a semiconductor memory module, which is configured to have an increased operation speed, and a memory system including the semiconductor memory module.

Exemplary embodiments of the inventive concept will now be described more fully hereinafter with reference to the accompanying drawings. Like reference numerals may refer to like elements throughout this application.

FIG. 1 is a block diagram illustrating a memory system according to an exemplary embodiment of the inventive concept. For example, a memory system 100a may include, for example, a server system, such as an application server, a client server, or a data server. Alternatively, the memory system 100a may include a personal computer or a workstation.

Referring to FIG. 1, the memory system 100a may include a central control block 110, a first memory module 120a, a second memory module 130a, a third memory module 140, a fourth memory module 150, a root complex 160, a storage device 170, a power management block 180, and peripheral devices 190.

The central control block 110 may include a processor 111 and a hub 114. The processor 111 may be configured to control elements of the memory system 100a and operations of the elements. Furthermore, the processor 111 may be configured to execute an operating system and various applications, and to process data using the operating system or the applications.

The processor 111 may include a memory controller 112 and a cache memory 113. The memory controller 112 may access the first, second, third, and fourth memory modules 120a, 130a, 140, and 150 through main channels MCH and supplementary channels SCH. The cache memory 113 may include a high speed memory device (e.g., a static random access memory (SRAM) device).

The hub 114 may be connected to the power management block 180. The hub 114 may be configured to connect the processor 111 to the peripheral devices 190. The hub 114 may include various controllers for controlling the peripheral devices 190. For example, the hub 114 may include a platform controller hub (PCH).

The hub 114 may transmit a first control signal CS1 and a second control signal CS2 to the first and second memory modules 120a and 130a, respectively, which are first type memory modules. For example, the first control signal CS1 and the second control signal CS2 may include an asynchronous DRAM Refresh (ADR) signal for requesting an execution of a flush operation for each of the first and second memory modules 120a and 130a.

The first, second, third, and fourth memory modules 120a, 130a, 140, and 150 may be connected to the memory controller 112 through the main channels MCH and the supplementary channels SCH. The main channels MCH may be used to store or read data in or from the first, second, third, and fourth memory modules 120a, 130a, 140, and 150 (e.g., semiconductor memory modules). The main channels MCH may include a plurality of channels, which are provided for the first, second, third, and fourth memory modules 120a, 130a, 140, and 150.

The supplementary channels SCH may be used to provide additional functions, which are associated with the first, second, third, and fourth memory modules 120a, 130a, 140, and 150, except for the functions of storing or reading data in or from the first, second, third, and fourth memory modules 120a, 130a, 140, and 150.

For example, the first, second, third, and fourth memory modules 120a, 130a, 140, and 150 may provide their own peculiar data to the memory controller 112 through the supplementary channels SCH. The supplementary channels SCH may include a plurality of channels, which are provided for the first, second, third, and fourth memory modules 120a, 130a, 140, and 150.

The first, second, third, and fourth memory modules 120a, 130a, 140, and 150 may be used as a main memory of the memory system 100a. The first, second, third, and fourth memory modules 120a, 130a, 140, and 150 may be configured to communicate with the memory controller 112 in accordance with one of various standards, such as dual in-line memory module (DIMM), registered DIMM (RDIMM), or load reduced DIMM (LRDIMM), for the memory modules.

The root complex 160 may be configured to directly communicate with the processor 111 or to communicate with the processor 111 through the hub 114. The root complex 160 may be configured to provide channels, allowing the central control block 110 to access various peripheral devices. For example, the storage device 170 may be connected to the root complex 160. The storage device 170 may include at least one of a hard disk drive, an optical disk drive, a solid state drive, or the like.

However, the peripheral devices connected to the root complex 160 are not limited to the storage device 170. For example, the root complex 160 may be connected to various devices (e.g., a modem, a graphic processing unit (GPU), or a neuromorphic processor).

The power management block 180 may be configured to monitor and control electric power, which is supplied to the memory system 100a or each element of the memory system 100a. In the case where a sudden power off (SPO) occurs in the memory system 100a, the power management block 180 may provide an SPO-alerting signal to the hub 114.

The processor 111 may be configured to hierarchically manage the cache memory 113, the first, second, third, and fourth memory modules 120a, 130a, 140, and 150, which are used as the main memory, and the storage device 170. For example, the processor 111 may be configured to load necessary data from the storage device 170 on the main memory (e.g., including the first, second, third, and fourth memory modules 120a, 130a, 140, and 150). The processor 111 may also be configured to flush to-be-backed-up data, which are stored in the main memory, to the storage device 170.

A portion of the storage space of the main memory including the first, second, third, and fourth memory modules 120a, 130a, 140, and 150 may be mapped to the cache memory 113. In the case where it is necessary to access a specific storage space of the main memory, the processor 111 may determine whether the specific storage space is mapped to the cache memory 113.

If the specific storage space is mapped to the cache memory 113, the processor 111 may access the specific storage space of the cache memory 113. If the specific storage space is not mapped to the cache memory 113, the processor 111 may map or fetch the specific storage space of the first, second, third, and fourth memory modules 120a, 130a, 140, and 150 to the cache memory 113.

If the storage space of the cache memory 113 is insufficient, the processor 111 may release at least a portion of an existing storage space previously mapped to the cache memory 113. If the data of the storage space to be released is updated, the processor 111 may flush the updated data to the first, second, third, and fourth memory modules 120a, 130a, 140, and 150.

The first, second, third, and fourth memory modules 120a, 130a, 140, and 150 may be heterogeneous memory modules. For example, the first and second memory modules 120a and 130a may be first type memory modules, as described above, whereas the third and fourth memory modules 140 and 150 may be second type memory modules.

The first memory module 120a may include a first type memory 121, a second type memory 122, a media controller 123, and a serial presence detect (SPD) device 125. The second memory module 130a may include a first type memory 131, a second type memory 132, a media controller 133, and a serial presence detect (SPD) device 135. Hereinafter, the first type memory modules 120a and 130a will be described in more detail with reference to the first memory module 120a.

The first type memory 121 may include a high speed volatile memory (e.g., a dynamic random access memory (DRAM) device). The second type memory 122 may include a non-volatile memory that has a lower speed and a larger storage capacity than the first type memory 121. For example, the second type memory 122 may include at least one of a FLASH memory, a phase-change memory, a ferroelectric memory, a magnetic memory, a resistive memory, or the like.

The media controller 123 may be configured to deliver an access command, which is transmitted from an external host device (e.g., the memory controller 112 or the processor 111) through a corresponding channel of the main channels MCH, to the first type memory 121 or the second type memory 122. According to the access command, the media controller 123 may exchange data with the external host device (e.g., the memory controller 112 or the processor 111) through a corresponding channel of the main channels MCH.

The media controller 123 may provide a storage capacity or storage space of the second type memory 122 to the external host device (e.g., the memory controller 112 or the processor 111). Under the control of the media controller 123, the first type memory 121 may be used as a cache memory of the second type memory 122.

For example, the media controller 123 may be configured to map a portion of a storage space of the second type memory 122 to the first type memory 121. If a storage space, which is associated with the access command provided from the external host device (e.g., the memory controller 112 or the processor 111), is mapped to the first type memory 121, the media controller 123 may deliver the access command to the first type memory 121.

If a storage space, which is associated with the access command provided from the external host device (e.g., the memory controller 112 or the processor 111), is not mapped to the first type memory 121, the media controller 123 may map or backup the corresponding storage space from the second type memory 122 to the first type memory 121.

If the storage space of the first type memory 121 is insufficient, the media controller 123 may release at least a portion of an existing storage space previously mapped to the first type memory 121. If the data of the storage space to be released is updated, the media controller 123 may flush the update data to the second type memory 122.

The SPD device 125 may communicate with the external host device (e.g., the memory controller 112 or the processor 111) through a corresponding channel of the supplementary channels SCH. For example, when the first memory module 120a is initialized, the SPD device 125 may provide stored data to the external host device (e.g., the memory controller 112 or the processor 111) through a corresponding channel of the supplementary channels SCH.

For example, the SPD device 125 may be a storage space of the first memory module 120a and may store information on a storage capacity, which is provided to the external host device (e.g., the memory controller 112 or the processor 111). For example, the SPD device 125 may store information on the storage capacity of the second type memory 122. When initialization is executed, the SPD device 125 may provide the information on the storage capacity of the second type memory 122 to the external host device (e.g., the memory controller 112 or the processor 111).

The capacity information stored in the SPD device 125 may contain, for example, information on a user capacity of the second type memory 122. The storage capacity of the second type memory 122 may include a user capacity, a meta-capacity, or a preliminary capacity.

The user capacity may be a storage capacity which is provided to the external host device (e.g., the memory controller 112) by the second type memory 122.

The meta-capacity may be a storage capacity, which is provided to store various metadata for managing the second type memory 122 and is not exposed to the external host device (e.g., the memory controller 112).

The preliminary capacity may be a storage capacity, which is provided to manage the second type memory 122 and is not exposed to the external host device (e.g., the memory controller 112).

The capacity information stored in the SPD device 125 may contain information on the user capacity of the second type memory 122. Hereinafter, unless otherwise defined, the capacity of the second type memory 122 may be interpreted as indicating the user capacity of the second type memory 122.

The third memory module 140 may include a first type memory 141 and a SPD device 145. The fourth memory module 150 may include a first type memory 151 and a SPD device 155. Hereinafter, the second type memory modules 140 and 150 will be described in more detail with reference to the third memory module 140.

The first type memory 141 may include a dynamic random access memory, similar to the first type memory 121 of the first memory module 120a. The SPD device 145 may communicate with the external host device (e.g., the memory controller 112 or the processor 111) through a corresponding channel of the supplementary channels SCH. For example, when the third memory module 140 is initialized, the SPD device 145 may provide stored data to the external host device (e.g., the memory controller 112 or the processor 111) through a corresponding channel of the supplementary channels SCH.

For example, the SPD device 145 may be a storage space of the third memory module 140 and may store information on a storage capacity, which is provided to the external host device (e.g., the memory controller 112 or the processor 111). For example, the SPD device 145 may store information on the storage capacity of the first type memory 141. When initialization is executed, the SPD device 145 may provide the information on the storage capacity of the first type memory 141 to the external host device (e.g., the memory controller 112 or the processor 111).

If power is supplied to the memory system 100a, the memory controller 112 may initialize the first, second, third, and fourth memory modules 120a, 130a, 140, and 150. For example, the SPD devices 125-155 of the first, second, third, and fourth memory modules 120a, 130a, 140, and 150 may provide respective capacity information to the memory controller 112 through the supplementary channels SCH.

The SPD devices 125 and 135 of the first type memory modules 120a and 130a may provide respective storage capacities of the second type memories 122 and 132 to the memory controller 112. The SPD devices 145 and 155 of the second type memory modules 140 and 150 may provide respective storage capacities of the first type memories 141 and 151 to the memory controller 112. For example, the memory controller 112 may read respective storage capacities from the SPD devices 125-155.

Figure 2:
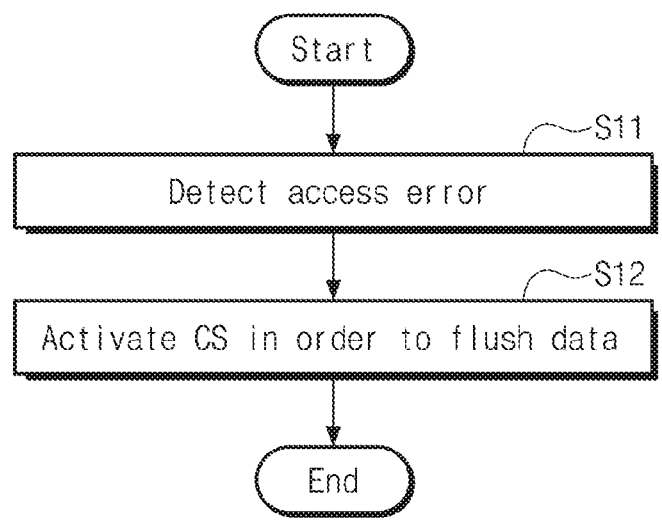
FIG. 2 is a flowchart illustrating a method of operating the memory system of FIG. 1, according to an exemplary embodiment of the inventive concept.

FIG. 2 is a flowchart illustrating a method of operating the memory system of FIG. 1, according to an exemplary embodiment of the inventive concept. Referring to FIGS. 1 and 2, in operation S11, the processor 111 may be configured to detect whether an access error occurs on an attempt to access one memory module (e.g., the first memory module 120a) of the first type memory modules 120a and 130a.

In operation S12, if the access error is detected, the central control block 110 may activate a control signal CS to flush data of the first memory module 120a. In other words, when an access error occurs on an attempt to access the first type memory modules 120a and 130a, the memory system 100a may instruct a memory module, in which the access error occurs, to execute a flush operation.

Figure 3:
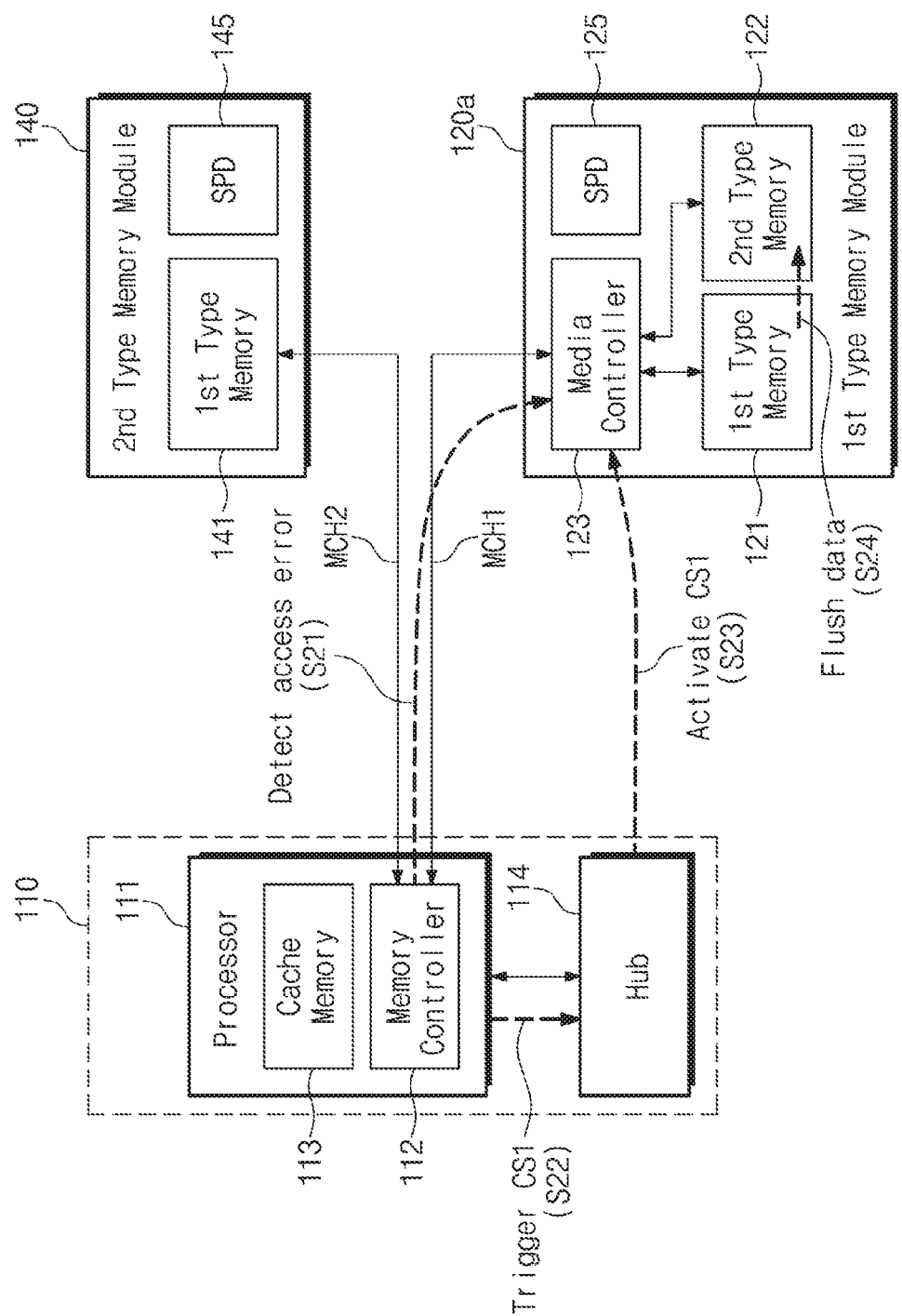
FIG. 3 illustrates a flush operation which is instructed when an access error occurs according to an exemplary embodiment of the inventive concept.

FIG. 3 illustrates a flush operation which is instructed when an access error occurs according to an exemplary embodiment of the inventive concept. To reduce complexity in the drawings, only the central control block 110, the first memory module 120a, and the third memory module 140 are illustrated in FIG. 3. The first memory module 120a may communicate with the memory controller 112 through a first main channel MCH1, and the third memory module 140 may communicate with the memory controller 112 through a second main channel MCH2.

FIG. 3 illustrates an example of an access error, which may occur on an attempt to access the first memory module 120a. Referring to FIGS. 1 and 3, in operation S21, the processor 111 may be configured to detect whether an access error occurs on an attempt to access the first memory module 120a. The access error may include, for example, a page fault or an uncorrectable error.

An operating system or an application, which is executed on the processor 111, may generate an access request on the first memory module 120a, by using a virtual address. The memory controller 112 may convert the virtual address to a physical address, based on a page table, which is stored in one of the first, second, third, and fourth memory modules 120a, 130a, 140, and 150. The memory controller 112 may attempt to access the first memory module 120a based on the physical address.

In the case where the operating system or the application requests to store new data or to access a previously released storage space, there may be no page table corresponding to the access request. In such a case, a page fault may occur. If the page fault occurs, the processor 111 may execute an exception handling.

If the memory controller 112 transmits a read request to the first memory module 120a, the media controller 123 may determine whether the requested data is stored in the first type memory 121 (e.g., a cache hit) or is stored in the second type memory 122 (e.g., a cache miss).

In the case of the cache miss, the media controller 123 may transfer read-requested data, which is fetched from the second type memory 122, to the first type memory 121. Since it takes time to execute the data fetching operation, it may be difficult for the first memory module 120a to provide the read-requested data to the memory controller 112 within a given time that is set for the memory controller 112. In this case, the memory controller 112 may determine that an uncorrectable error occurs and may execute the exception handling.

In the case of the cache hit, the first type memory 121 may transfer the requested data to the memory controller 112, in accordance with the read request from the memory controller 112. If the transferred data have the uncorrectable error, the memory controller 112 may determine that the uncorrectable error occurs and may execute the exception handling.

If, as described above, the access error occurs when the processor 111 or the memory controller 112 attempts to access the first memory module 120a, the processor 111 may execute the exception handling. During the execution of the exception handling, the processor 111 or the memory controller 112 may be prohibited from accessing the first memory module 120a.

In other words, during the execution of the exception handling, it may be possible to secure an idle time, in which the access request is not allowed to be delivered from the processor 111 or the memory controller 112 to the first memory module 120a, for the first memory module 120a.

According to an exemplary embodiment of the inventive concept, the memory system 100a may notify the first memory module 120a that the exception handling is executed. For example, in operation S22, the processor 111 may request the hub 114 to activate the first control signal CS1. In operation S23, the hub 114 may activate the first control signal CS1.

The activation of the first control signal CS1 may allow the media controller 123 to know that the exception handling is being executed by the processor 111 and that the idle time is secured. Since the idle time is secured, the media controller 123 may execute background operations which are required to operate the first memory module 120a.

For example, the background operation may be operations which are not requested by the central control block 110 and are not recognized by the central control block 110. The first memory module 120a may execute the background operation, during the idle time, in which there is no access request from the central control block 110. The first memory module 120a may execute the background operation during an interval between operations for processing access requests from the central control block 110.

For example, in operation S24, the media controller 123 may execute a flush operation of transferring the data stored in the first type memory 121 to the second type memory 122. For example, all or some of the data stored in the first type memory 121 may be written in the second type memory 122 through the flush operation.

The first type memory 121 may be used as a cache memory of the second type memory 122. Thus, the data stored in the first type memory 121 may be transferred to the second type memory 122 through the flush operation.

For example, when it is necessary to write data in the first type memory 121 in accordance with an access request from the processor 111 or the memory controller 112, it a free storage space of the first type memory 121 may be insufficient. Alternatively, when it is necessary to fetch data, which are stored in the second type memory 122, to the first type memory 121 in accordance with an access request from the processor 111 or the memory controller 112, the free storage space of the first type memory 121 may be insufficient.

In the case where the free storage space of the first type memory 121 is insufficient, a flush operation may be executed to allow the first type memory 121 to have sufficient free storage space. Furthermore, in the case where the power of the memory system 100a is interrupted, the flush operation of transferring the data stored in the first type memory 121 to the second type memory 122 may be performed to conserve the data stored in the first type memory 121.

When the access request transmitted from the processor 111 or the memory controller 112 is processed by the media controller 123, the execution of the flush operation may lead to an increase in access latency of the first memory module 120a. According to an exemplary embodiment of the inventive concept, in the case where the access error occurs, the first memory module 120a may be configured to execute the flush operation. Thus, it may be possible to reduce a frequency of the flush operation, which should be executed when the access request is processed, and to reduce an access latency of the first memory module 120a and the memory system 100a.

In exemplary embodiments of the inventive concept, as previously described with reference to the first memory module 120a, an access error may occur in the second memory module 130a. The hub 114 may activate the second control signal CS2, and the second memory module 130a may execute a background operation. In exemplary embodiments of the inventive concept, the background operation, which is executed by each of the first and second memory modules 120a and 130a, may be a flush operation, but the inventive concept is not limited thereto.

The background operation may be one of various operations (e.g., read reclaim, bad block management, wear leveling, garbage collection, or erase operations), which are performed when the second type memory 122 is managed by the media controller 123.

Figure 4:
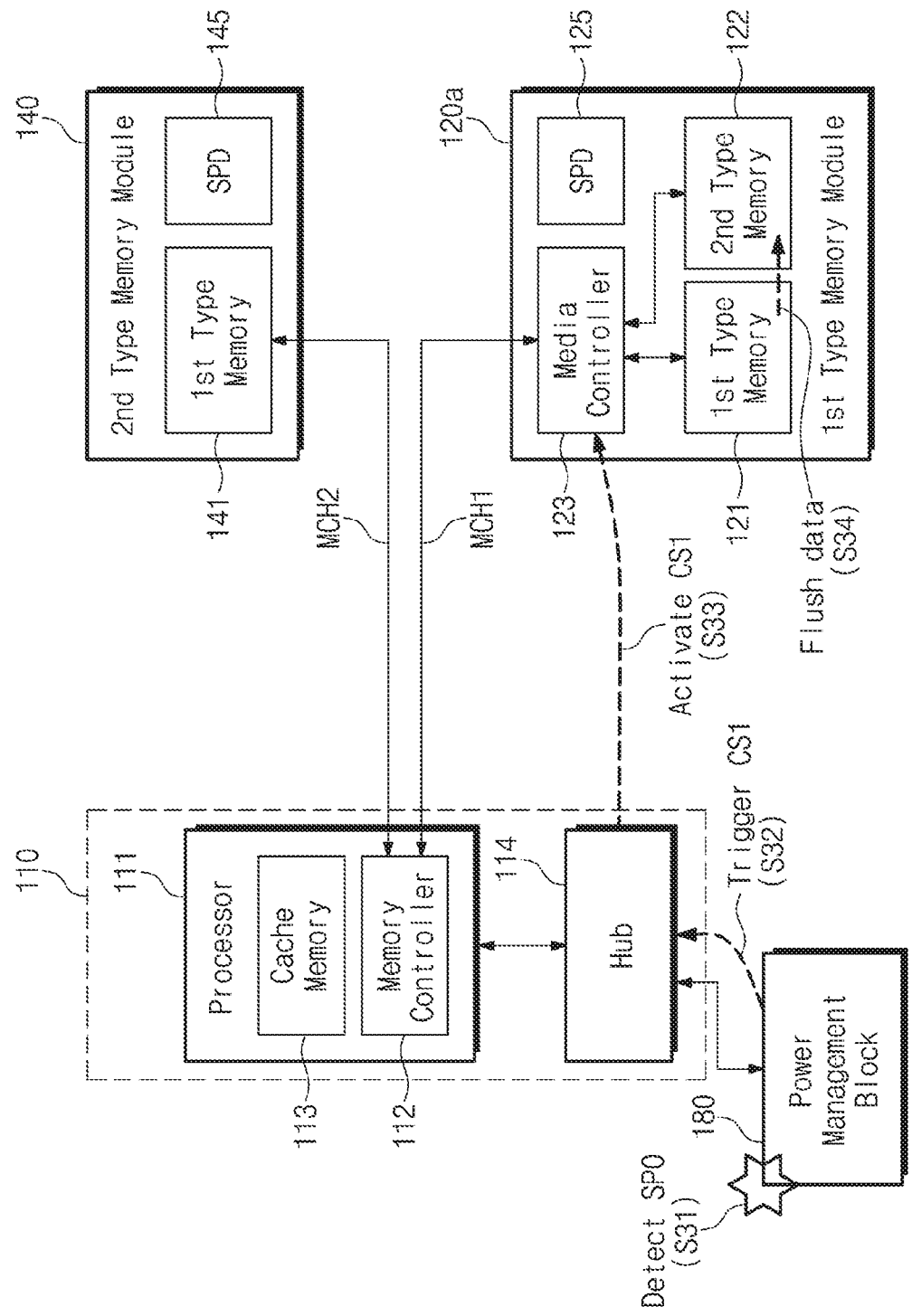
FIG. 4 illustrates an example in which a first control signal is activated by a hub of FIG. 1 according to an exemplary embodiment of the inventive concept.

FIG. 4 illustrates an example in which a first control signal is activated by a hub of FIG. 1 according to an exemplary embodiment of the inventive concept. To reduce complexity in the drawings, only the central control block 110, the first memory module 120a, the third memory module 140, and the power management block 180 are illustrated in FIG. 4.

Referring to FIGS. 1 and 4, in operation S31, the power management block 180 may be configured to detect a sudden power off (SPO). In the case where the SPO occurs, the memory system 100a may execute a subsequent process for addressing the SPO, using electric power stored in a charging device, such as a battery or a supercapacitor.

If the SPO is detected, the power management block 180 may request the hub 114 to activate the first control signal CS1, in operation S32. For example, the power management block 180 may request the hub 114 to activate both of the first and second control signals CS1 and CS2 that are transmitted to the first type memory modules 120a and 130a.

If the SPO is detected by the power management block 180, the hub 114 may activate the first control signal CS1, in operation S33. In operation S34, the first memory module 120a may execute a flush operation of transferring data, which are stored in the first type memory 121, to the second type memory 122, in response to the activation of the first control signal CS1. For example, all or some of the data stored in the first type memory 121 may be written in the second type memory 122 through the flush operation.

Similarly, if the second control signal CS2 is activated, the second memory module 130a may execute a flush operation of transferring data, which are stored in the first type memory 131, to the second type memory 132. For example, all or some of the data stored in the first type memory 131 may be written in the second type memory 132 through the flush operation.

Figure 5:
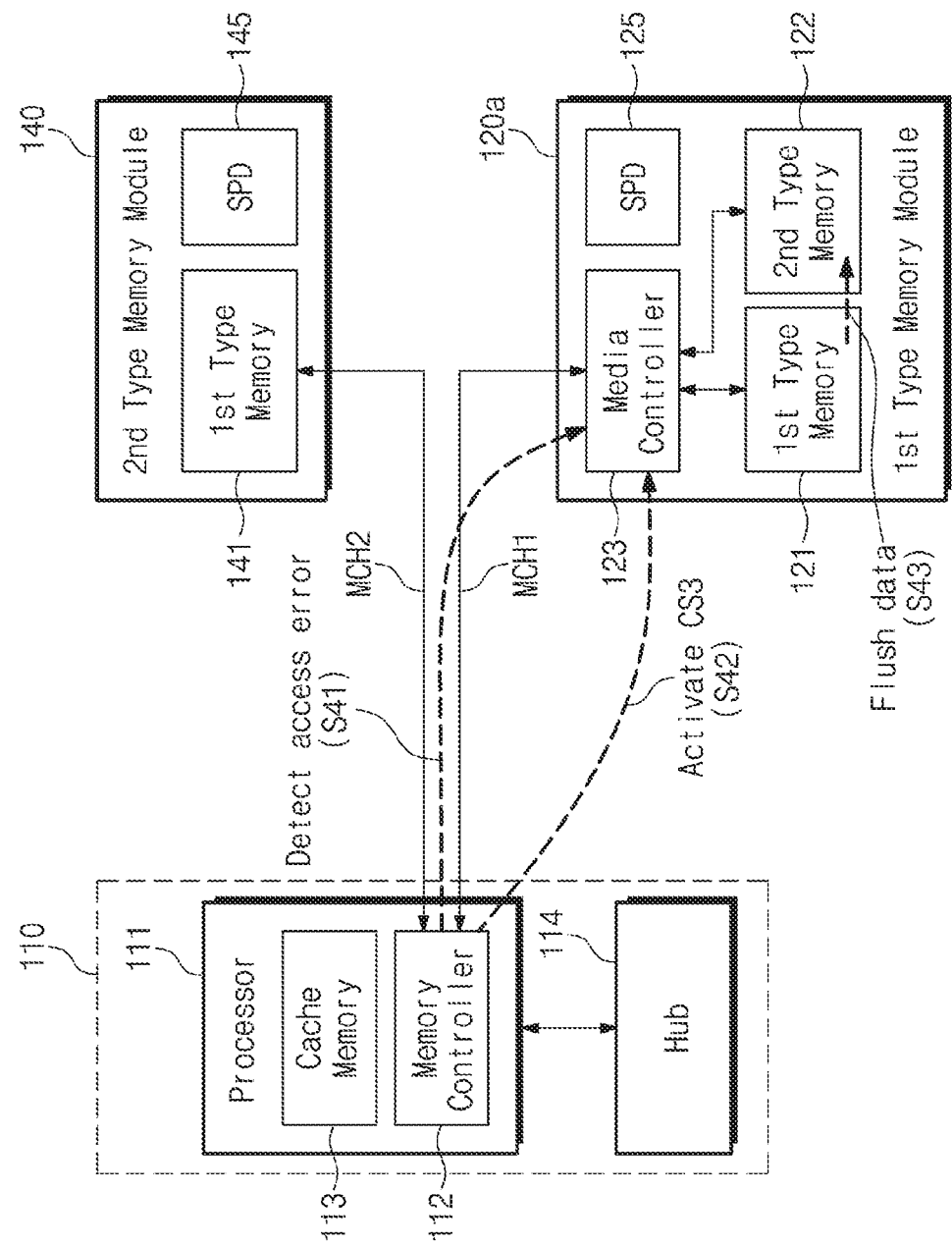
FIG. 5 illustrates a flush operation which is instructed when an access error occurs according to an exemplary embodiment of the inventive concept.

FIG. 5 illustrates a flush operation which is instructed when an access error occurs according to an exemplary embodiment of the inventive concept. To reduce complexity in the drawings, only the central control block 110, the first memory module 120a, and the third memory module 140 are illustrated in FIG. 5. FIG. 5 illustrates an example of an access error, which may occur on an attempt to access the first memory module 120a.

Referring to FIGS. 1 and 5, in operation S41, the processor 111 may be configured to detect whether an access error occurs on an attempt to access the first memory module 120a. If the access error is detected, the processor 111 may activate a third control signal CS3, which is transmitted to the first memory module 120a through the first main channel MCH1, in operation S42.

If the third control signal CS3 is activated, the media controller 123 may execute a background operation such as the flush operation, in operation S43. In other words, the memory controller 112 may directly inform the occurrence of the access error to the first memory module 120a, not via the hub 114.

As an example, when the access error or the SPO is detected, the hub 114 may activate the first control signal CS1, as described with reference to FIGS. 3 and 4. As another example, when the access error is detected, the memory controller 112 may activate the third control signal CS3, and when the SPO is detected, the hub 114 may activate the first control signal CS1, as described with reference to FIGS. 4 and 5.

Figure 6:
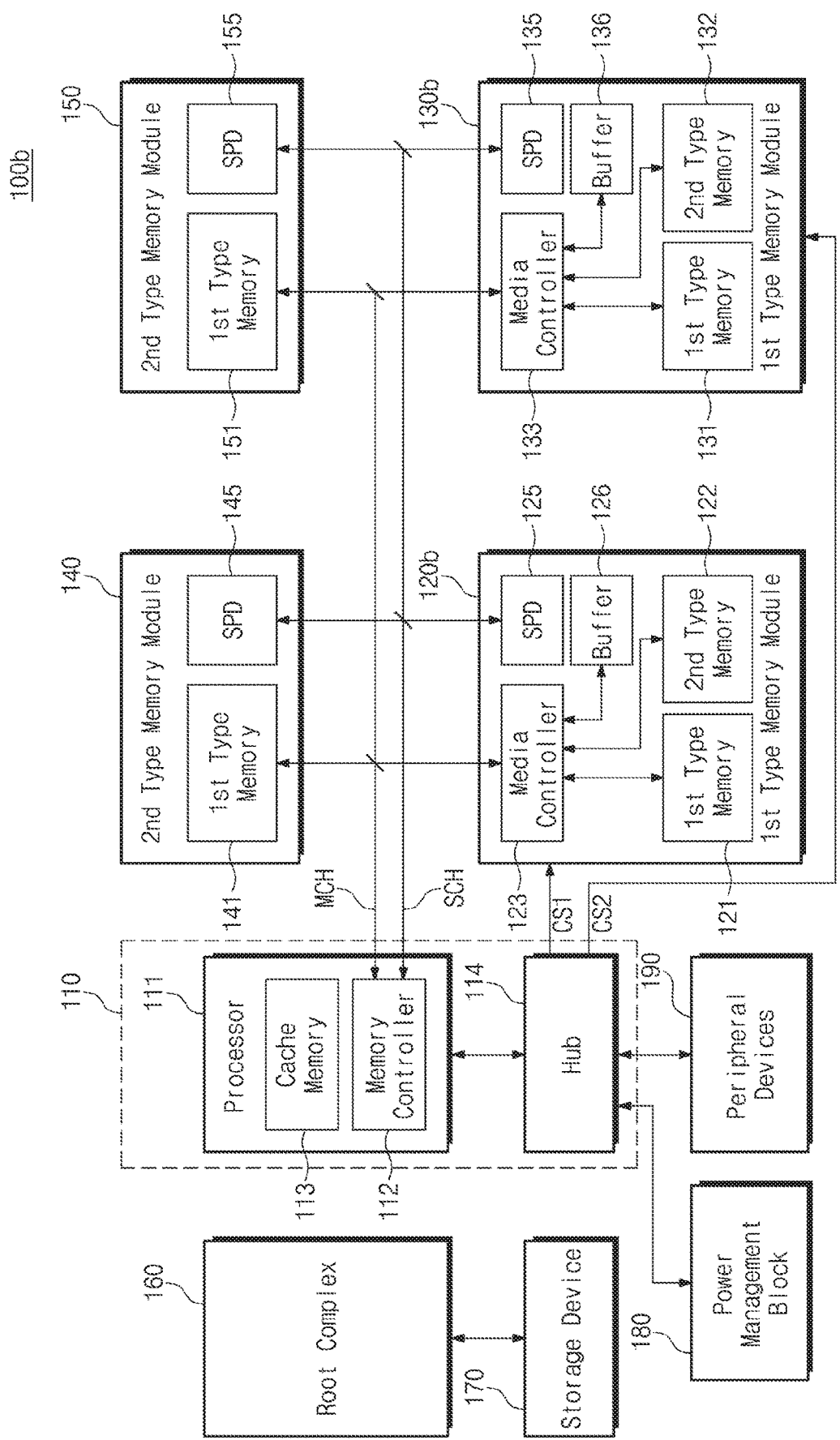
FIG. 6 is a block diagram illustrating a memory system according to an exemplary embodiment of the inventive concept.

FIG. 6 is a block diagram illustrating a memory system according to an exemplary embodiment of the inventive concept. Referring to FIG. 6, a memory system 100b may include the central control block 110, a first memory module 120b, a second memory module 130b, the third memory module 140, the fourth memory module 150, the root complex 160, the storage device 170, the power management block 180, and the peripheral devices 190.

The central control block 110, the third memory module 140, the fourth memory module 150, the root complex 160, the storage device 170, the power management block 180, and the peripheral devices 190 may be configured to have substantially the same operational and structural features as those of the memory system 100a of FIG. 1.

For example, the central control block 110 may activate the first control signal CS1, as shown in FIG. 3, or may activate the third control signal CS3, as shown in FIG. 5, when an access error is detected. When the SPO is detected, the central control block 110 may activate the first control signal CS1, as shown in FIG. 4.

The first memory module 120b may execute a background operation (e.g., a flush operation) in response to the first or third control signal CS1 or CS3. The second memory module 130b may execute a background operation (e.g., a flush operation) in response to the second control signal CS2 or the third control signal CS3.

The first memory module 120b may further include a buffer memory 126. The second memory module 130b may further include a buffer memory 136. The buffer memory 126 may be used to execute a flush operation of the first memory module 120b. The buffer memory 136 may be used to execute a flush operation of the second memory module 130b.

Figure 7:
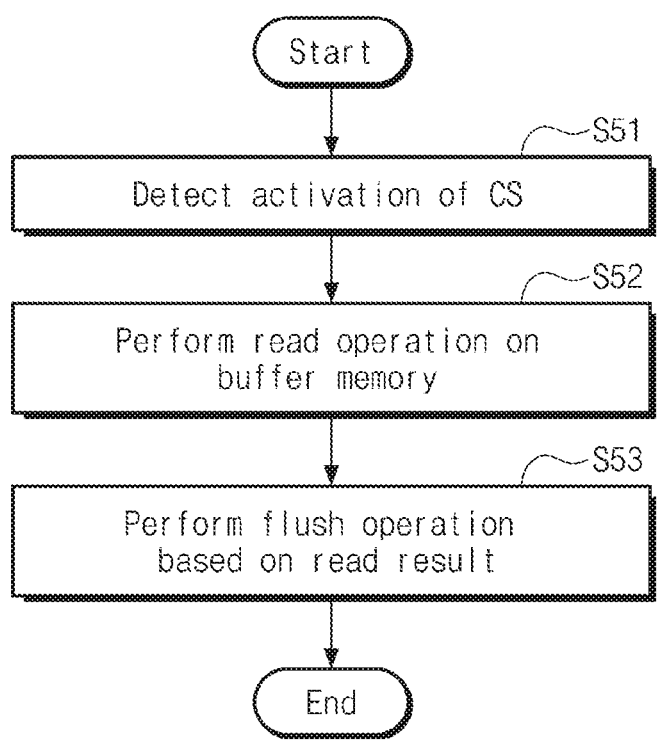
FIG. 7 is a flowchart illustrating a method of operating a first memory module or a third memory module of FIG. 6, according to an exemplary embodiment of the inventive concept.

FIG. 7 is a flowchart illustrating a method of operating a first memory module or a third memory module of FIG. 6 according to an exemplary embodiment of the inventive concept. The operating method will be described in more detail with reference to the first memory module 120b. Referring to FIGS. 6 and 7, in operation S51, the media controller 123 of the first memory module 120b may detect activation of the control signal CS (e.g., the first or third control signal CS1 or CS3).

In operation S52, the media controller 123 may execute a reading operation on the buffer memory 126. In operation S53, the media controller 123 may execute a flush operation, based on the result of the reading operation. In other words, the media controller 123 may execute the flush operation of writing data, which are stored in the first type memory 121, into the second type memory 122, based on information read from the buffer memory 126.

Figure 8:
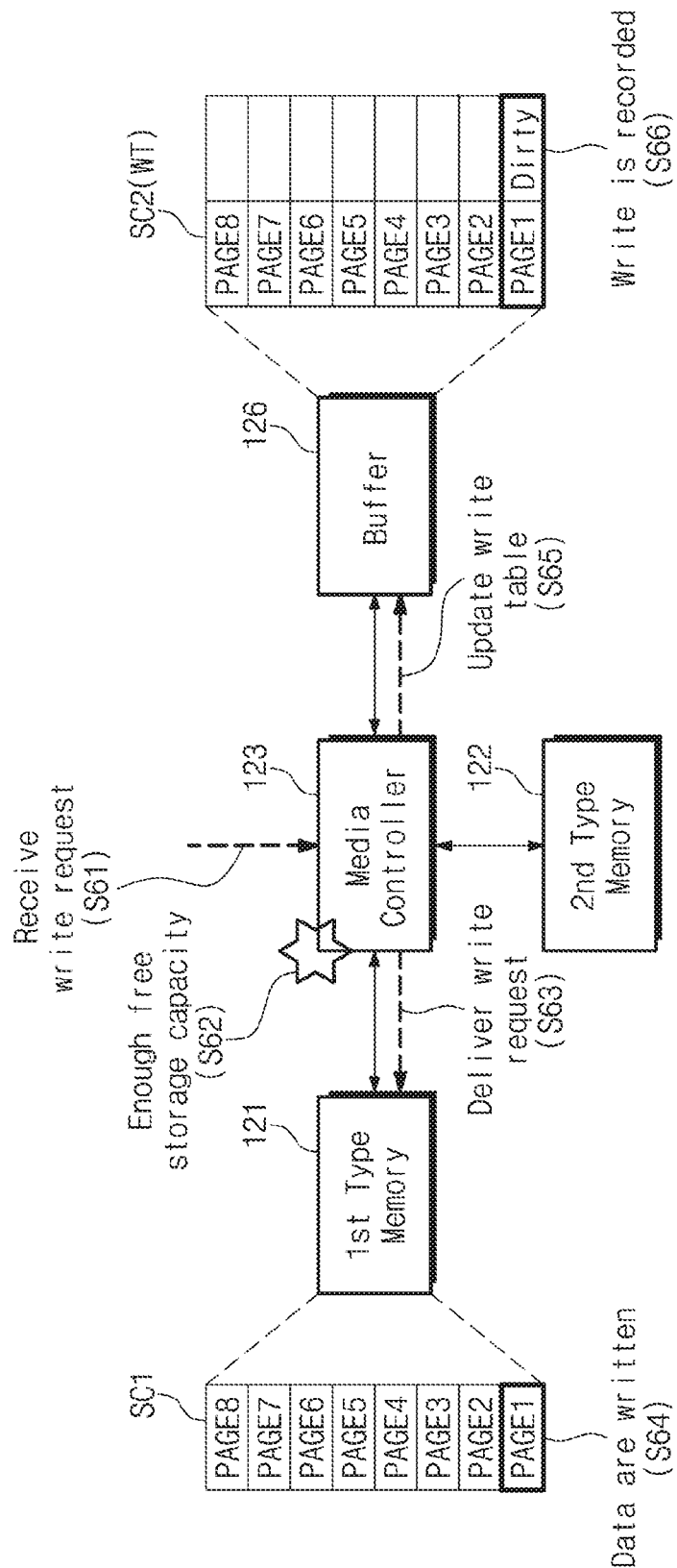
FIG. 8 illustrates an operation of storing data in the first memory module of FIG. 6 according to an exemplary embodiment of the inventive concept.

FIG. 8 illustrates an operation of storing data in the first memory module of FIG. 6 according to an exemplary embodiment of the inventive concept. To reduce complexity in the drawings, only the first type memory 121, the second type memory 122, the media controller 123, and the buffer memory 126 are illustrated in FIG. 8.

In FIG. 8, a first storage space SC1 of the first type memory 121 is illustrated to include first to eighth pages PAGE1-PAGE8. The page may be a unit of data that is processed when the central control block 110 attempts to access the first memory module 120b. For example, the central control block 110 may be configured to store or read data in or from the first memory module 120b in units of pages.

As shown in FIG. 8, a write table WT may be stored in a second storage space SC2 of the buffer memory 126. The write table WT may contain information on the first to eighth pages PAGE1-PAGE8 of the first type memory 121. For example, the write table WT may contain information on whether data stored in the first to eighth pages PAGE1-PAGE8 of the first type memory 121 are newly-written data.

Referring to FIGS. 6 and 8, the central control block 110 may transmit a write request to the first memory module 120b. The media controller 123 may receive the write request transmitted from the central control block 110, in operation S61. The write request may include, for example, write data and information on an address. The address may indicate a specific part of a storage space of the second type memory 122.

In operation S62, the media controller 123 may determine whether the free storage capacity of the first type memory 121 is sufficient. For example, in the case where the free storage capacity of the first type memory 121 is greater than or equal to capacity of the write data, the media controller 123 may determine that there is a sufficient free storage capacity.

In the case where the first type memory 121 has a sufficient free storage capacity, the media controller 123 may deliver the write request, which is provided from the central control block 110, to the first type memory 121, in operation S63.

In operation S64, the write data may be written in the first page PAGE1 of the first type memory 121, in accordance with the write request. In the case where the write data are written in the first page PAGE1, the media controller 123 may update the write table WT, in operation S65. In operation S66, a dirty mark or flag, which indicates that new data are written in the first page PAGE1 of the first type memory 121, may be recorded in the write table WT.

Figure 9:
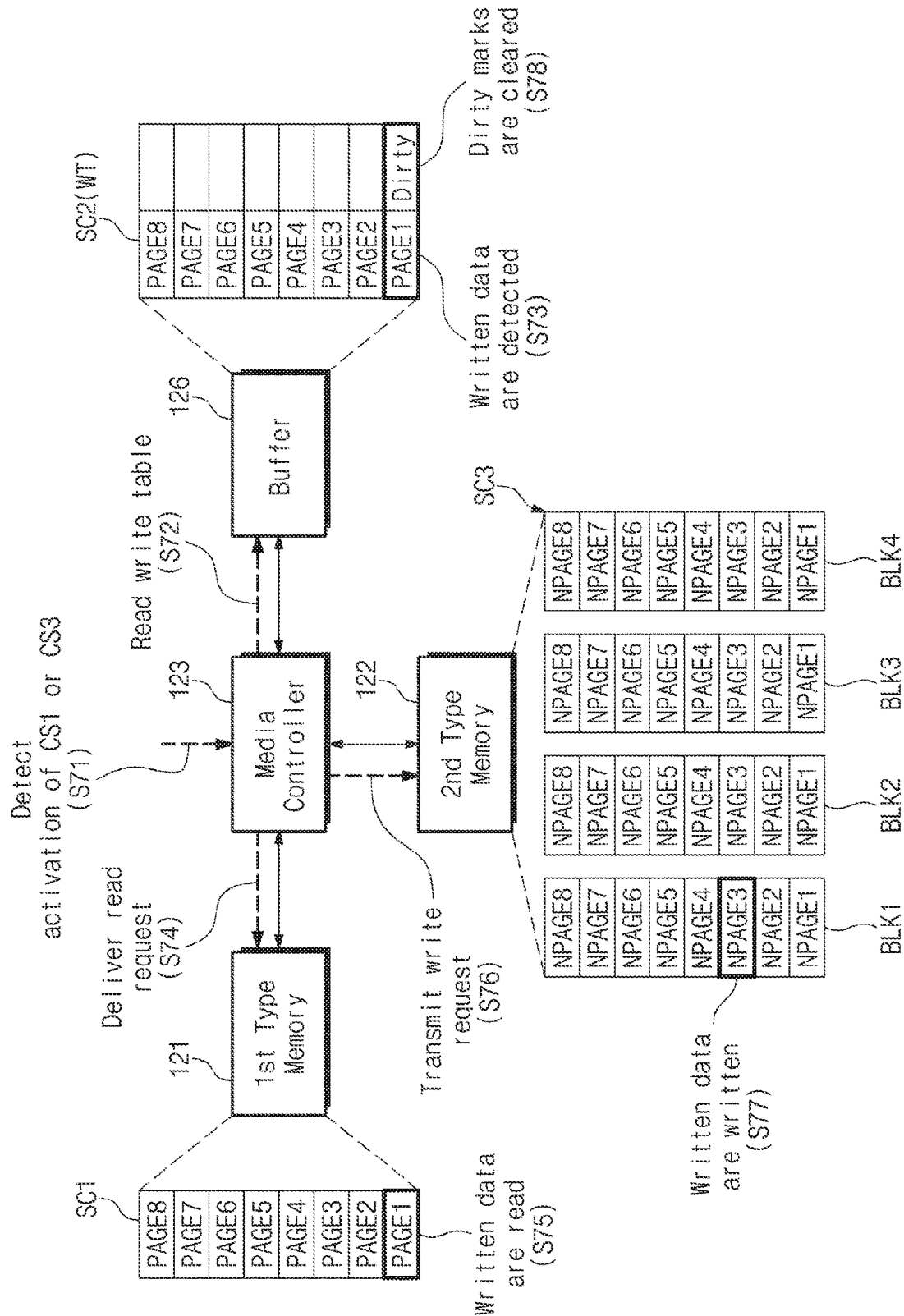
FIG. 9 illustrates a flush operation, which is performed in the first memory module of FIG. 6 and is performed using a buffer memory of FIG. 6 according to an exemplary embodiment of the inventive concept.

FIG. 9 illustrates a flush operation, which is performed in the first memory module of FIG. 6 and is performed using a buffer memory of FIG. 6 according to an exemplary embodiment of the inventive concept. As shown in FIG. 9, a third storage capacity SC3 of the second type memory 122 may be divided into first to fourth memory blocks BLK1-BLK4. Each of the first to fourth memory blocks BLK1-BLK4 may be divided into first to eighth nonvolatile pages NPAGE1-NPAGE8.

The nonvolatile page may be a unit of data that is processed when the media controller 123 attempts to access the second type memory 122. A data size of the nonvolatile page may be equal to or different from a data size of the page. Referring to FIGS. 6, 8, and 9, in operation S71, the media controller 123 may detect the activation of the first or third control signal CS1 or CS3.

The media controller 123 may execute the flush operation, in response to the activation of the first or third control signal CS1 or CS3. For example, in operation S72, the media controller 123 may read the write table WT stored in the buffer memory 126. In operation S73, the media controller 123 may examine a dirty flag of the first page PAGE1 of the first type memory 121, based on the write table WT.

For example, the media controller 123 may detect, from the write table WT, that data are written into the first page PAGE1 of the first type memory 121 after a previous flush operation or after power is supplied to the memory system 100b.

Data, which are newly written in the first page PAGE1 of the first type memory 121, should be stored in the second type memory 122, and thus, the flush operation is needed. Data, which are stored in the second to eighth pages PAGE2-PAGE8 of the first type memory 121, may be data stored in the second type memory 122 or invalid data, and thus, the flush operation is not needed.

In operation S74, the media controller 123 may deliver a read request to the first type memory 121. For example, the media controller 123 may transmit the read request, for the first page PAGE1 requiring the flush operation, to the first type memory 121. In operation S75, the data in the first page PAGE1 of the first type memory 121 may be read in accordance with the read request.

In operation S76, the media controller 123 may transmit a write request to the second type memory 122. For example, the media controller 123 may transmit the write request, for data of the first page PAGE1 read from the first type memory 121, to the second type memory 122.

In operation S77, data, which are newly written in the first type memory 121, may be written in a third nonvolatile page NPAGE3 of the first memory block BLK1 of the second type memory 122. If the data, which are newly written in the first type memory 121, are written in the second type memory 122, the transmission of the data may be terminated.

In operation S78, the media controller 123 may clear dirty marks from the write table WT. In addition, the media controller 123 may clear a mapping relationship between the first type memory 121 and the second type memory 122. If the flush operation is executed, data, which are newly written in the first type memory 121, may be flushed to the second type memory 122, and the first type memory 121 may be evacuated.

According to an exemplary embodiment of the inventive concept, only a part of the data stored in the first type memory 121 (e.g., requiring the flush operation or newly written in the first type memory 121) may be written into the second type memory 122 through the flush operation. Thus, it may be possible to reduce an amount of data that should be transferred. As a result, it may be possible to reduce time required for the flush operation and to reduce latency of the first memory module 120b.

In exemplary embodiments of the inventive concept, the flush operation described with reference to FIG. 9 may be executed, even when the first type memory 121 is full of data. The third storage capacity SC3 of the second type memory 122 is illustrated to have four memory blocks, but the inventive concept is not limited thereto. Furthermore, each memory block is illustrated to have eight nonvolatile pages, but the inventive concept is not limited thereto.

Figure 10:
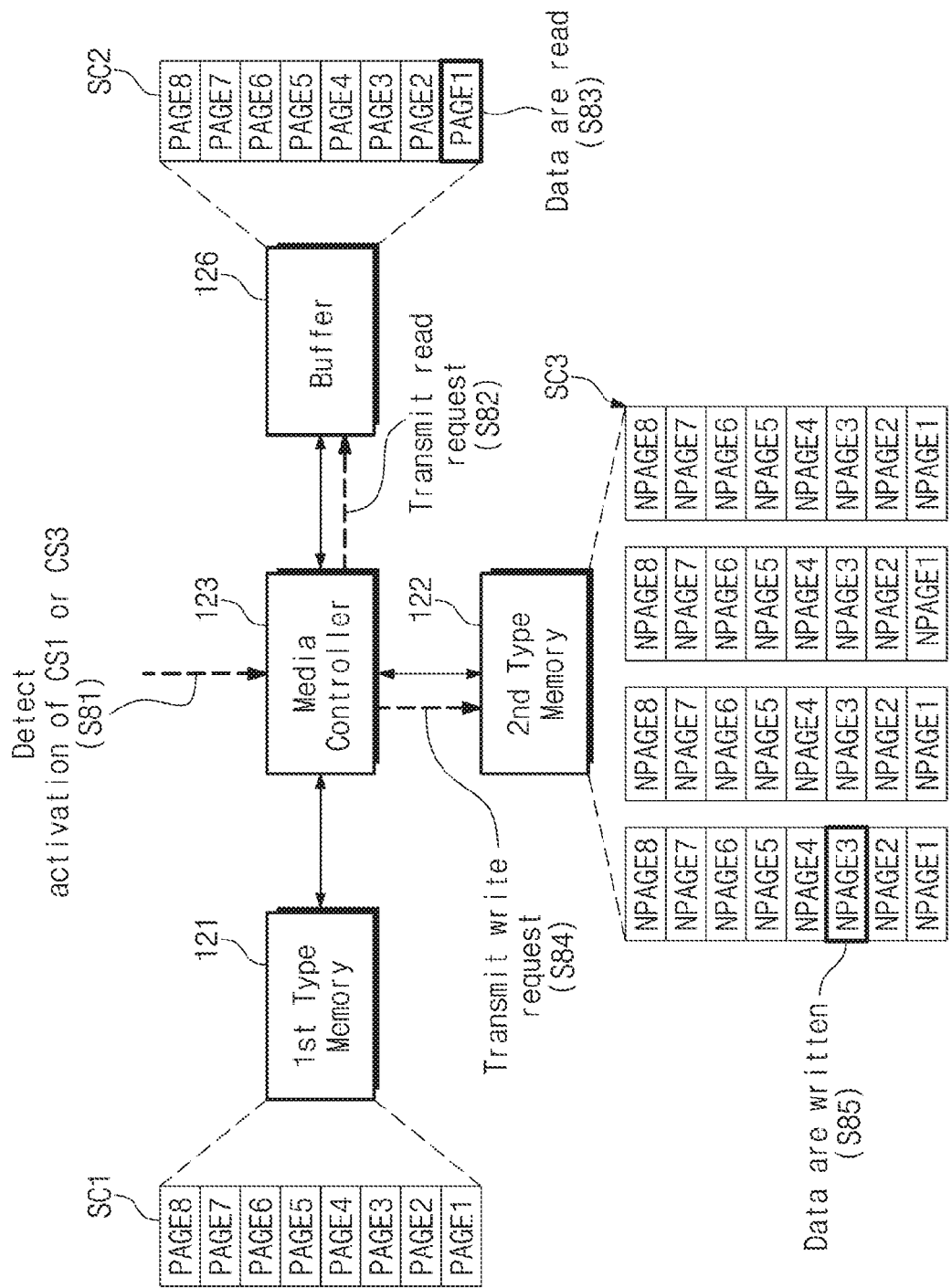
FIG. 10 illustrates a flush operation, which is performed in the first memory module of FIG. 6 and is performed using the buffer memory of FIG. 6 according to an exemplary embodiment of the inventive concept.

FIG. 10 illustrates a flush operation, which is performed in the first memory module of FIG. 6 and is performed using the buffer memory of FIG. 6 according to an exemplary embodiment of the inventive concept. As shown in FIG. 10, the second storage space SC2 of the buffer memory 126 may be divided into first to eighth pages PAGE1-PAGE8. The capacity of each page in the second storage space SC2 may be equal to or different from the capacity of each page in the first storage space SC1.

A capacity of the buffer memory 126 may be equal to or different from a capacity of the first type memory 121. Referring to FIGS. 6 and 8, in operation S81, the media controller 123 may detect the activation of the first or third control signal CS1 or CS3.

In operation S82, the media controller 123 may transmit a read request to the buffer memory 126 in accordance with the activation of the first or third control signal CS1 or CS3. In exemplary embodiments of the inventive concept, the media controller 123 may transmit the read request for valid data that are a part of the data stored in the buffer memory 126 and need to be written in the second type memory 122.

For example, data in the first page PAGE1 of the buffer memory 126 may be valid data. In operation S83, the data in the first page PAGE1 of the buffer memory 126 may be read in accordance with the read request. In operation S84, the media controller 123 may transmit a write request to the second type memory 122.

For example, the media controller 123 may transmit the write request, for the data of the first page PAGE1 read from the buffer memory 126, to the second type memory 122. In operation S85, data may be written in the third nonvolatile page NPAGE3 of the second type memory 122 in accordance with the write request.

Figure 11:
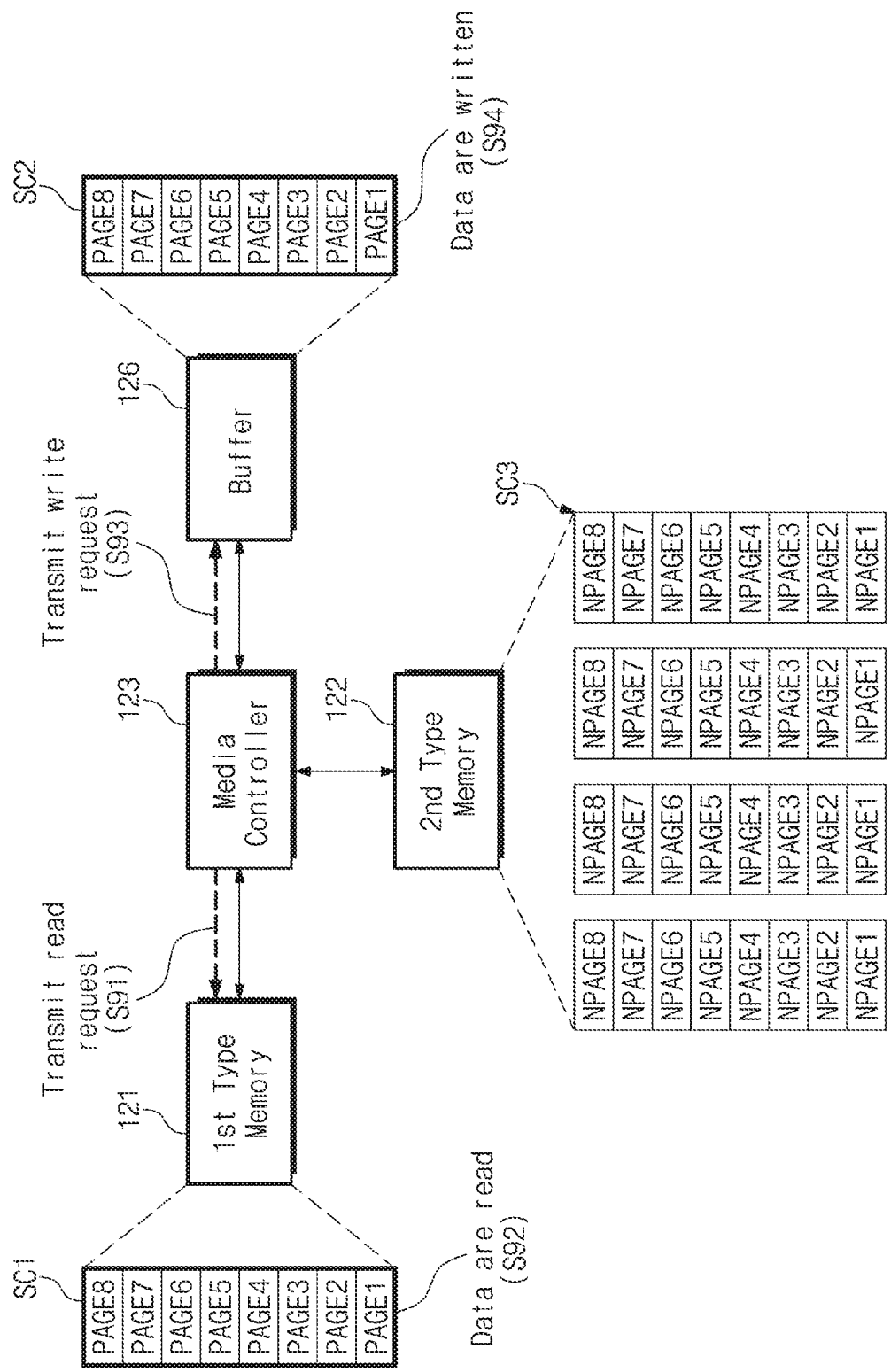
FIG. 11 illustrates a flush operation to be executed after the operation of FIG. 10 according to an exemplary embodiment of the inventive concept.

FIG. 11 illustrates a flush operation to be executed after the operation of FIG. 10 according to an exemplary embodiment of the inventive concept. Referring to FIGS. 6, 10, and 11, in operation S91, the media controller 123 may transmit a read request to the first type memory 121. In operation S92, the data stored in the first type memory 121 may be read in accordance with the read request.

In operation S93, the media controller 123 may transmit a write request to the buffer memory 126. For example, the media controller 123 may transmit the write request, for data read from the first type memory 121, to the buffer memory 126. In operation S94, the data may be written in the buffer memory 126, in accordance with the write request.

The flush operation of the first memory module 120b may be completed by writing the data stored in the buffer memory 126 into the second type memory 122 and by writing the data stored in the first type memory 121 into the buffer memory 126. Thereafter, the media controller 123 may execute a background operation of writing the data stored in the buffer memory 126 into the second type memory 122.

When a free storage capacity of the buffer memory 126 is larger than a size of data read from the first type memory 121, the flush operation of the first memory module 120b may be completed by writing data in the first type memory 121 into the buffer memory 126. In other words, the flush operation may be completed by the operations described with reference to FIG. 11, while omitting the operations described with reference to FIG. 10.

If the data in the first type memory 121 are stored in the buffer memory 126, the media controller 123 may store mapping information between the first type memory 121 and the second type memory 122 as reference information and may clear the mapping information. The media controller 123 may execute a background operation of writing the data stored in the buffer memory 126 into the second type memory 122, using the reference information.

According to an exemplary embodiment of the inventive concept, during the flush operation, the data of the first type memory 121 may be written in the buffer memory 126. The data written in the buffer memory 126 may be transferred to the second type memory 122 through the background operation. Thus, the latency of the flush operation may be reduced.

In exemplary embodiments of the inventive concept, the media controller 123 may monitor a free storage capacity of the first type memory 121. If the free storage capacity of the first type memory 121 is decreased to be lower than a threshold value or below a threshold ratio, the media controller 123 may execute a flush operation.

Figure 12:
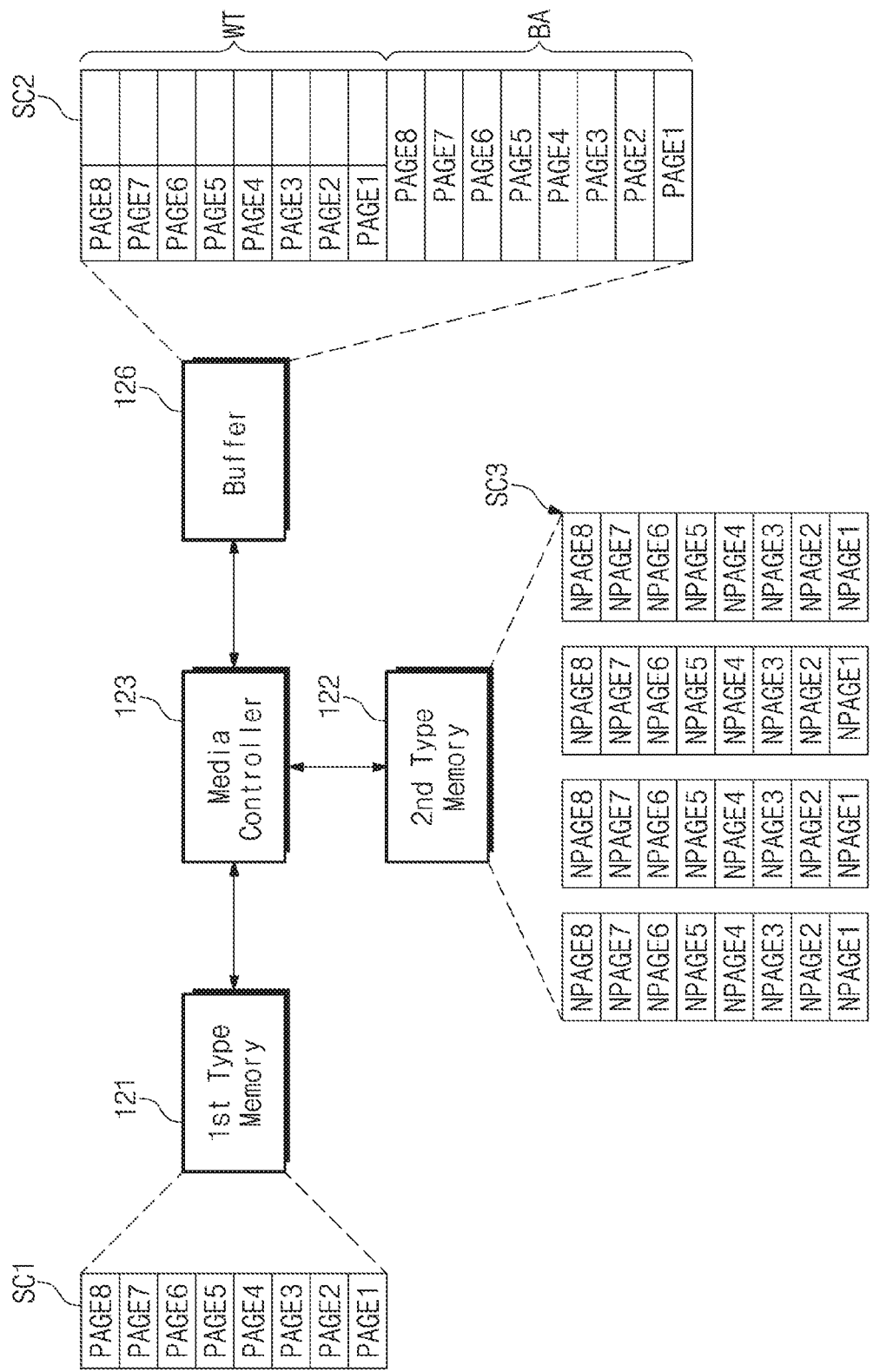
FIG. 12 illustrates an example of using the buffer memory of FIG. 6 for application of the first memory module of FIG. 6 according to an exemplary embodiment of the inventive concept.

FIG. 12 illustrates an example of using the buffer memory of FIG. 6 for application of the first memory module FIG. 6 according to an exemplary embodiment of the inventive concept. Referring to FIG. 12, the second storage space SC2 of the buffer memory 126 may include the write table WT and a buffer area BA. The write table WT may be used to store dirty marks, as described with reference to FIGS. 8 and 9.

If the first or third control signal CS1 or CS3 is activated, the media controller 123 may refer to the write table WT. The media controller 123 may read data, which are stored in the first type memory 121 and are associated with a dirty mark of the write table WT, and may store the read data in the buffer area BA of the buffer memory 126.

If a free storage capacity of the buffer memory 126 is insufficient, the media controller 123 may execute an operation of reading data from the buffer area BA of the buffer memory 126 and writing the read data in the second type memory 122. If the flush operation is finished, the media controller 123 may transfer data in the buffer memory 126 to the second type memory 122 through the background operation.

In exemplary embodiments of the inventive concept, the central control block 110 may monitor a free storage capacity of the first memory module 120a or 120b. If a free storage capacity of the first type memory 121 is decreased to be lower than a threshold value or below a threshold ratio, the central control block 110 may activate the first or third control signal CS1 or CS3 to execute a flush operation.

According to exemplary embodiments of the inventive concept, a semiconductor memory module is configured to flush some data, which are stored in a random access memory, to a nonvolatile memory, using a write table. In addition, the semiconductor memory module is also configured to store data, in which a cache miss occurs, in a buffer memory. This may make it possible to realize a high speed semiconductor memory module. Furthermore, according to exemplary embodiments of the inventive concept, in the case where an access error occurs, a memory system is configured to instruct a semiconductor memory module to execute a flush operation. This may make it possible to realize a high speed memory system.

Figure 13:
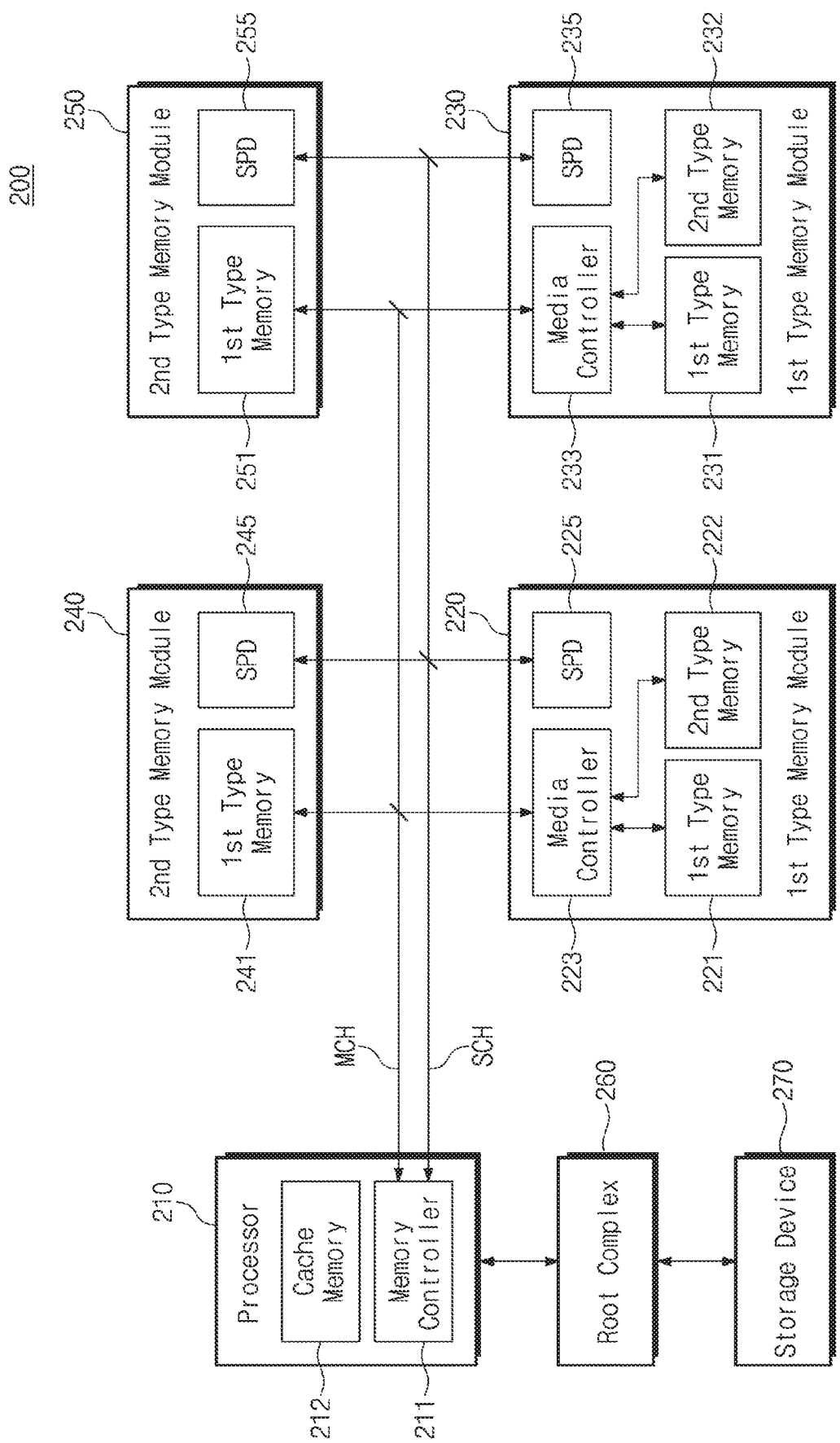
FIG. 13 is a block diagram illustrating a memory system according to an embodiment of the inventive concepts.

FIG. 13 is a block diagram illustrating a memory system 200 according to an embodiment of the inventive concepts. For example, the memory system 200 may include a server such as an application server, a client server, or a data server. For another example, the memory system 200 may include a personal computer or a workstation.

Referring to FIG. 13, the memory system 200 may include a processor 210, first to fourth memory modules 220 to 250, a root complex 260, and a storage device 270. The processor 210 may control components of the memory system 200 and operations of the components. The processor 210 may execute an operating system and applications and may process data by using the operating system or the applications.

The processor 210 may include a memory controller 211 and a cache memory 212. The memory controller 211 may access the first to fourth memory modules 220 to 250 through main channels MCH and sub-channels SCH. The cache memory 212 may include a high-speed memory such as a static random access memory (SRAM).

The first to fourth memory modules 220 to 250 may be connected with the memory controller 211 through the main channels MCH and the sub-channels SCH. The main channels MCH may be channels which are used to store data to the memory modules 220 to 250 (e.g., semiconductor memory modules) or to read data from the memory modules 220 to 250. The main channels MCH may include channels which are respectively provided with regard to the first to fourth memory modules 220 to 250.

The sub-channels SCH may provide additional functions associated with the first to fourth memory modules 220 to 250 that are different from storing or reading data to or from the first to fourth memory modules 220 to 250. For example, the first to fourth memory modules 220 to 250 may provide the memory controller 211 with their own unique information through the sub-channels SCH. The sub-channels SCH may include channels which are respectively provided with regard to the first to fourth memory modules 220 to 250.

The first to fourth memory modules 220 to 250 may be used as a main memory of the memory system 200. The first to fourth memory modules 220 to 250 may communicate with the memory controller 211 in compliance with one of standards of memory modules such as a dual in-line memory module (DIMM), a registered DIMM (RDIMM), and/or a load reduced DIMM (LRDIMM).

The root complex 260 may provide channels through which the processor 210 accesses various peripheral devices. For example, the storage device 270 may be connected to the root complex 260. The storage device 270 may include, for example, a hard disk drive, an optical disk drive, a solid state drive, etc.

In an embodiment, peripheral devices connected to the root complex 260 are not limited to the storage device 270. For example, the root complex 260 may be connected to various devices such as a modem, a graphics processing unit (GPU), and a neuromorphic processor.

The processor 210 may hierarchically manage the cache memory 212, the first to fourth memory modules 220 to 250 being the main memory, and the storage device 270. For example, the processor 210 may load data stored in the storage device 270 to the main memory including the first to fourth memory modules 220 to 250. The processor 210 may flush data of the data stored in the main memory that is to be backed up to the storage device 270.

A portion of a storage region of the main memory including the first to fourth memory modules 220 to 250 may be mapped onto the cache memory 212. When a specific storage space of the main memory is to be accessed, the processor 210 may determine whether the specific storage space has been mapped onto the cache memory 212.

In the case where the specific storage space has been mapped onto the cache memory 212, the processor 210 may access the specific storage space of the cache memory 212. In the case where the specific storage space is not mapped onto the cache memory 212, the processor 210 may map (or fetch) a specific storage space of the first to fourth memory modules 220 to 250 onto the cache memory 212.

When a storage space of the cache memory 212 is insufficient, the processor 210 may release a storage space previously mapped onto the cache memory 212. In the case where data of a storage space to be released have been updated, the processor 210 may flush the updated data to the first to fourth memory modules 220 to 250.

The first to fourth memory modules 220 to 250 may include heterogeneous memory modules. For example, the first and second memory modules 220 and 230 may be first type memory modules. The third and fourth memory modules 240 and 250 may be second type memory modules.

The first memory module 220 may include a first type memory 221, a second type memory 222, a media controller 223, and a serial presence detect (SPD) device 225. The second memory module 230 may include a first type memory 231, a second type memory 232, a media controller 233, and an SPD device 235. Below, the first type memory modules 220 and 230 will be described with reference to the first memory module 220.

The first type memory 221 may include a high-speed volatile memory, such as, for example, a dynamic random access memory (DRAM). The second type memory 222 may include a nonvolatile memory which is slower in speed than the first type memory 221 and is greater in capacity than the first type memory 221. For example, the second type memory 222 may include a flash memory, a phase change memory, a ferroelectric memory, a magnetic memory, a resistive memory, etc.

The media controller 223 may transfer an access command, which is transferred through a corresponding channel of the main channels MCH from an external host device, for example, the memory controller 211 and/or the processor 210, to the first type memory 221 or the second type memory 222. Depending on a command, the media controller 223 may exchange data with the external host device through the corresponding channel of the main channels MCH.

The media controller 223 may provide a storage capacity and/or a storage space of the second type memory 222 to the external host device. The media controller 223 may use the first type memory 221 as a cache memory of the second type memory 222.

For example, the media controller 223 may map a portion of a storage space of the second type memory 222 onto the first type memory 221. In the case where a storage space of the second type memory 222 associated with an access command from the external host device has been mapped onto the first type memory 221, the media controller 223 may transfer the access command to the first type memory 221.

In the case where a storage space of the second type memory 222 associated with an access command from the external host device is not mapped onto the first type memory 221, the media controller 223 may map (or backup) the storage space onto the first type memory 221 from the second type memory 222.

When a storage space of the first type memory 221 is insufficient, the media controller 223 may release a storage space previously mapped onto the first type memory 221. In the case where data of a storage space to be released have been updated, the media controller 223 may flush the updated data to the second type memory 222.

The SPD device 225 may communicate with the external host device through a corresponding channel of the sub-channels SCH. For example, when the first memory module 220 is initialized, the SPD device 225 may provide information stored therein to the external host device through the corresponding channel of the sub-channels SCH.

For example, the SPD device 225 may store information about a storage capacity to be provided to the external host device as a storage space of the first memory module 220. For example, the SPD device 225 may store information about the storage capacity of the second type memory 222. During initialization, the SPD device 225 may provide information about the storage capacity of the second type memory 222 to the external host device.

For example, the capacity information stored in the SPD device 225 may include information about a storage capacity of the second type memory 222. The storage capacity of the second type memory 222 may include a user capacity, a meta capacity, and/or a reserved capacity. The user capacity may be a storage capacity which the second type memory 222 provides to the external host device.

The meta capacity may be a storage capacity which is used to store various meta information for managing the second type memory 222 and may not be disclosed to the external host device. The reserved capacity may be a storage capacity which is secured to manage the second type memory 222 and which may not be disclosed to the external host device.

The capacity information stored in the SPD device 225 may include information about the user capacity of the second type memory 222. Below, even though not separately described, the capacity of the second type memory 222 may be understood as indicating the user capacity of the second type memory 222.

The third memory module 240 may include a first type memory 241 and an SPD device 245. The fourth memory module 250 may include a first type memory 251 and an SPD device 155. Below, the second type memory modules 240 and 250 will be described with reference to the third memory module 240.

The first type memory 241 may include a dynamic random access memory like the first type memory 221 of the first memory module 220. In some embodiments, the first type memory 241 of the third memory module 240 may be a high speed volatile memory of a different type than the first type memory 221 of the first memory module 220. The SPD device 245 may communicate with an external host device, for example, the memory controller 211 and/or the processor 210, through a corresponding channel of the sub-channels SCH. For example, when the third memory module 240 is initialized, the SPD device 245 may provide information stored therein to the external host device through the corresponding channel of the sub-channels SCH.

For example, the SPD device 245 may store information about a storage capacity provided to the external host device as a storage space of the third memory module 240. For example, the SPD device 245 may store information about the storage capacity of the first type memory 241. During initialization, the SPD device 245 may provide information about the storage capacity of the first type memory 241 to the external host device.

When a power is supplied to the memory system 200, the memory controller 211 may perform initialization on the first to fourth memory modules 220 to 250. For example, the SPD devices 225 to 155 of the first to fourth memory modules 220 to 250 may provide the capacity information to the memory controller 211 through the sub-channels SCH, respectively.

The SPD devices 225 and 235 of the first type memory modules 220 and 230 may provide the pieces of capacity information of the second type memories 222 and 232 to the memory controller 211, respectively. The SPD devices 245 and 155 of the second type memory modules 240 and 250 may provide the pieces of capacity information of the first type memories 241 and 251 to the memory controller 211, respectively. For example, the memory controller 211 may read the storage capacities from the SPD devices 225 to 155, respectively.

Figure 14:
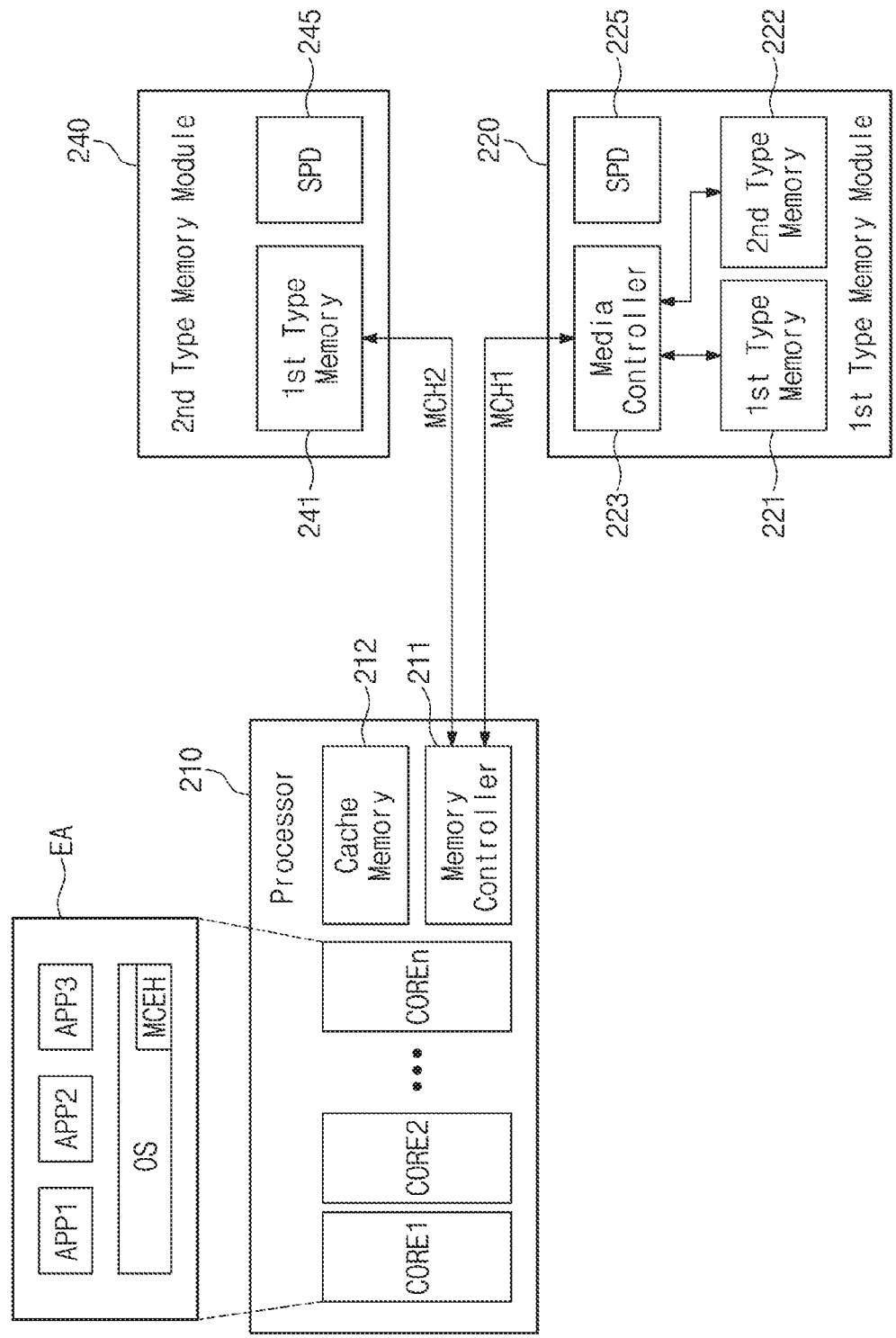
FIG. 14 is a diagram illustrating an example in which a processor accesses first and third memory modules.

FIG. 14 is a diagram illustrating an example in which the processor 210 accesses the first and third memory modules 220 and 240. For simplicity, any other components except for the processor 210, the first memory module 220, and the third memory module 240 are omitted.

Referring to FIGS. 13 and 14, the processor 210 may include first to n-th cores CORE1 to COREn. That is, the processor 210 may be a multi-core processor. Objects which are executed by the first to n-th cores CORE1 to COREn are illustrated in an execution area EA.

Referring to the execution area EA, an operating system OS may be executed in the processor 210. Also, on the basis of the support of the operating system OS, first to third applications APP1 to APP3 may be executed in the processor 210.

The operating system OS may include and/or be in communication with a machine check exception handler MCEH. The machine check exception handler MCEH may process an error occurring when the memory controller 211 accesses the first to fourth memory modules 220 to 250. An operation of the machine check exception handler MCEH will be more fully described with reference to FIG. 15.

The memory controller 211 may access the first to fourth memory modules 220 to 250 depending on a request of the first to n-th cores CORE1 to COREn. For example, the memory controller 211 may access the first memory module 220 through a first main channel MCH1, and may access the third memory module 240 through a second main channel MCH2.

Figure 15:
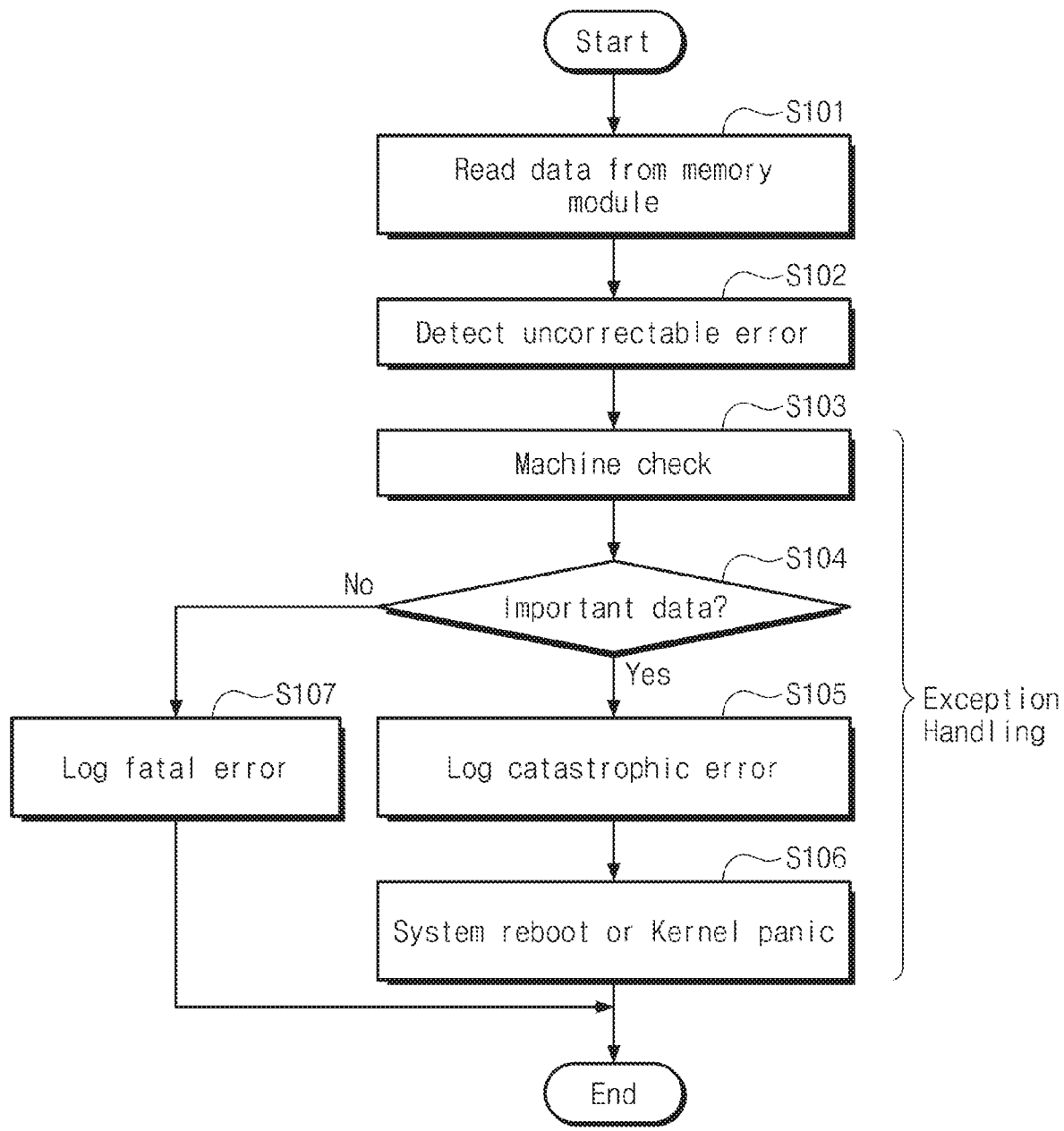
FIG. 15 is a flowchart illustrating an operating method of a memory system according to a first example of the inventive concepts.

FIG. 15 is a flowchart illustrating an operating method of the memory system 200 according to a first example of the inventive concepts. Referring to FIGS. 13 to 15, in operation S101, the memory controller 211 may read data from one memory module of the first to fourth memory modules 220 to 250. For example, the memory controller 211 may read data depending on a request of the first to third applications APP1 to APP3 or the operating system OS.

In operation S102, the memory controller 211 may detect an uncorrectable error. For example, the memory controller 211 may perform error correction decoding on the read data. Depending on a result of the error correction decoding, the memory controller 211 may correct an error or may detect an uncorrectable error.

For example, when the read data includes a number of error bits that exceeds the number of error bits correctable through the error correction decoding, the uncorrectable error may be detected. For example, the memory controller 211 may perform a retry of the read operation for a specific number of times. In the case where the uncorrectable error is detected even though the read retry is repeatedly performed, exception handling may be performed.

For example, the exception handling may be executed as one core of the first to n-th cores CORE1 to COREn in the processor 210 arrives at and executes the machine check exception handler MCEH. The exception handling may include operation S103 to operation S107.

In operation S103, the machine check exception handler MCEH may perform a machine check. For example, the machine check may include determining whether the memory controller 211 or the first memory module 220 is operating normally or abnormally. The machine check may include determining whether the detected error is a fatal error or a catastrophic error.

For example, when an uncorrectable error occurs in important data, the detected error may be determined to be the catastrophic error. Data which are needed to control or operate the memory system 200 may be the important data. Data which are requested by the first to third applications APP1 to APP3 or the operating system OS and will be used by the first to third applications APP1 to APP3 or the operating system OS may include the important data.

For example, when an uncorrectable error occurs in unimportant data, the detected error may be determined to be the fatal error. Data which are not associated with controlling or operating the memory system 200 may be the unimportant data. Data which are requested by the first to third applications APP1 to APP3 or the operating system OS and will not be used by the first to third applications APP1 to APP3 or the operating system OS may be the unimportant data.

When it is determined in operation S104 that the uncorrectable data are important data, the machine check exception handler MCEH performs operation S105. In operation S105, the machine check exception handler MCEH may record the event that the catastrophic error occurred in an error log. Afterwards, in operation S106, a system reboot or a kernel panic of the memory system 200 may occur.

When it is determined in operation S104 that the uncorrectable data are unimportant data, the machine check exception handler MCEH performs operation S107. In operation S107, the machine check exception handler MCEH may record the event that the fatal error occurred in the error log.

Figure 16:
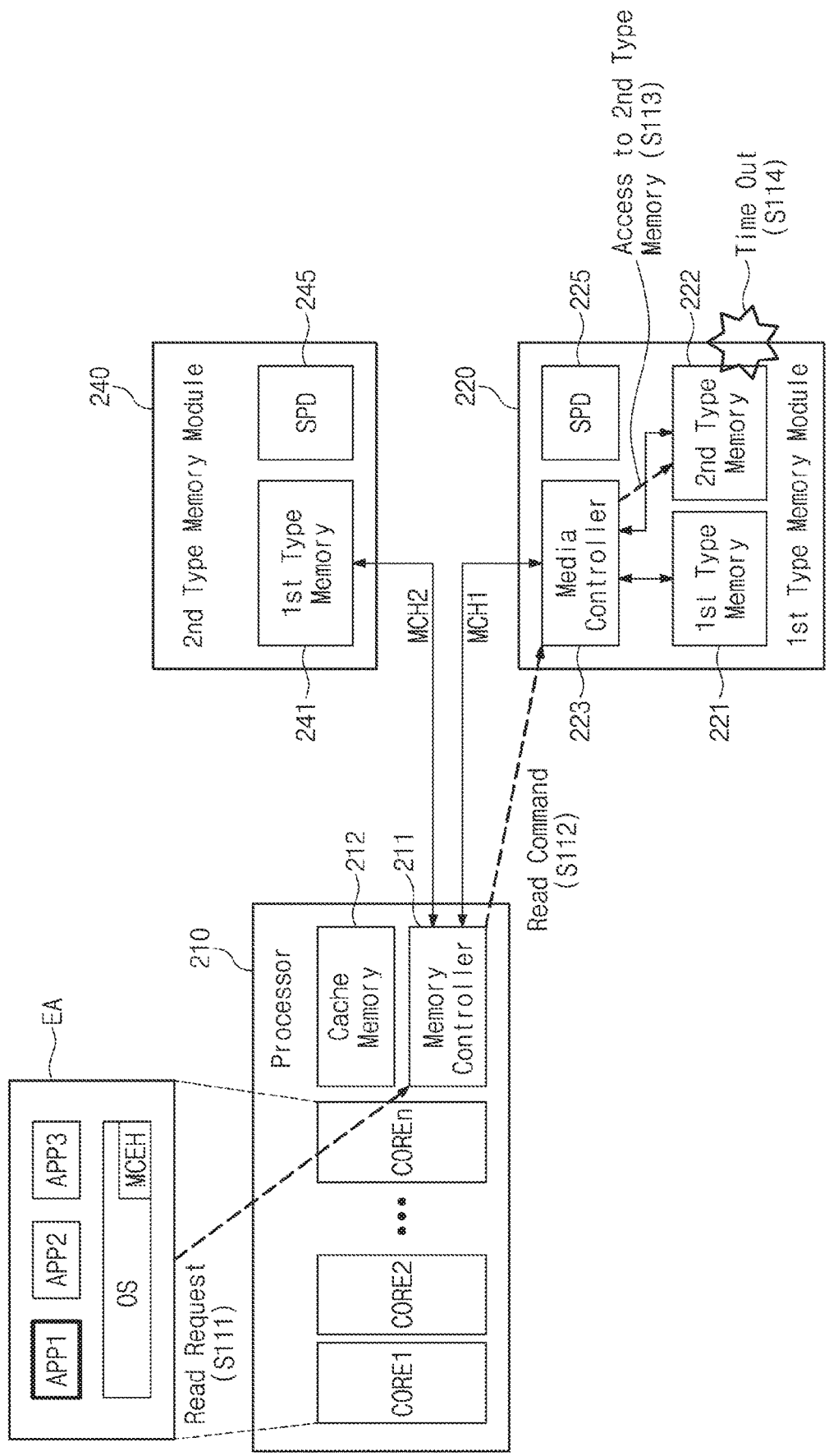
FIG. 16 is a diagram illustrating an example of reading data from a first memory module.

FIG. 16 is a diagram illustrating an example of reading data from the first memory module 220. Referring to FIGS. 13 and 16, in operation S111, for example, the first application APP1 may transfer a read request for the first memory module 220 to the memory controller 211. The read request may be transferred to the memory controller 211 through the operating system OS and one or more of the first to n-th cores CORE1 to COREn.

In operation S112, the memory controller 211 may transfer a read command to the first memory module 220. In operation S113, the read command may cause an access to the second type memory 222. For example, in the case where data corresponding to the read command are not mapped onto the first type memory 221, the media controller 223 may read the data from the second type memory 222 and may map the read data onto the first type memory 221.

The procedure in which the memory controller 211 accesses the first memory module 220 is the same as the procedure in which the memory controller 211 accesses the third memory module 240. For example, a time condition from a time when the memory controller 211 transfers the read command to the first memory module 220 to a time when the memory controller 211 receive data may be determined based on an access speed of the first type memory 221 or 241.

An access speed of the second type memory 222 is slower than the access speed of the first type memory 221. Accordingly, in operation S114, a time out event in which data are not read from the second type memory 222 until a time corresponding to the time condition of the memory controller 211 elapses may occur.

For example, even though the first memory module 220 does not transfer data to the first main channel MCH1, the memory controller 211 may detect data from voltages of the first main channel MCH1. In this case, the memory controller 211 may determine that data having an uncorrectable error are received.

For another example, as the time corresponding to the time condition elapses, the first memory module 220 may transfer dummy data to the first main channel MCH1. The memory controller 211 may receive the dummy data through the first main channel MCH1. The memory controller 211 may determine that the dummy data have an uncorrectable error. For example, the dummy data may be data having a specific pattern or any pattern.

Figure 17:
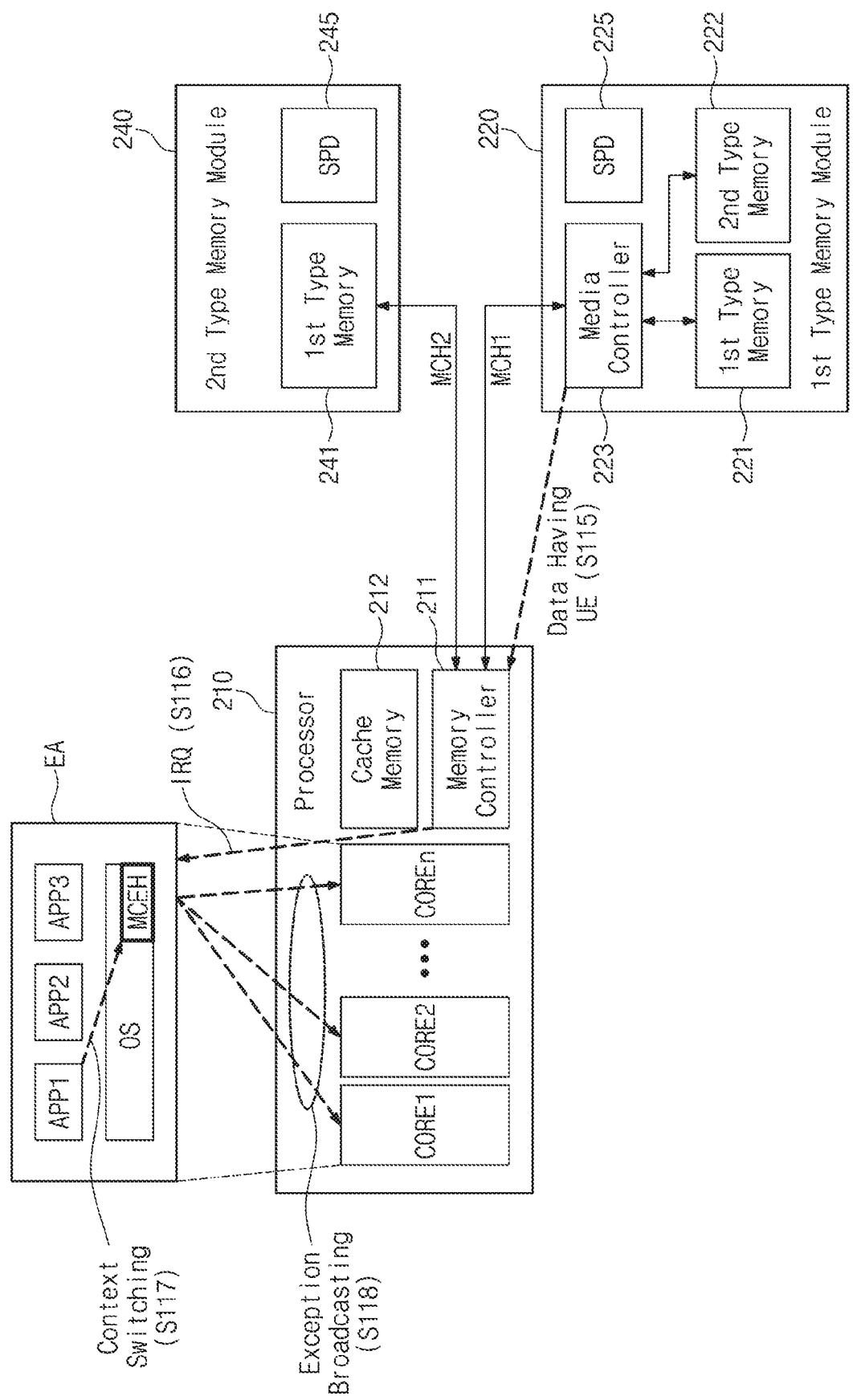
FIG. 17 is a diagram illustrating an example in which exception handling is performed on a first memory module.

FIG. 17 is a diagram illustrating an example in which exception handling is performed on the first memory module 220. In an embodiment, FIG. 17 shows operations following operation S114 of FIG. 16. Referring to FIGS. 13 and 17, in operation S115, the memory controller 211 receives data having an uncorrectable error UE from the first memory module 220.

For example, as described above, the media controller 223 may not transfer data to the memory controller 211 or may transfer dummy data to the memory controller 211. The memory controller 211 may perform error correction decoding on the read data and may determine that the read data have an uncorrectable error.

When the uncorrectable error is detected, in operation S116, the memory controller 211 may output an interrupt signal IRQ. The interrupt signal IRQ may be transferred to at least one core of the first to n-th cores CORE1 to COREn. The interrupt signal IRQ may be transferred to the first application APP1 or the operating system OS of the execution area EA through the at least one core.

In response to the interrupt signal IRQ, in operation S117, context switching from the first application APP1 to the operating system OS and/or the machine check exception handler MCEH may be made. The operating system OS and/or the machine check exception handler MCEH may perform exception broadcasting of notifying the first to n-th cores CORE1 to COREn that the exception handling is required due to occurrence of exception.

For example, the exception broadcasting may be a call which allows the first to n-th cores CORE1 to COREn to execute the machine check exception handler MCEH. In some embodiments, the call may be provided as a hardware or software interrupt. Depending on the exception broadcasting, the first to n-th cores CORE1 to COREn may interrupt operations being currently performed and may access the machine check exception handler MCEH.

For example, the operations being currently performed may include processes, threads, tasks, operations, and/or a series of codes or commands. Each operation may include one or more interrupt points. At each interrupt point, a core which performs a relevant operation may be allowed to interrupt and resume the execution of the operation.

One core of the first to n-th cores CORE1 to COREn may execute the machine check exception handler MCEH to perform the exception handling. A core which performs the exception handling may be a monarchy core. The remaining cores of the first to n-th cores CORE1 to COREn other than the monarchy core may not execute the machine check exception handler MCEH.

The memory controller 211 accesses the first type memory 221 of the first memory module 220. The first type memory 221 may be a cache memory of the second type memory 222. That data read from the first memory module 220 are uncorrectable means that the corresponding data stored in the first type memory 221 have an uncorrectable error or that the corresponding data are not mapped onto the first type memory 221.

In the case where the data stored in the first type memory 221 have an uncorrectable error, the error may be cured by rewriting the corresponding data stored in the second type memory 222 to the first type memory 221. In the case where the corresponding data are not mapped onto the first type memory 221, the error may be cured by mapping the corresponding data stored in the second type memory 222 onto the first type memory 221.

That is, when the access to the second type memory 222 is completed, exact data may be read from the first memory module 220. However, according to the method described with reference to FIG. 15, when the access to the second type memory 222 is made in the first memory module 220, the memory system 200 (refer to FIG. 13) may enter the kernel panic or the system reboot.

To prevent the kernel panic or the system reboot from being performed when the access to the second type memory 222 is made in the first memory module 220, the memory system 200 according to an embodiment of the inventive concepts may perform the exception handling for the first memory module 220 depending on a second example different from the first example of FIGS. 15 through 18.

Figure 18:
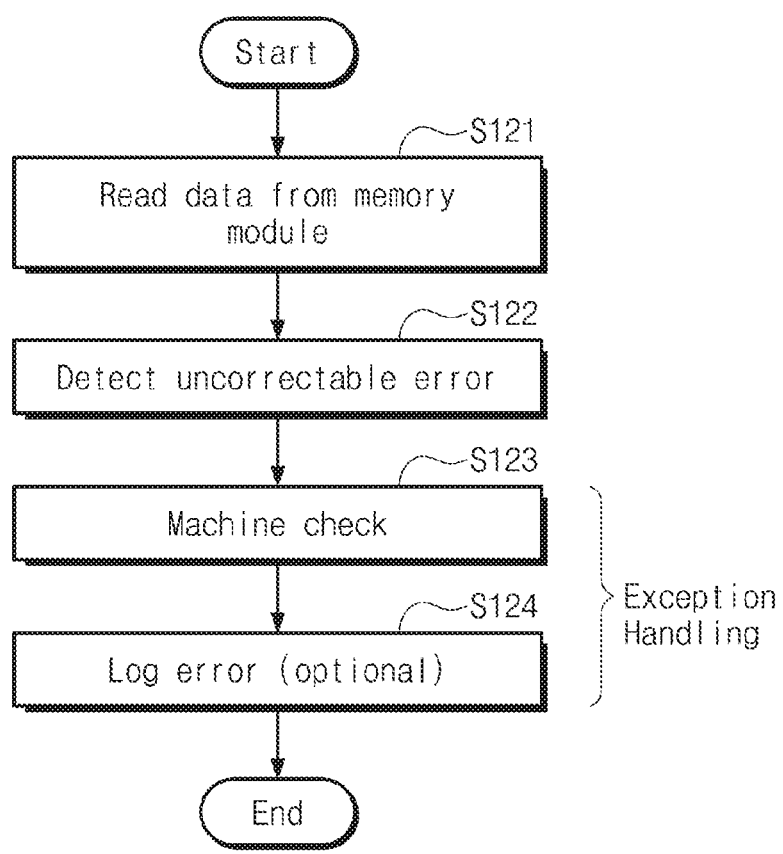
FIG. 18 is a flowchart illustrating an operating method according to a second example of the inventive concepts.

FIG. 18 is a flowchart illustrating an operating method according to a second example of the inventive concepts. Referring to FIGS. 13, 15, and 18, operation S121 to operation S123 are the same as operation S101 to operation S103 of FIG. 15. Thus, additional description associated with operation S121 to operation S123 will be omitted to avoid redundancy.

In operation S124, the machine check exception handler MCEH may record the event that an error associated with the first memory module 220 occurs, in the error log. For example, the machine check exception handler MCEH may record the fatal error or the catastrophic error in the error log. In an embodiment, operation S124 may be selectively performed. Operation S124 may be performed or may be omitted without execution. In an embodiment, in the machine check of operation S123, a function of determining whether the detected error is the fatal error or the catastrophic error may be omitted.

When the exception handling is completed, context switching from the machine check exception handler MCEH to the first application APP1 is performed. As described with reference to operation S111 of FIG. 16, the first application APP1 may again transfer the read request for the first memory module 220.

A first time may be taken to perform the context switching from the first application APP1 to the machine check exception handler MCEH. A second time may be taken to perform the machine check (operation S123). A third time may be taken to perform the context switching from the machine check exception handler MCEH to the first application APP1.

While the first time, the second time, and the third time pass, the media controller 223 may map data corresponding to the read command (refer to operation S112 of FIG. 16) onto the first type memory 221 from the second type memory 222. Accordingly, in the case where the memory controller 211 again transfers the read command to the first memory module 220 as the first application APP1 again transfers the read request, the memory controller 211 may read exact data from the first memory module 220.

As described with reference to FIG. 18, upon performing the exception handling on the first memory module 220, the machine check exception handler MCEH may not determine the fatal error or the catastrophic error and may not enter the kernel panic or the system reboot. Accordingly, even though the access to the second type memory 222 is required in the first memory module 220, the memory system 200 may obtain exact data from the first memory module 220 without experiencing the kernel panic or the system reboot.

In an embodiment, the exception handling according to the second example described with reference to FIG. 18 may be applied to the first type memory modules 220 and 230. Also, the exception handling according to the first example described with reference to FIG. 15 may be applied to the second type memory modules 240 and 250.

Figure 19:
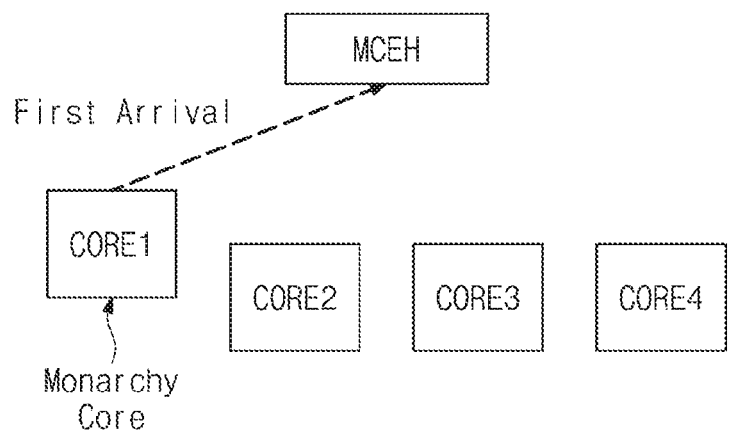
FIG. 19 is a diagram illustrating an example in which a monarchy core is assigned.

FIG. 19 is a diagram illustrating an example in which a monarchy core is assigned. In an embodiment, an example in which a monarchy core of the first to fourth cores CORE1 to CORE4 is assigned is illustrated in FIG. 19. Referring to FIGS. 17 and 19, the first to fourth cores CORE1 to CORE4 may interrupt operations being currently performed depending on the exception broadcasting (operation S118).

However, timings when the first to fourth cores CORE1 to CORE4 interrupt the operations may vary with kinds of the operations which the first to fourth cores CORE1 to CORE4 are performing. For example, interrupt points of threads which the first to fourth cores CORE1 to CORE4 is performing may be different from each other.

In an embodiment, the first core CORE1 of the first to fourth cores CORE1 to CORE4 may first interrupt an operation being performed and may respond to a call. The first core CORE1 which first responds to the call may be considered as first arriving at the machine check exception handler MCEH.

The first core CORE1 which first arrives at the machine check exception handler MCEH may be specified (or assigned) as the monarchy core. The first core CORE1 may execute the machine check exception handler MCEH to perform the exception handling described with reference to FIG. 15 or 18.

Figure 20:
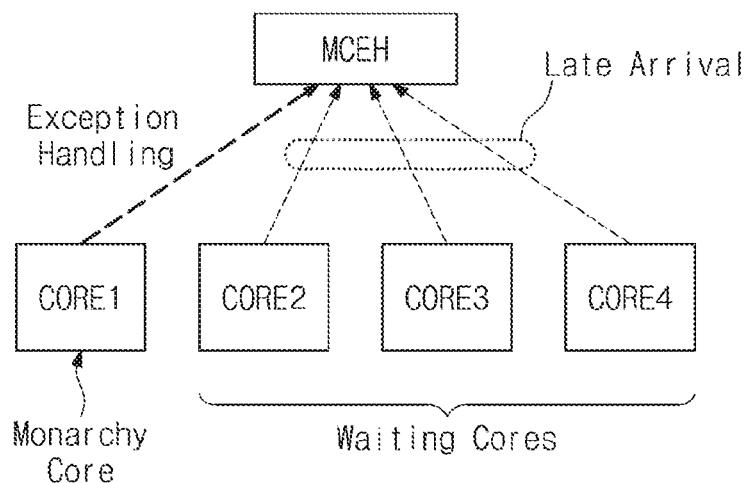
FIG. 20 is a diagram illustrating a first example in which remaining cores are managed.

FIG. 20 is a diagram illustrating a first example in which remaining cores are managed. Referring to FIG. 20, the second to fourth cores CORE2 to CORE4 may arrive at the machine check exception handler MCEH later than the first core CORE1. In an embodiment, the second to fourth cores CORE2 to CORE4 may wait until the first core CORE1 completes the exception handling.

The second to fourth cores CORE2 to CORE4 may be waiting cores. When the first core CORE1 completes the exception handling, the first to fourth cores CORE1 to CORE4 may return to the operations previously performed and interrupted. For example, when the exception handling is completed without the kernel panic or the system reboot, the first to fourth cores CORE1 to CORE4 may return to the operations previously performed and interrupted.

Like the exception handling described with reference to FIG. 18, in the case where the exception handling is completed without the kernel panic or the system reboot, an operation in which the second to fourth cores CORE2 to CORE4 wait causes a waste of resources. To prevent the waste of resources, the memory system 200 according to an embodiment of the inventive concepts provides a new algorithm to remove waiting cores.

Figure 21:
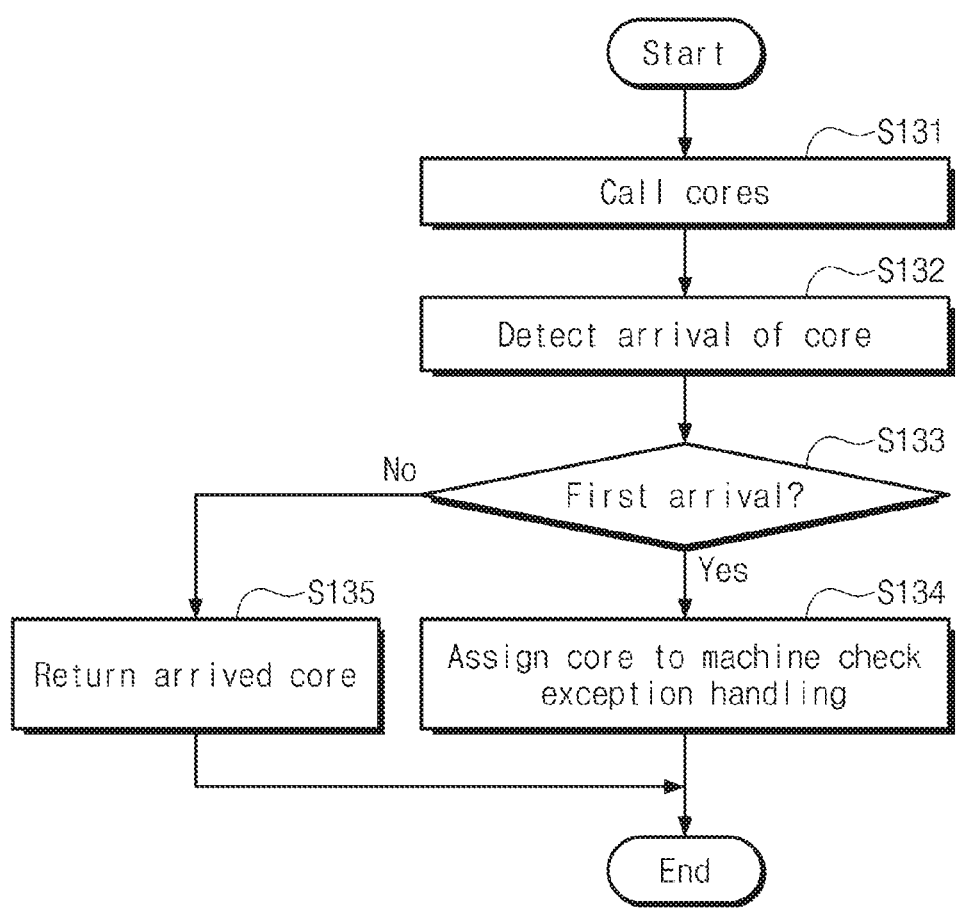
FIG. 21 is a diagram illustrating an example in which cores are managed for exception handling according to an embodiment of the inventive concepts.

FIG. 21 is a diagram illustrating an example in which cores are managed for exception handling according to an embodiment of the inventive concepts. Referring to FIGS. 17 and 21, in operation S131, the operating system OS or the machine check exception handler MCEH may call the cores CORE1 to COREn through the exception broadcasting (operation S118).

In operation S132, the machine check exception handler MCEH may detect the arrival of a core. For example, when a specific core interrupts an operation being performed and responds to the call, the specific core may be considered as an arrived core. In operation S133, the operating system OS or the machine check exception handler MCEH may determine whether an arrived core is a first core.

When it is determined in operation S133 that the arrived core is the first core to arrive, operation S134 is performed. In operation S134, the operating system OS and/or the machine check exception handler MCEH may assign (or specify) the arrived core to the machine check exception handler MCEH. For example, the arrived core may perform the exception handling by executing codes of the machine check exception handler MCEH. For example, the arrived core may perform the exception handling depending on the method described with reference to FIG. 15 or 18.

When it is determined in operation S133 that the arrived core is not the first core to arrive, operation S135 is performed. In operation S135, the operating system OS and/or the machine check exception handler MCEH may allow the arrived core to return to the interrupted operation. The arrived core may return to the interrupted operation to resume the interrupted operation.

Figure 22:
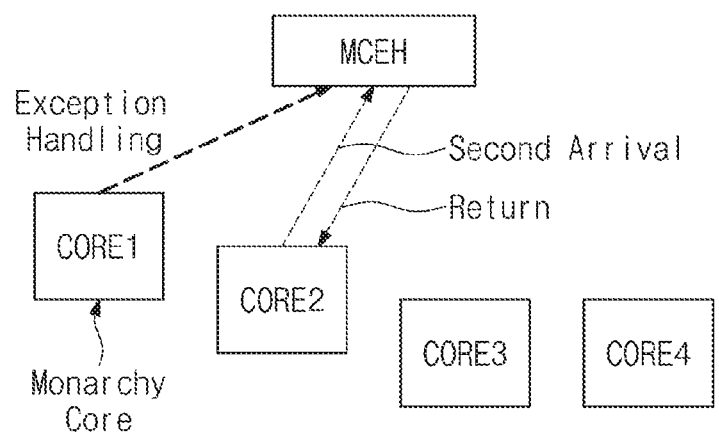
FIG. 22 is a diagram illustrating a second example in which remaining cores are managed.

FIG. 22 is a diagram illustrating a second example in which remaining cores are managed. In an embodiment, an example in which remaining cores are managed after the first core CORE1 is specified as a monarchy core in FIG. 19 is illustrated in FIG. 22. Referring to FIGS. 13 and 22, the second to fourth cores CORE2 to CORE4 may arrive at the machine check exception handler MCEH later than the first core CORE1.

In an embodiment, the second core CORE2 may arrive at the machine check exception handler MCEH just following the first core CORE1, that is, for the second time. As the second core CORE2 recognizes that the first core CORE1 is already specified as a monarchy core, the second core CORE2 may return to the interrupted operation and may resume the interrupted operation (operation S135 of FIG. 21). For example, the second core CORE2 may execute codes of the interrupted operation from an interrupt point of the interrupted operation.

Likewise, the third and fourth cores CORE3 and CORE4 may arrive at the machine check exception handler MCEH later than the first core CORE1. As the third and fourth cores CORE3 and CORE4 recognize that the first core CORE1 is already specified as a monarchy core, the third and fourth cores CORE3 and CORE4 may respectively return to the interrupted operations and may respectively resume the interrupted operations (operation S135 of FIG. 21).

As described with reference to FIG. 18, upon performing the exception handling on the first memory module 220, the fatal error or the catastrophic error may not occur. If the exception handling for the first memory module 220 is completed, the monarchy core returns to the interrupted operation. Since the fatal error or the catastrophic error does not occur upon performing the exception handling on the first memory module 220, the second to fourth cores CORE2 to CORE4 need to wait the completion of the exception handling.

Accordingly, the second to fourth cores CORE2 to CORE4 may return to the interrupted operations while the first core CORE1 completes the exception handling. As the second to fourth cores CORE2 to CORE4 return to the interrupted operations more easily, a waste of resources of the second to fourth cores CORE2 to CORE4 is reduced and/or prevented, and the performance of the memory system 200 is improved.

In an embodiment, the first type memory modules 220 and 230 may store (or back up) data to the second type memories 222 and 232, respectively, and the media controllers 223 and 233 may include separate error correction means for the second type memories 222 and 232. Accordingly, the first type memory modules 220 and 230 may secure error-free data.

That is, as described with reference to FIG. 18, the method in which the kernel panic and the system reboot do not occur in the exception handling may be applied to the first type memory modules 220 and 230. Also, as described with reference to FIG. 22, the method in which the second to fourth cores CORE2 to CORE4 return to the interrupted operations while the first core CORE1 performs the exception handling may be applied to the first type memory modules 220 and 230.

In contrast, the second type memory modules 240 and 250 include only the first type memories 241 and 251, and do not include error correction means for the first type memories 241 and 251. Accordingly, an uncorrectable error may occur in data stored in the first type memories 241 and 251.

That is, as described with reference to FIG. 15, the method in which the kernel panic and the system reboot occur in the exception handling may be applied to the second type memory modules 240 and 250. Also, as described with reference to FIG. 20, the method in which the second to fourth cores CORE2 to CORE4 wait to cope with the kernel panic or the system reboot while the first core CORE1 performs the exception handling may be applied to the first type memory modules 220 and 230.

Figure 23:
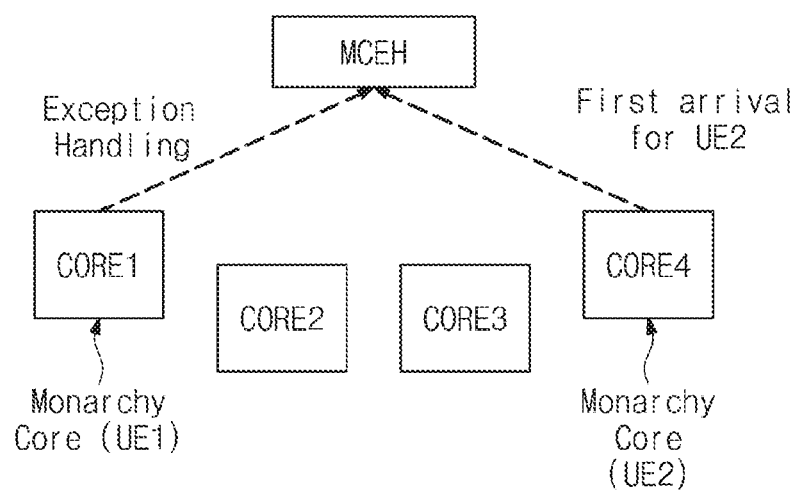
FIG. 23 is a diagram illustrating an example in which another exception handling occurs while a first core performs exception handling.

FIG. 23 is a diagram illustrating an example in which another exception handling occurs while the first core CORE1 performs exception handling. Referring to FIGS. 13 and 23, while the first core CORE1 performs the exception handling on a first uncorrectable error UE1 occurring in the first memory module 220, a second uncorrectable error UE2 may occur in one memory module of the second to fourth memory modules 230 to 250.

As described with reference to FIG. 17, when the exception broadcasting (operation S118) is performed on the second uncorrectable error UE2, the cores CORE1 to CORE4 may be called. The first core CORE1 which performs the exception handling does not respond to the call. The second to fourth cores CORE2 to CORE4 which do not perform the exception handling may respond to the call.

For example, as the fourth core CORE4 first responds to the call, the fourth core CORE4 may first arrive at the machine check exception handler MCEH. Accordingly, the fourth core CORE4 may be specified (or assigned) as a monarchy core for the second uncorrectable error UE2. The fourth core CORE4 may perform the exception handling on the second uncorrectable error UE2.

Figure 24:
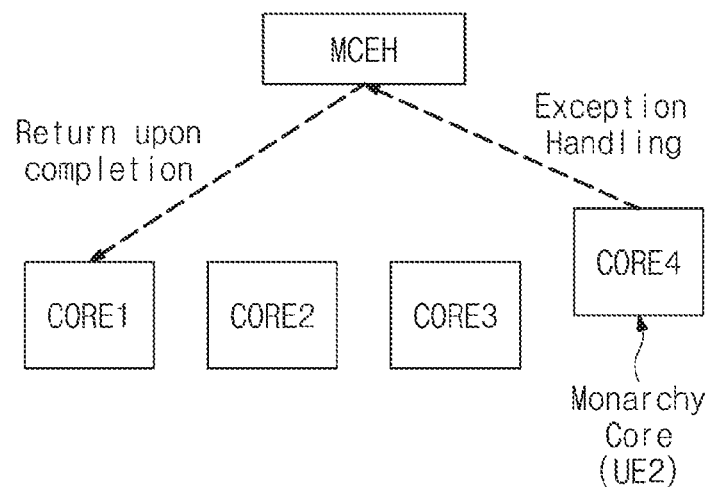
FIG. 24 is a diagram illustrating an example in which a first core completes exception handling after a state of FIG. 23.

FIG. 24 is a diagram illustrating an example in which the first core CORE1 completes exception handling after a state of FIG. 23. Referring to FIGS. 13 and 24, while the fourth core CORE4 performs the exception handling on the second uncorrectable error UE2, the first core CORE1 may complete the exception handling. When the exception handling is completed, the first core CORE1 may return to an interrupted operation (or an operation previously performed and interrupted) regardless of the event that the fourth core CORE4 performs the exception handling.

In the case where the first core CORE1 returns to the interrupted operation without waiting until the exception handling of the fourth core CORE4 is completed, a waste of resources in the memory system 200 may be further prevented, and the performance of the memory system 200 may be further improved.

Figure 25:
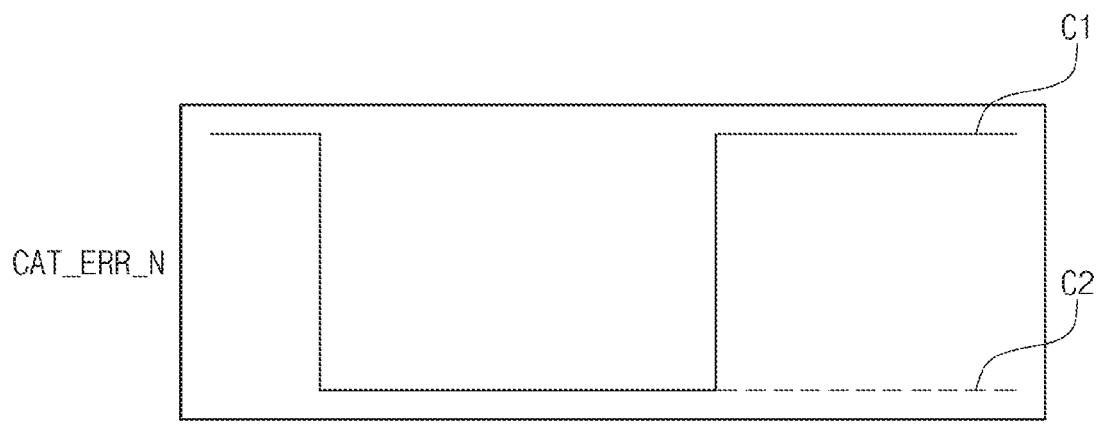
FIG. 25 is a diagram illustrating a first example of an error signal that cores or a processor generates.

FIG. 25 is a diagram illustrating a first example of an error signal CAT_ERR_N that the cores CORE1 to COREn and/or the processor 210 generates. Referring to FIGS. 13 and 25, the error signal CAT_ERR_N may be controlled in the form of a first line C1 and/or a second line C2.

For example, when the memory controller 211 detects an uncorrectable error, the error signal CAT_ERR_N may transition from a high level to a low level. In the case where the uncorrectable error is not a catastrophic error but a fatal error, the error signal CAT_ERR_N may transition from the low level to the high level like the first line C1.

In the case where the uncorrectable error is the catastrophic error, like the second line C2, the error signal CAT_ERR_N may be maintained at the low level until the system reboot is performed. In the case where the uncorrectable error is an error occurring in the first type memory modules 220 and 230, as described with reference to FIG. 18, the kernel panic or the system reboot may not occur.

For example, the uncorrectable error associated with the first type memory modules 220 and 230 may be set to the fatal error or no error. Accordingly, as described with reference to the first line C1, the error signal CAT_ERR_N may transition from the low level to the high level.

Figure 26:
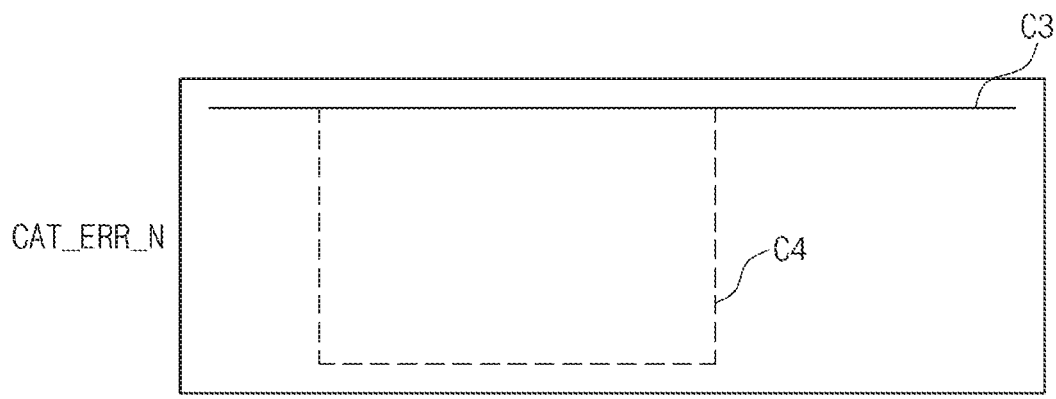
FIG. 26 is a diagram illustrating a second example of an error signal that cores or a processor generates.

FIG. 26 is a diagram illustrating a second example of the error signal CAT_ERR_N that the cores CORE1 to COREn and/or the processor 210 generates. Referring to FIGS. 13 and 26, the error signal CAT_ERR_N may be controlled in the form of a third line C3 and/or a fourth line C4.

For example, when the memory controller 211 detects an uncorrectable error and the uncorrectable error is not a catastrophic error but a fatal error, like the third line C3, the error signal CAT_ERR_N may maintain the high level.

When the memory controller 211 detects an uncorrectable error and the uncorrectable error is the catastrophic error, like the fourth line C4, the error signal CAT_ERR_N may transition from the high level to the low level. In the case where the system reboot is performed, the error signal CAT_ERR_N may return to the high level.

For example, the uncorrectable error associated with the first type memory modules 220 and 230 may be set to the fatal error or no error. Accordingly, as described with reference to the third line C3, the error signal CAT_ERR_N may maintain the high level.

According to the inventive concepts, upon accessing a nonvolatile memory of a storage class memory, a monarchy core of cores performs exception handling, and the remaining cores continue to perform operations previously performed. Accordingly, a memory system having improved performance by applying characteristics of the storage class memory and an operating method of the memory system are provided.

Figure 27:
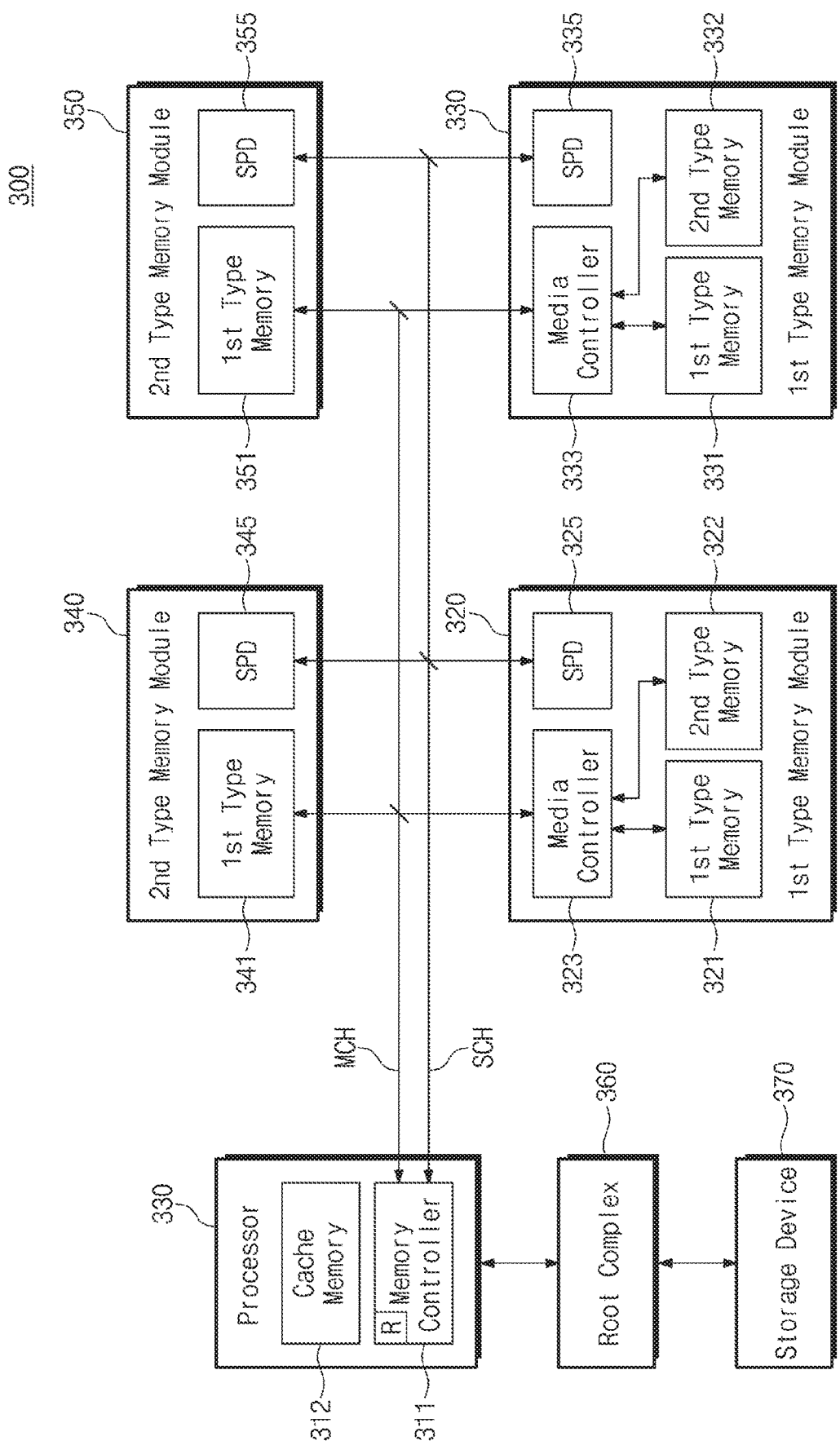
FIG. 27 is a block diagram illustrating a memory system according to some embodiments of the inventive concept.

FIG. 27 is a block diagram illustrating a memory system 300 according to some embodiments of the inventive concept. The memory system 300 may include, for example, a server system, such as an application server, a client server, or a data server. Alternatively, the memory system 300 may include a personal computer, a workstation, etc.

Referring to FIG. 27, the memory system 300 may include a processor 310, first to fourth memory modules 320 to 350, a root complex 360, and a storage device 370, which may be electrically coupled as illustrated. The processor 310 may be configured to control elements of the memory system 300 and operations of the elements. Furthermore, the processor 310 may be configured to execute an operating system and various applications and to process data using the operating system or the applications.

The processor 310 may include a memory controller 311 and a cache memory 312. The memory controller 311 may access the first, second, third and fourth memory modules 320 to 350 through main channels MCH and supplementary channels SCH. The cache memory 312 may include a high speed and reliable memory device (e.g., a static random access memory (SRAM) device).

The memory controller 311 may include a register R. The register R may be configured to store various data, which are needed when the memory controller 311 accesses the first through fourth memory modules 320 to 350. The memory controller 311 may access the first through fourth memory modules 320 to 350, based on data stored in the register R.

The first through fourth memory modules 320 to 350 may be connected to the memory controller 311 through the main channels MCH and the supplementary channels SCH, as shown. The main channels MCH may be used to write data to and read data from the memory modules 320 to 350 (e.g., semiconductor memory modules). The main channels MCH may include a plurality of channels, which are provided for the first through fourth memory modules 320 to 350, respectively.

The supplementary channels SCH (a/k/a, secondary channels) may be used to support additional functions, which are associated with the first to fourth memory modules 320 to 350, except for the functions of writing/reading data via the main channels MCH. For example, the first to fourth memory modules 320 to 350 may provide their own peculiar data to the memory controller 311 through the supplementary channels SCH. The supplementary channels SCH may include a plurality of channels, which are provided for the first to fourth memory modules 320 to 350, respectively.

The first, second, third and fourth memory modules 320, 330, 340 and 350 may be used collectively as the main memory of the memory system 300. The first through fourth memory modules 320 to 350 may be configured to communicate with the memory controller 311 in accordance with one of various standards, such as standards for dual in-line memory module (DIMM), registered DIMM (RDIMM), and load reduced DIMM (LRDIMM).

The root complex 360 may be configured to provide channels that allow the processor 310 to access various peripheral devices, including the illustrated storage device 370, which may operate as at least one of a hard disk drive, an optical disk drive, a solid state drive, or the like.

However, the types of peripheral devices connected to the root complex 360 are not limited to the storage device 370. For example, the root complex 360 may be connected to one or more other devices, such as a modem, a graphic processing unit (GPU), and a neuromorphic processor.

The processor 310 may be configured to hierarchically manage the cache memory 312, the first through fourth memory modules 320, 330, 340 and 350, which serve as the main memory, and the storage device 370. For example, the processor 310 may be configured to load necessary data from the storage device 370 to the main memory supported by the memory modules 320, 330, 340 and 350. The processor 310 may also be configured to flush data to be backed up, which are stored in the main memory, to the storage device 370.

A portion of the storage area of the main memory supported by the first to fourth memory modules 320 to 350 may be mapped to the cache memory 312. In this case, where it is necessary to access a specific storage space of the main memory, the processor 310 may determine whether the specific storage space is mapped to the cache memory 312.

If the specific storage space is mapped to the cache memory 312, the processor 310 may quickly and directly access the specific storage space of the cache memory 312. However, if the specific storage space is not mapped to cache memory, the processor 310 may map or fetch a specific storage space of the first to fourth memory modules 320 to 350 to the cache memory 312.

If the storage space of the cache memory 312 has insufficient capacity, the processor 310 may release at least a portion of an existing storage space previously mapped to the cache memory 312. And, if the data of the storage space to be released is updated, the processor 310 may flush the updated data to the first to fourth memory modules 320 to 350.

The first to fourth memory modules 320 to 350 may be heterogeneous memory modules. For example, the first and second memory modules 320 and 330 may be first type memory modules, whereas the third and fourth memory modules 340 and 350 may be second type memory modules.

Thus, the first memory module 320 may include a first type memory 321, a second type memory 322, a media controller 323, and a serial presence detect (SPD) device 325. The second memory module 330 may include a first type memory 331, a second type memory 332, a media controller 333, and a serial presence detect (SPD) device 335. Hereinafter, the first type memory modules 320 and 330 will be described in more detail with reference to the first memory module 320.

The first type memory 321 may include a high speed volatile memory (e.g., a dynamic random access memory (DRAM) device). The second type memory 322 may include a non-volatile memory that has a lower speed and a larger storage capacity than the first type memory 321. For example, the second type memory 322 may include at least one of a FLASH memory, a phase-change memory, a ferroelectric memory, a magnetic memory, a resistive memory, or the like.

The media controller 323 may be configured to deliver an access command, which is transmitted from an external host device (e.g., the memory controller 311 or the processor 310) through a corresponding channel of the main channels MCH, to the first type memory 321 or the second type memory 322. According to the access command, the media controller 323 may exchange data with the external host device (e.g., the memory controller 311 or the processor 310) through a corresponding channel of the main channels MCH.

The media controller 323 may provide a storage capacity or storage space of the second type memory 322 to the external host device (e.g., the memory controller 311 or the processor 310). Under the control of the media controller 323, the first type memory 321 may be used as a cache memory of the second type memory 322.

For example, the media controller 323 may be configured to map a portion of a storage space of the second type memory 322 to the first type memory 321. If a storage space, which is associated with the access command provided from the external host device (e.g., the memory controller 311 or the processor 310), is mapped to the first type memory 321, the media controller 323 may deliver the access command to the first type memory 321.

If a storage space, which is associated with the access command provided from the external host device (e.g., the memory controller 311 or the processor 310), is not mapped to the first type memory 321, the media controller 323 may map or backup the corresponding storage space from the second type memory 322 to the first type memory 321.

If the storage space of the first type memory 321 is insufficient, the media controller 323 may release at least a portion of an existing storage space previously mapped to the first type memory 321. If the data of the storage space to be released is updated, the media controller 323 may flush the update data to the second type memory 322.

The SPD device 325 may communicate with the external host device (e.g., the memory controller 311 or the processor 310) through a corresponding channel of the supplementary channels SCH. For example, when the first memory module 320 is initialized, the SPD device 325 may provide data stored therein to the external host device (e.g., the memory controller 311 or the processor 310) through a corresponding channel of the supplementary channels SCH.

For example, the SPD device 325 may store information on a storage capacity of the first memory module 320, which is provided to the external host device (e.g., the memory controller 311 or the processor 310). For example, the SPD device 325 may store information on the storage capacity of the second type memory 322. When the initialization is executed, the SPD device 325 may provide the information on the storage capacity of the second type memory 322 to the external host device (e.g., the memory controller 311 or the processor 310).

The capacity information stored in the SPD device 325 may contain, for example, information on a user capacity of the second type memory 322. The storage capacity of the second type memory 322 may include a user capacity, a meta-capacity, and a reserved capacity. The user capacity may be a storage capacity which is provided to the external host device (e.g., the memory controller 311) by the second type memory 322.

The meta-capacity may be a storage capacity, which is provided to store various types of metadata for managing the second type memory 322 and is not exposed to the external host device (e.g., the memory controller 311). The reserved capacity may be a storage capacity, which is provided to manage the second type memory 322 and is not exposed to the external host device (e.g., the memory controller 311).

The capacity information stored in the SPD device 325 may contain information on a user capacity of the second type memory 322. Hereinafter, unless otherwise defined, the capacity of the second type memory 322 may be interpreted as indicating the user capacity of the second type memory 322.

The third memory module 340 may include a first type memory 341 and a SPD device 345. Similarly, the fourth memory module 350 may include a first type memory 351 and a SPD device 355. Hereinafter, the second type memory modules 340 and 350 will be described in more detail with reference to the third memory module 340.

The first type memory 341 may include a dynamic random access memory, similar to the first type memory 321 of the first memory module 320. The SPD device 345 may communicate with the external host device (e.g., the memory controller 311 or the processor 310) through a corresponding channel of the supplementary channels SCH. For example, when the third memory module 340 is initialized, the SPD device 345 may provide data stored therein to the external host device (e.g., the memory controller 311 or the processor 310) through a corresponding channel of the supplementary channels SCH.

For example, the SPD device 345 may store information on a storage capacity of the third memory module 340, which is provided to the external host device (e.g., the memory controller 311 or the processor 310). For example, the SPD device 345 may store information on the storage capacity of the first type memory 341. When the initialization is executed, the SPD device 345 may provide the information on the storage capacity of the first type memory 341 to the external host device (e.g., the memory controller 311 or the processor 310).

If power is supplied to the memory system 300, the memory controller 311 may initialize the first through fourth memory modules 320 to 350. For example, the SPD devices 325, 335, 345 and 355 of the first to fourth memory modules 320 to 350 may provide respective capacity information to the memory controller 311 through the supplementary channels SCH.

The SPD devices 325 and 335 of the first type memory modules 320 and 330 may provide respective storage capacities of the second type memories 322 and 332 to the memory controller 311. The SPD devices 345 and 355 of the second type memory modules 340 and 350 may provide respective storage capacities of the first type memories 341 and 351 to the memory controller 311. For example, the memory controller 311 may read respective storage capacities from the SPD devices 325, 335, 345 and 355.

In the aforementioned embodiments, the structure in which the storage device 370 is connected to the root complex 360 is illustrated. However, a device connected to the root complex 360 is not limited to the storage device 370.

Figure 28:
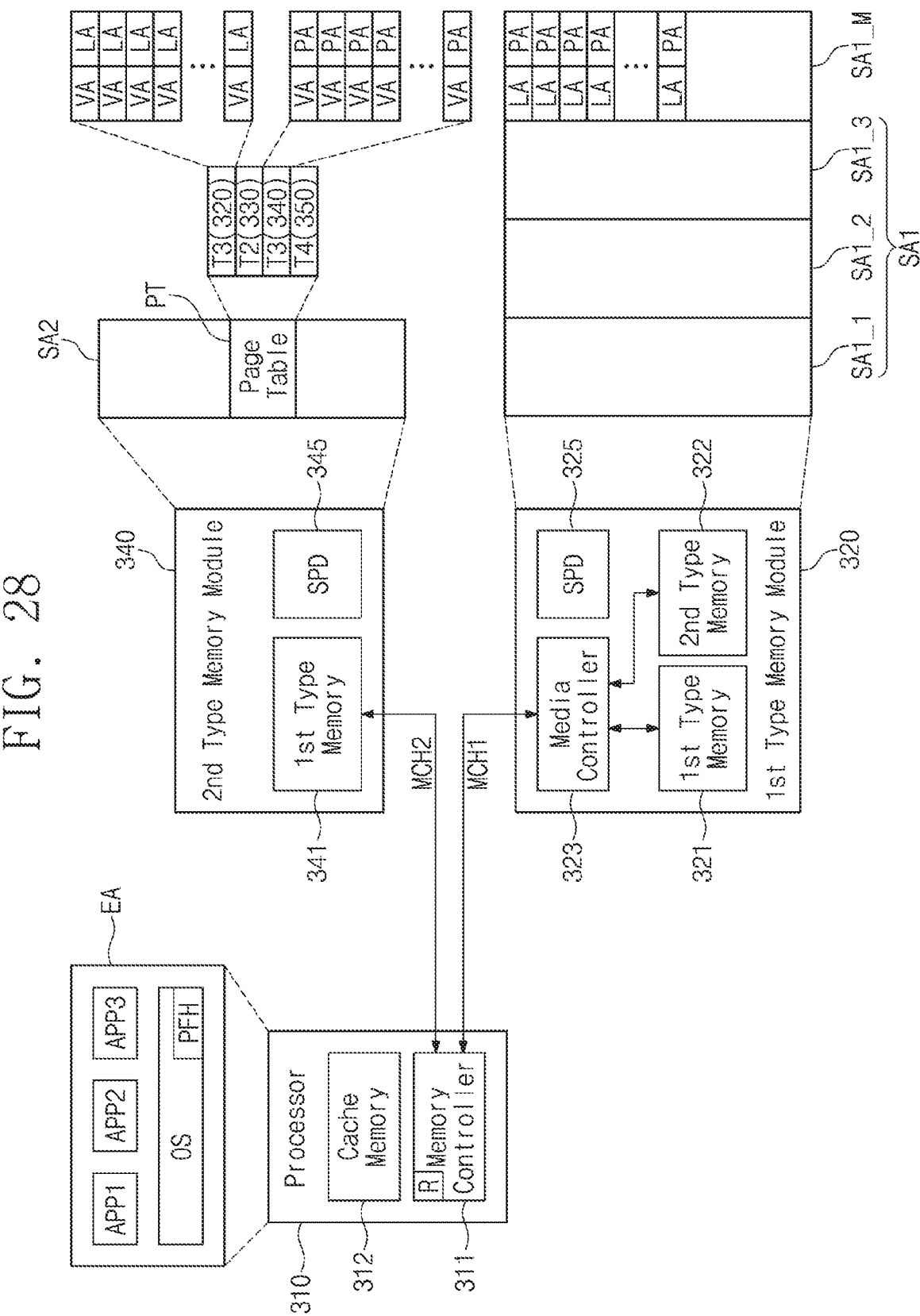
FIG. 28 illustrates an example in which first and third memory modules are accessed by a processor.

FIG. 28 illustrates an example in which the first and third memory modules 320 and 340 are accessed by the processor 310. In order to reduce complexity in the drawings, other elements, except for the processor 310, the first memory module 320, and the third memory module 340, will be omitted.

An execution area "EA" of FIG. 28 illustrates entities to be executed in the processor 310. As shown in the execution area EA, an operating system OS may be executed in the processor 310. Furthermore, in the processor 310, first to third applications APP1-APP3 may be executed on the operating system OS.

The operating system OS may include a page fault handler PFH. The page fault handler PFH may be configured to handle a page fault, which may occur when the first to third applications APP1-APP3 access the first and third memory modules 320 and 340. An operation of the page fault handler PFH will be described in more detail with reference to FIGS. 29 and 30.

The first memory module 320 may provide a storage space of the second type memory 322 to the processor 310. A storage space corresponding to the user capacity of the first memory module 320 will be illustrated as a first storage area SA1. The first storage area SA1 may include first to third sub-storage areas SA1_1-SA1_3.

The first to third sub-storage areas SA1_1-SA1_3 may be storage areas, which are included in the storage space of the second type memory 322 and are logically or physically distinguished from each other. Different addresses may be used for access to the first to third sub-storage areas SA1_1-SA1_3.

In addition to the first storage area SA1, a storage space corresponding to the meta-capacity of the first memory module 320 will be illustrated as a first meta-storage area SA1_M. The media controller 323 may store various data, which are needed for access to the first storage area SA1, in the first meta-storage area SA1_M.

The third memory module 340 may provide the storage space of the first type memory 341 to the processor 310. The storage space of the third memory module 340 will be illustrated as a second storage area SA2. The second storage area SA2 may be smaller than the first storage area SA1.

If the memory system 300 is initialized, the memory controller 311 of the processor 310 may distinguish the storage spaces of the first to fourth memory modules 320 to 350 through the supplementary channels SCH. The processor 310 (e.g., the operating system OS) may allocate addresses (e.g., virtual addresses VA) to the distinguished storage spaces.

The processor 310 (e.g., the operating system OS) may access the first storage area SA1 and the second storage area SA2 using the virtual addresses VA. The processor 310 (e.g., the operating system OS) may allocate the storage space of the first to fourth memory modules 320 to 350 to the first to third applications APP1-APP3 using the virtual addresses VA.

The memory controller 311 may receive an access command, which is based on the virtual addresses VA, from the processor 310. The memory controller 311 may convert the virtual addresses VA into actual addresses of the first to fourth memory modules 320 to 350. The memory controller 311 may access the first to fourth memory modules 320 to 350 through the main channels MCH, based on the actual addresses. For example, the memory controller 311 may access the first and third memory modules 320 and 340, respectively, through first and second main channels MCH1 and MCH2.

The memory controller 311 may store a page table PT, which contains mapping information between the virtual addresses VA allocated by the processor 310 and the actual addresses of the first to fourth memory modules 320 to 350, in the third memory module 340. The page table PT may include first to fourth tables T1-T4, each of which is associated with a corresponding one of the first to fourth memory modules 320 to 350.

In some embodiments, the memory controller 311 may store the page table PT in one of the second type memory modules 340 and 350. In certain embodiments, the memory controller 311 may store the page table PT in one of the first to fourth memory modules 320 to 350. For example, the memory controller 311 may store the first to fourth tables T1-T4 on the first to fourth memory modules 320 to 350 in a single memory module.

The second type memory modules 340 and 350 may be directly accessed by the memory controller 311. In the case where the memory controller 311 accesses the second type memory modules 340 and 350, the access may be executed based on physical addresses PA of the first type memories 341 and 351. Thus, the third and fourth tables T3 and T4 for the second type memory modules 340 and 350 may contain the mapping information between the virtual addresses VA and the physical addresses PA of the second type memory modules 340 and 350.

The first type memory modules 320 and 330 may not be directly accessed by the memory controller 311. The memory controller 311 may access the first type memory modules 320 and 330 through the media controller 323 or 333. In the case where the memory controller 311 accesses the first type memory modules 320 and 330, the access may be executed based on logical addresses LA that are different from the physical addresses PA of the second type memories 322 and 332.

The media controller 323 or 333 may store the mapping information between the logical addresses LA and the physical addresses PA of the second type memory 322 or 332, which will be used by the memory controller 311, in the first meta-storage area SA1_M. The media controller 323 or 333 may convert the access command, which is provided from the memory controller 311, into an access command for the second type memory 322 or 332, using the mapping information stored in the first meta-storage area SA1_M.

Since the memory controller 311 uses the logical addresses LA of the first type memory modules 320 and 330, the first and second tables T1 and T2 for the first type memory modules 320 and 330 may contain the mapping information between the virtual addresses VA and the logical addresses LA.

The memory controller 311 may store a start address of the storage space of the third memory module 340, in which the page table PT is stored, and information on a size of the page table PT in the register R. In the case where at least one of the operating system OS and the first to third applications APP1-APP3 requests an access to the first to fourth memory modules 320 to 350 based on the virtual addresses VA, the memory controller 311 may initially refer to the register R to search a location (e.g., address) in which the page table PT is stored and then may transmit an access command to the first to fourth memory modules 320 to 350, depending on a result of the search.

Figure 29:
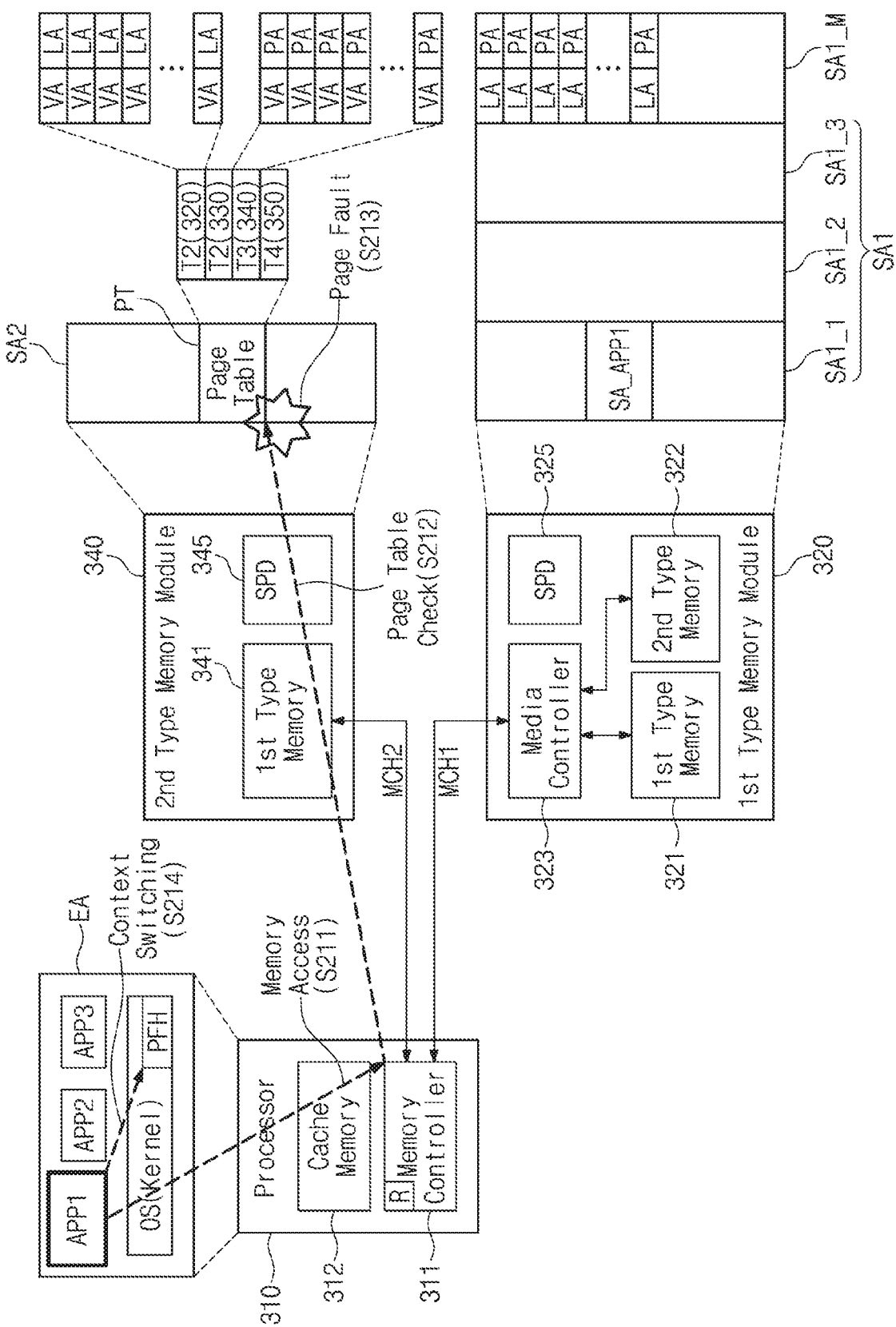
FIG. 29 illustrates an example of a page fault to occur in the memory system.

FIG. 29 illustrates an example of an occurrence of a page fault in the memory system 300. Referring to FIGS. 27 and 29, in step S211, which is shown by a dotted line, the first application APP1 may request a memory access on the first memory module 320. The request from the first application APP1 may be transmitted to the memory controller 311 through the operating system OS. In step S212, which is illustrated by a dotted line, the memory controller 311 may refer to the register R to search the page table PT.

If the mapping information of the virtual addresses VA of the first memory module 320, for which the memory access is requested, does not exist in the first table T1, a page fault may occur in step S213, which is shown by a highlighted "star". For example, if the first application APP1 requests allocation of a new memory, the operating system OS may instruct the memory controller 311 to perform a memory access for such memory allocation.

Since allocation of a previously-unused new memory is requested, mapping information for this may not exist in the first table T1. In other words, when the allocation of a new memory is executed, the page fault may occur. For example, when the first application APP1 starts to run, the allocation of a new memory may be requested to cause the page fault. If the page fault occurs, a context switching from the first application APP1 to the operating system OS may be executed, in step S214, which is shown by a dotted line in the highlighted portion of the processor 310 in FIG. 29.

Figure 30:
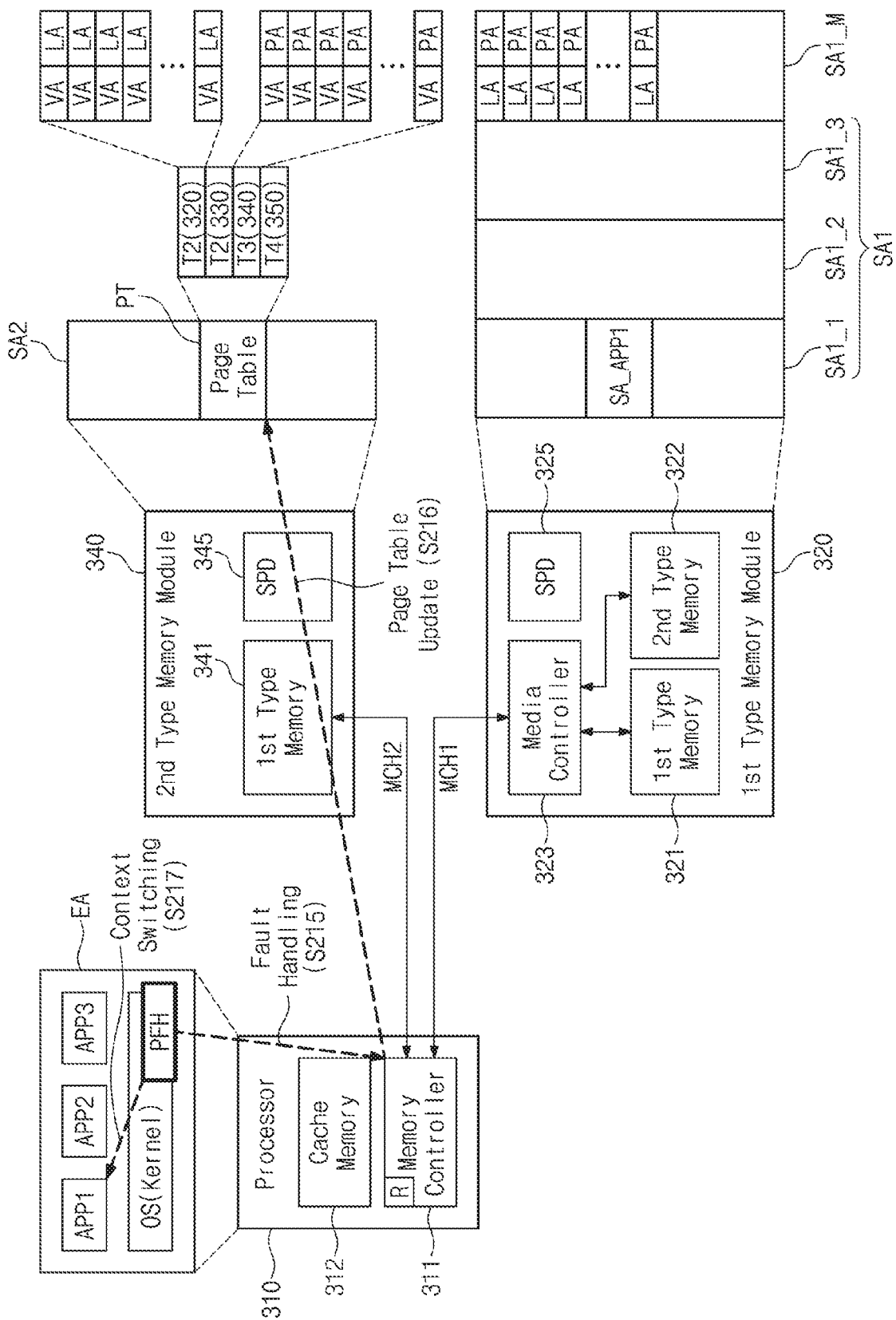
FIG. 30 illustrates an example of a fault handling to be executed in the memory system.

FIG. 30 illustrates an example of a fault handling to be executed in the memory system 300. Referring to FIG. 30, in step S215, which is shown by a dotted line, the page fault handler PFH of the operating system OS may execute a fault handling operation. For example, the page fault handler PFH may map a logical address LA of a free page of the first memory module 320 to a virtual address VA, which is requested by the first application APP1.

For example, if the first to fourth memory modules 320 to 350 have insufficient free capacity, the processor 310 may swap a portion of data stored in the first storage area SA1 of the first memory module 320 to the storage device 370 and may release a storage space for the swapped data to secure an increased free capacity in the first storage area SA1.

The mapped logical address LA may be allocated to the first storage area SA1 as a first application storage area SA_APP1 for the first application APP1. In step S216, as shown by a dotted line, the memory controller 311 may write the mapping information of the first application storage area SA_APP1 in the first table T1 of the page table PT, thereby updating the page table. In step S217, a context switching operation from the page fault handler PFH to the first application APP1 may be executed, after the fault handling (S215).

If, as described with reference to FIGS. 29 and 30, the page fault occurs and the fault handling is executed, the context switching may be executed two times. The context switching may lead to resource consumption in the memory system 300 and a reduction in operation speed of the memory system 300.

Figure 31:
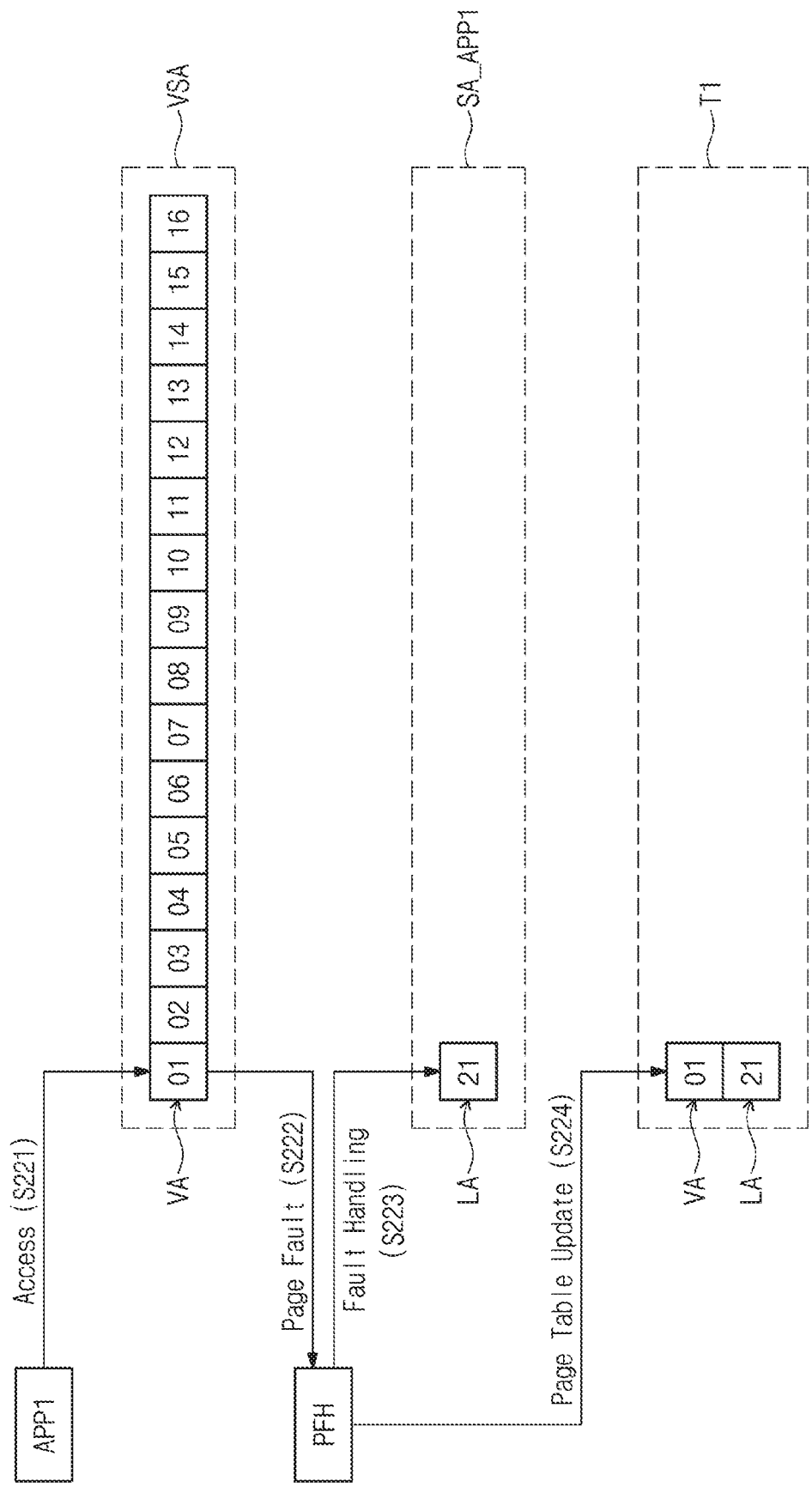
FIG. 31 illustrates an example in which a virtual storage space identified with virtual addresses of '01'-'16' is allocated to a first application.

FIG. 31 illustrates an example in which a virtual storage area VSA identified with virtual addresses of '01'-'16' is allocated to the first application APP1. Referring to FIGS. 27 and 31, in step S221, the first application APP1 may request an access to a portion of the virtual storage area VSA having a virtual address VA of '01'. The virtual address VA of '01' may correspond to, for example, the first memory module 320.

Since the mapping information on the virtual address VA of '01' does not exist in the first table T1 (e.g., see FIG. 29), a page fault may occur, in step S222. Thereafter, the context switching may be executed, and the page fault handler PFH may be activated. In step S223, the page fault handler PFH may execute the fault handling.

For example, the page fault handler PFH may map a portion of the first application storage area SA_APP1 having a logical address LA of '21' to the virtual address VA of '01'. The logical address LA of '21' may correspond to, for example, the first memory module 320. In step S224, the page fault handler PFH may execute a page table updating on the first table T1 to contain the mapping information between the virtual address VA of '01' and the logical address LA of '21'.

Figure 32:
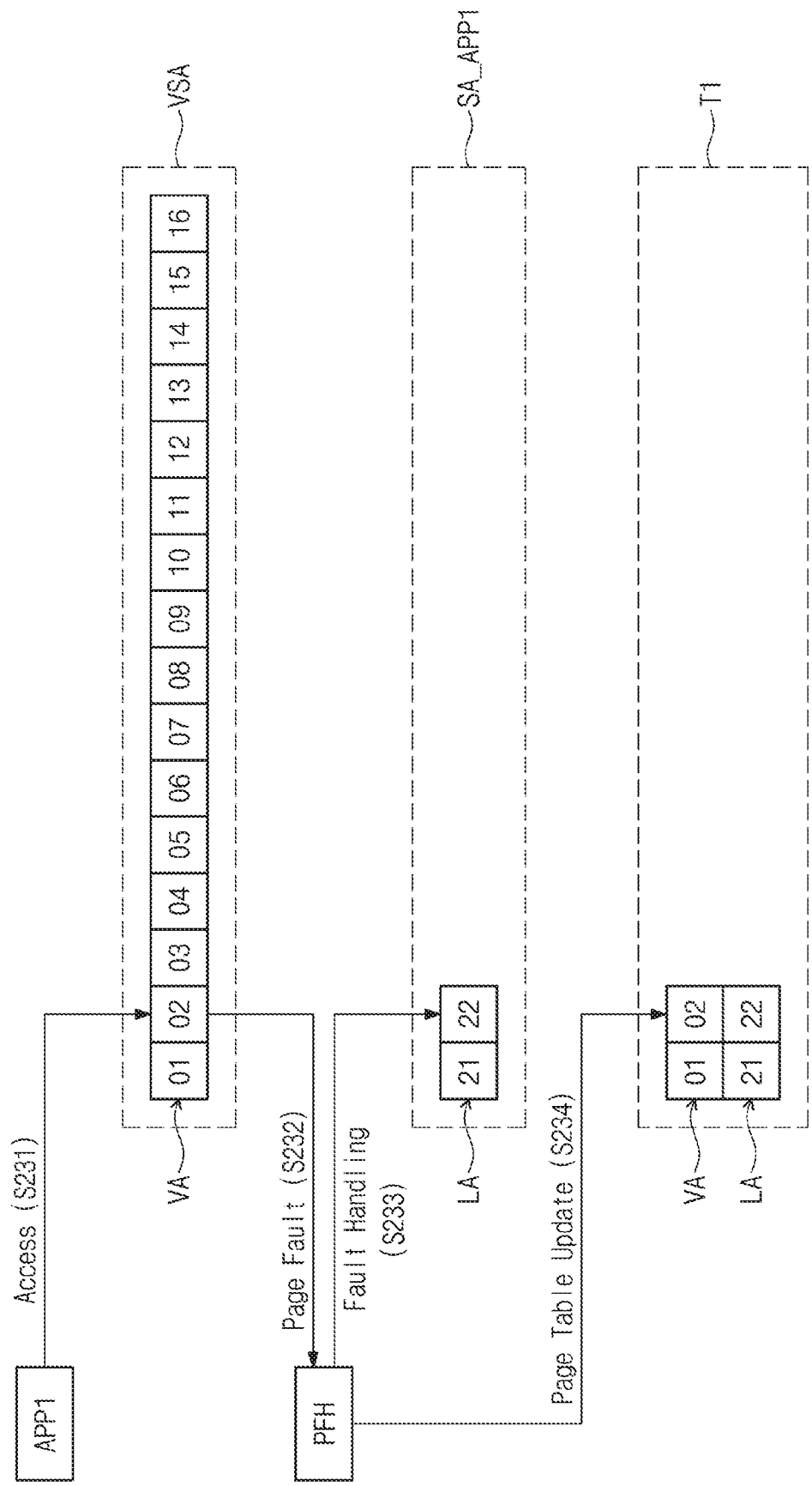
FIG. 32 illustrates an example of a virtual address allocation, which will be executed after the step of FIG. 31, according to a first embodiment.

FIG. 32 illustrates an example of a step of allocating the virtual addresses VA, which will be executed after the step of FIG. 31, according to a first embodiment. Referring to FIG. 32, in step S231, the first application APP1 may access a next page of the virtual storage area VSA, which has a virtual address VA of '02'. A page fault may occur in step S232, and the fault handling may be executed in step S233.

The page fault handler PFH may allocate a portion of the first application storage area SA_APP1 having a logical address LA of '22' to the virtual address VA of '02'. In step S234, the page fault handler PFH may execute a page table updating on the first table T1 to contain the mapping information between the virtual address VA of '02' and the logical address LA of '22'. The first application APP1 may request sequential accesses to virtual addresses VA of '01' to '16' in the same manner as described with reference to FIGS. 31 and 32.

Figure 33:
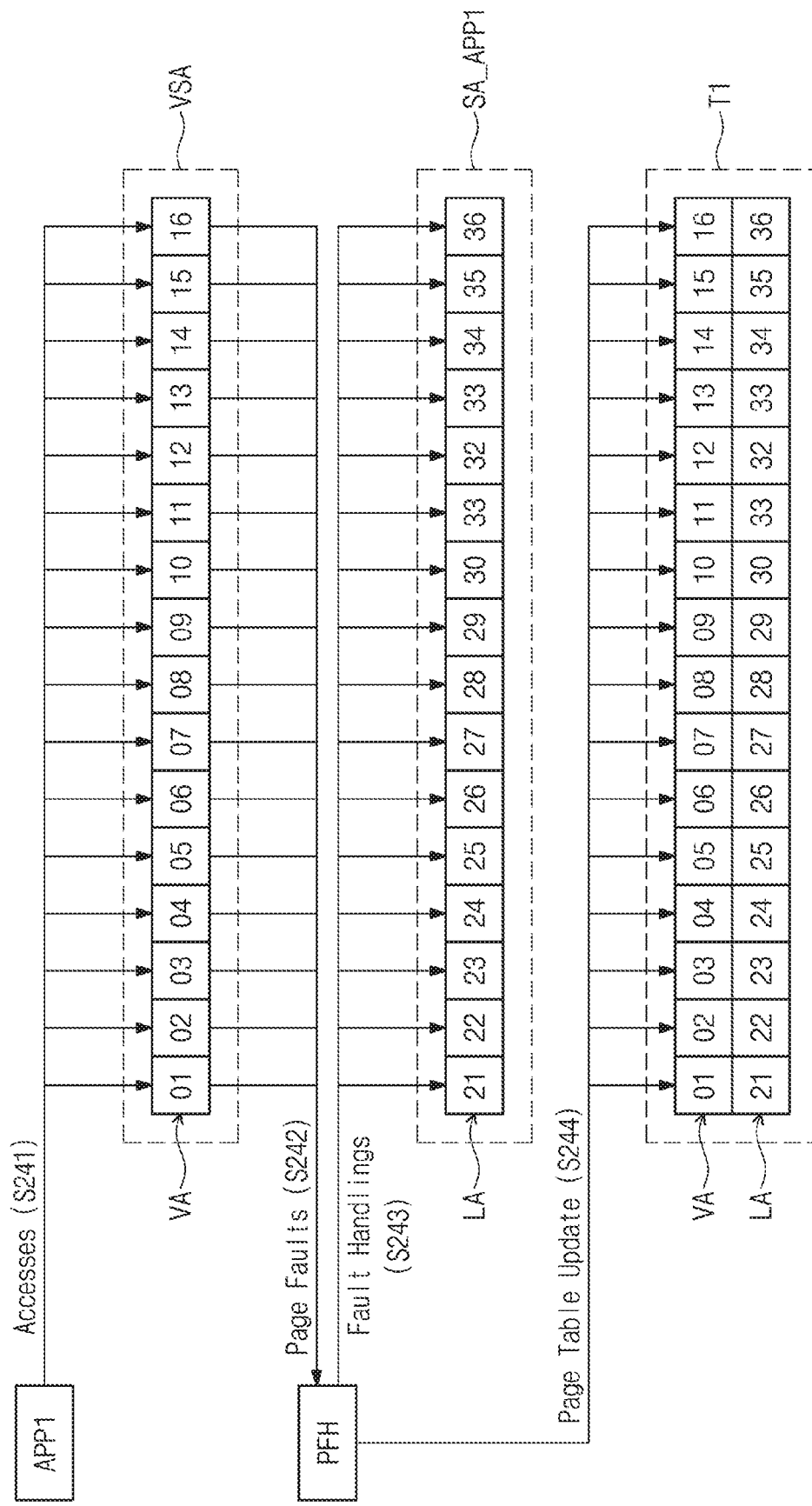
FIG. 33 illustrates an example of a page fault handling, which is executed on the virtual addresses of '01'-'16' by a page fault handler, according to a first embodiment.

FIG. 33 illustrates an example of a page fault handling, which is executed on the virtual addresses of '01'-'16' by the page fault handler PFH, according to a first embodiment. Referring to FIG. 33, the page fault handler PFH may map a portion of the first application storage area SA_APP1 having the logical addresses LA of '21' to '36' to a portion of the virtual storage area VSA having the virtual addresses VA of '01' to '16' through steps S241, S242, S243 and S244. The page fault handler PFH may execute a page fault handling on each of the virtual addresses VA of '01' to '16'.

Typically, a size of a page may be 4 KB. A memory capacity used by the first application APP1 may range from several megabytes to several gigabytes. As large capacity storage class memories, such as the first type memory modules 320 and 330, are introduced, a memory capacity used by the first application APP1 may increase.

In the case where a capacity memory allocated for the first application APP1 is large, the fault handling, which is executed by units of the page (i.e., of 4 KB), may lead to excessive consumption of resources of the processor 310 and deterioration in operation speeds of the processor 310 and the memory system 300. By contrast, according to some embodiments of the inventive concept, the number of the fault handling, which is executed by the processor 310 (or the operating system OS), may be smaller than the number of pages, to which the access is requested by the first application APP1, and in this case, the above issue may be successfully overcome.

Figure 34:
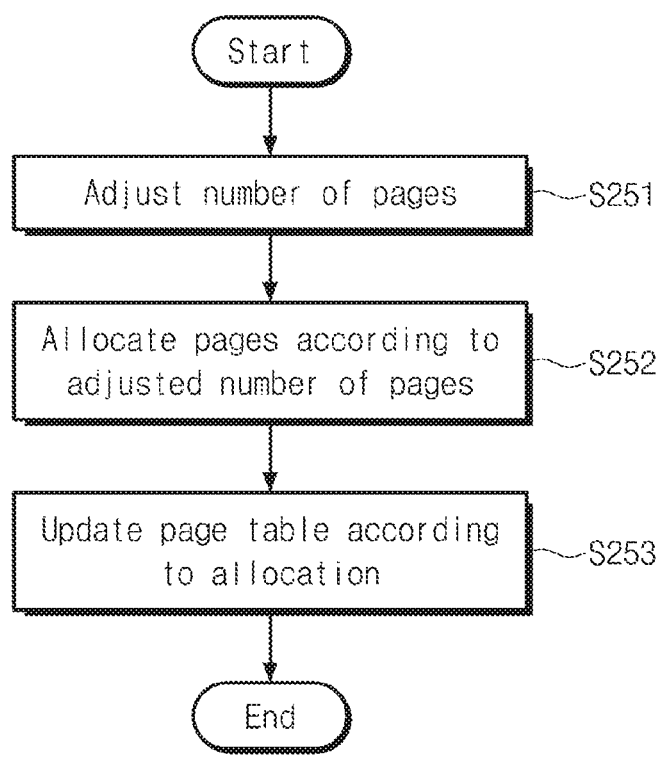
FIG. 34 illustrates a method of performing a fault handling, according to a second embodiment of the inventive concept.

FIG. 34 illustrates a method of performing a fault handling, according to a second embodiment of the inventive concept. Referring to FIGS. 28 and 34, in step S251, the page fault handler PFH may adjust the number of pages. In step S252, the page fault handler PFH may allocate pages according to the adjusted number of pages. In step S253, the page fault handler PFH may update the page table PT according to the allocation.

For example, the page fault handler PFH may adjust the number of pages according to a property of an access, in which a page fault occurred. The page fault handler PFH may map two or more virtual addresses VA and two or more logical addresses LA to each other, when a fault handling associated with a specific access is executed.

In the case where a page fault is caused by an operation (e.g., the memory allocation) of accessing the successive virtual addresses, the page fault handler PFH may sequentially increase the numbers of the virtual and logical addresses VA and LA, which are mapped to each other during the fault handling.

Figure 35:
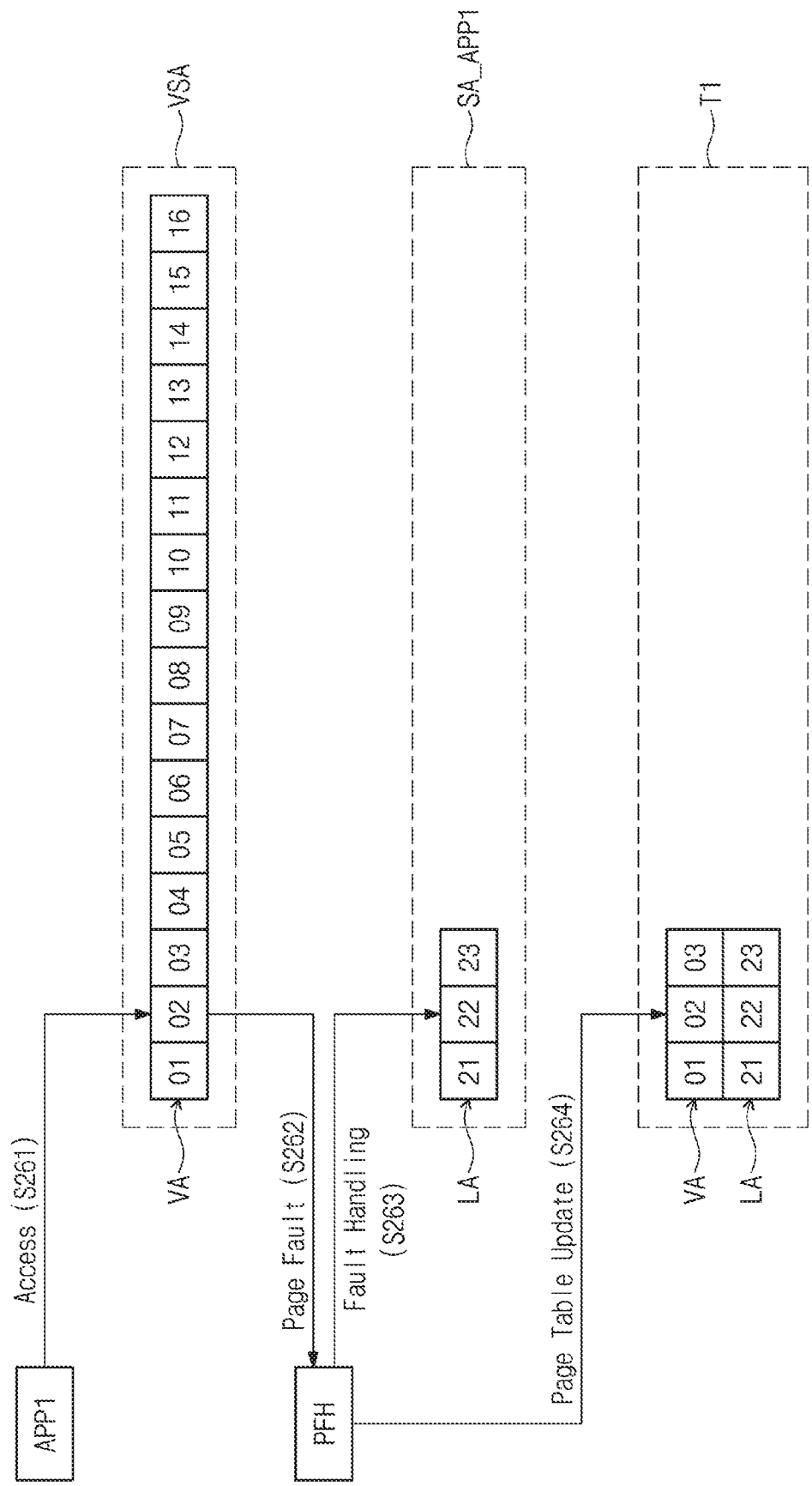
FIG. 35 illustrates an example of a virtual address allocation, which will be executed after the step of FIG. 31, according to a second embodiment.

FIG. 35 illustrates an example of a step of allocating the virtual addresses VA, which will be executed after the step of FIG. 31, according to a second embodiment. Referring to FIG. 35, in step S261, the first application APP1 may access a next page of the virtual storage area VSA, which has a virtual address VA of '02'. A page fault may occur in step S262, and the fault handling may be executed in step S263.

The page fault handler PFH of FIG. 35 may be configured to map two or more logical addresses to two or more virtual addresses. For example, the page fault handler PFH may be configured to allocate the logical address LA of '22' of the first application storage area SA_APP1 to the virtual address VA of '02' and to map the logical address LA of '23' to the virtual address VA of '03'.

In step S264, the page fault handler PFH may execute a page table updating on the first table T1 to contain the mapping information between the virtual address VA of '02' and the logical address LA of '22' and between the virtual address VA of '03' and the logical address LA of '23'.

Figure 36:
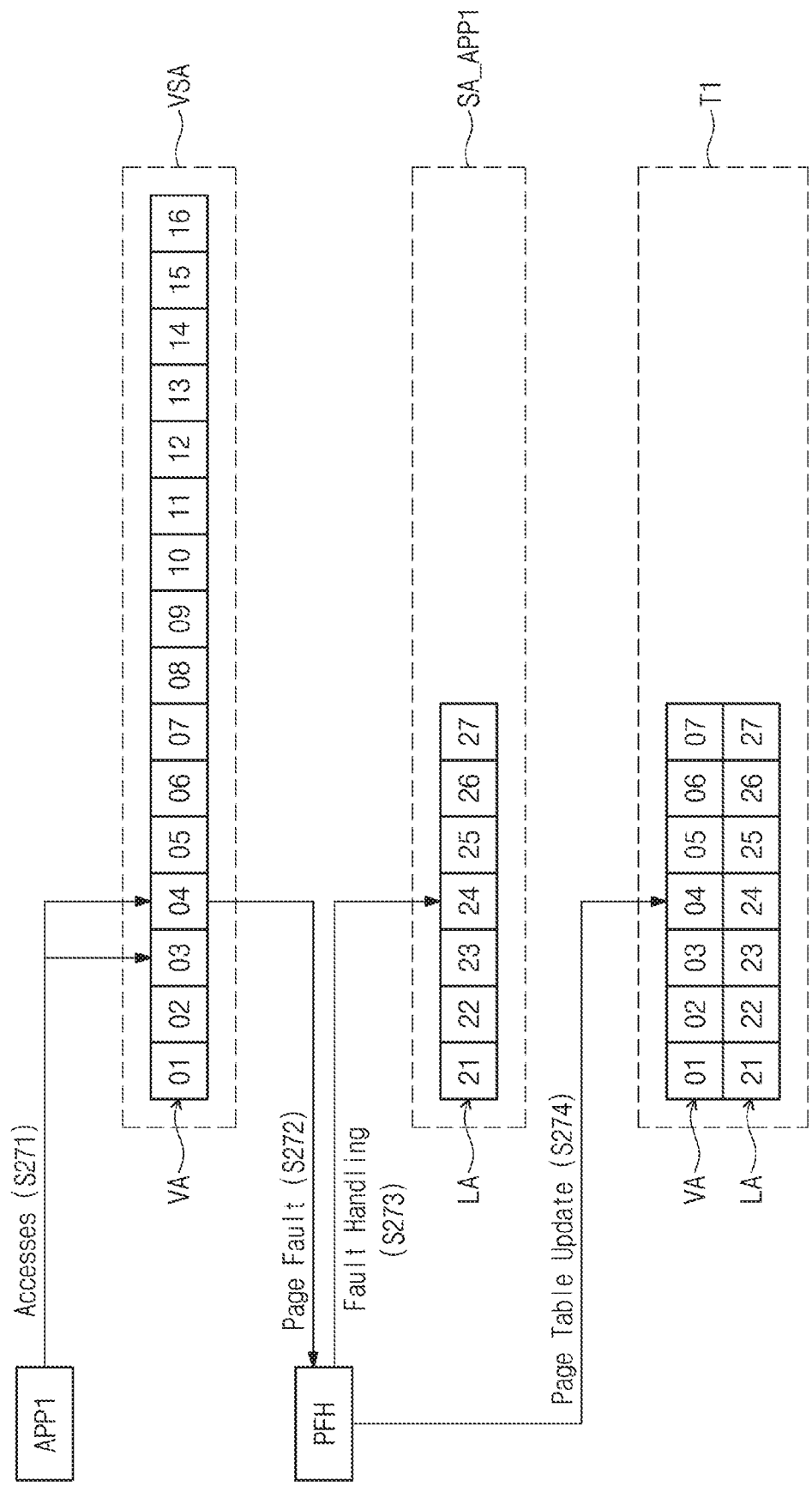
FIG. 36 illustrates an example of a virtual address allocation, which will be executed after the step of FIG. 35, according to a second embodiment.

FIG. 36 illustrates an example of a step of allocating a virtual address, which will be executed after the step of FIG. 35, according to a second embodiment of the invention. Referring to FIG. 36, in step S271, the first application APP1 may access pages of the virtual storage area VSA, whose virtual addresses VA are '02' and '03', in a sequential manner.

Since the virtual address VA of '03' is mapped to a logical address LA of '23', a page fault may not occur when the first application APP1 accesses the virtual address VA of '03'. However, because a virtual address VA of '04' is not mapped to the logical address LA, a page fault may occur when the first application APP1 accesses a virtual address VA of '04' or in step S272. In step S273, the fault handling may be executed.

The page fault handler PFH may be configured to map two or more logical addresses to two or more virtual addresses. For example, the page fault handler PFH may be configured to allocate a logical address LA of '24' of the first application storage area SA_APP1 to a virtual address VA of '04', to map a logical address LA of '25' to a virtual address VA of '05', to allocate a logical address LA of '26 to a virtual address VA of '06', and to map a logical address LA of '27' to a virtual address VA of '07'.

In step S274, the page fault handler PFH may execute an update of the page table (e.g., first table T1) to contain the mapping information between the virtual address VA of '04 and the logical address LA of '24', between the virtual address VA of '05' and the logical address LA of '25', between the virtual address VA of '06' and the logical address LA of '26', and between the virtual address VA of '07' and the logical address LA of '27'.

As described with reference to FIGS. 35 and 36, the first application APP1 may sequentially increase the number of the logical addresses LA and the number of the virtual addresses VA, which are mapped to each other during the execution of the fault handling.

Figure 37:
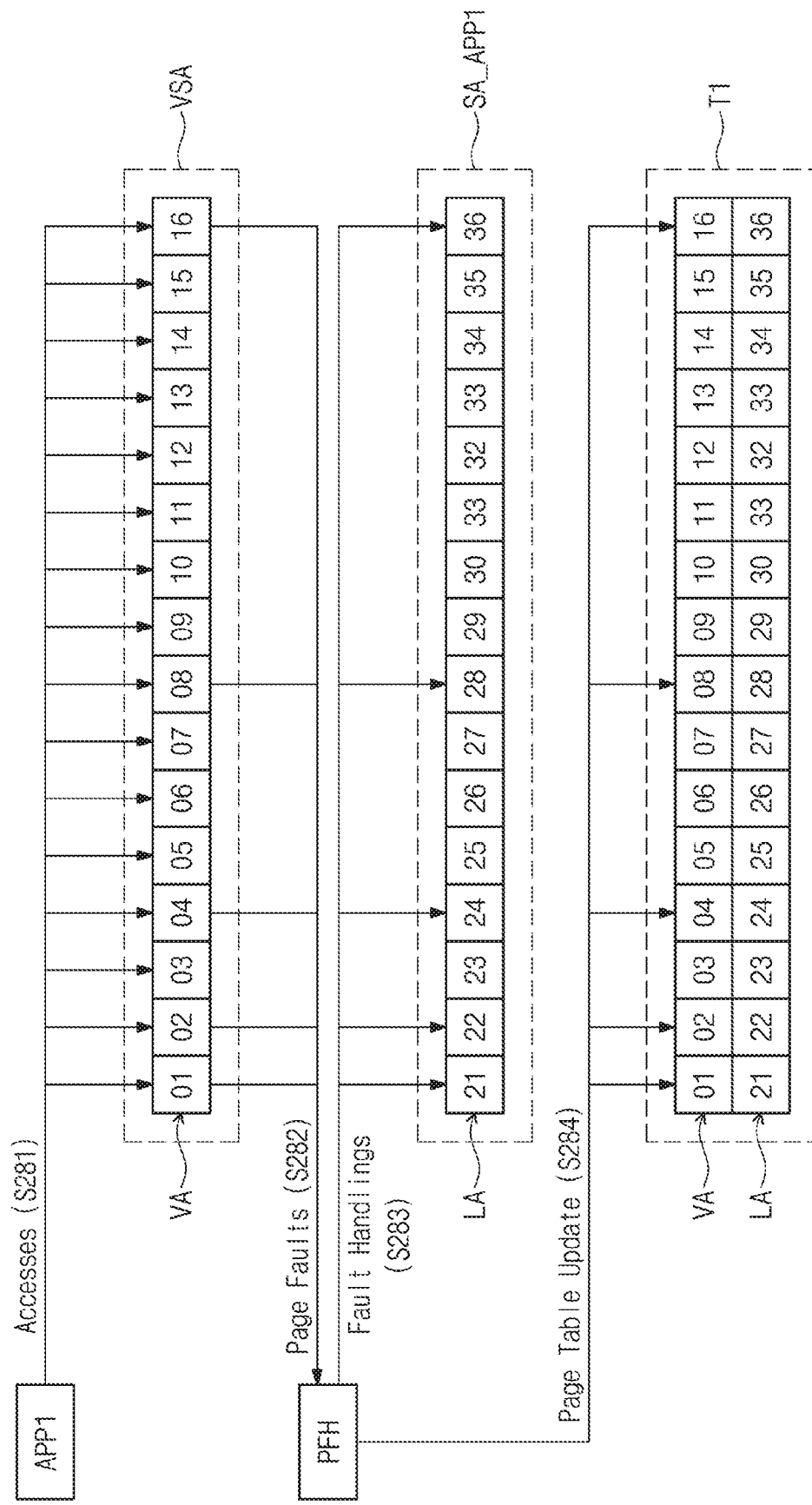
FIG. 37 illustrates an example of a page fault handling, which is executed on the virtual addresses of '01'-'16' by a page fault handler, according to a second embodiment.

FIG. 37 illustrates an example of page fault handling operations, which are executed on the virtual addresses VA of '01'-'16' by the page fault handler PFH, according to a second embodiment. Referring to FIG. 37, the page fault handler PFH may map a portion of the first application storage area SA_APP1 having the logical addresses LA of '21' to '36' to a portion of the virtual storage area VSA having the virtual addresses VA of '01' to '16' through steps S281, S282, S283 and S284. The page fault handler PFH may execute a page fault handling on each of the virtual addresses VA of '01', '02', '04', '08', and '16'.

In comparison with the first embodiment of FIG. 33, it may be possible to reduce the number of executions of the fault handling according to the second embodiment of FIG. 37. Thus, it may be possible to reduce the number of executions of the context switching, to more quickly execute the fault handlings, and thereby to increase operating speeds of the processor 310 and the memory system 300.

Figure 38:
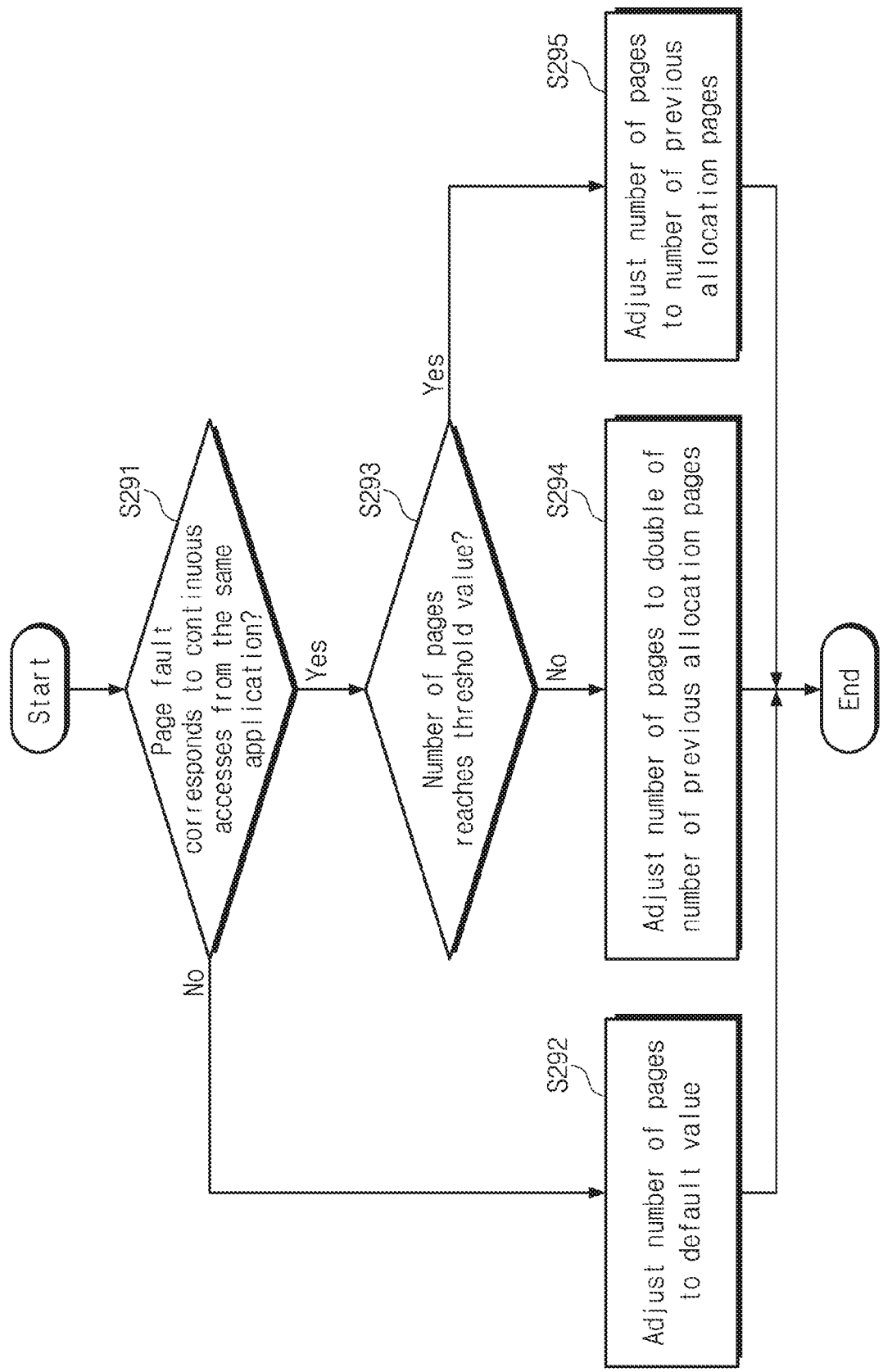
FIG. 38 illustrates an example of a method of adjusting the number of pages, according to some embodiments of the inventive concept.

FIG. 38 illustrates an example of a method of adjusting the number of pages, according to some embodiments of the inventive concept. Referring to FIGS. 28 and 38, in step S291, the page fault handler PFH may determine whether a page fault is caused by continuous (or successive) accesses from the same application (e.g., APP1) (for example, by accesses to the successive virtual addresses VA).

For example, the page fault handler PFH may determine whether a virtual address of an access causing the page fault and a virtual address of a previous access are successive. If the page fault is not caused by successive accesses (i.e., if a virtual address associated with the page fault and a virtual address of a previous access are not successive), a step S292 may be executed. In step S292, the page fault handler PFH may adjust the number of pages to a default value (e.g., '1'). Thereafter, the adjustment may be terminated.

If the page fault is caused by successive accesses (i.e., if a virtual address associated with the page fault and a virtual address of a previous access are successive), a step S293 may be executed. In step S293, the page fault handler PFH may determine whether the number of pages reaches a threshold value. If the number of pages does not reach the threshold value, a step S294 may be executed. In step S294, the page fault handler PFH may adjust the number of pages to two times the number of previously-allocated pages. Thereafter, the adjustment may be terminated.

If the number of pages reaches the threshold value, a step S295 may be executed. In step S295, the page fault handler PFH may adjust the number of pages to the number of previously-allocated pages. For example, the page fault handler PFH may adjust the number of pages to the same value as that in a previous fault handling operation. Thereafter, the adjustment may be terminated.

The inventive concept is not limited to the example in which the number of pages is adjusted to twice the number of previously-allocated pages by the page fault handler PFH. For example, the page fault handler PFH may increase the number of pages by a predetermined number. As an example, the page fault handler PFH may increase the number of pages by 2 or 4, when fault handlings associated with successive accesses are executed.

In some embodiments, the page fault handler PFH may execute the fault handlings associated with successive accesses in a divided manner including two or more phases. In the first phase, the page fault handler PFH may adjust the number of pages to have a value that is K times the number of previously-allocated pages, where K is a positive integer. In the second phase, the page fault handler PFH may adjust the number of pages to have a value that is obtained by adding a positive integer I to the number of previously-allocated pages.

In the aforementioned embodiments, the fault handling previously described with reference to FIGS. 31, 35, 36, and 37 (i.e., the fault handling according to the second embodiment) has been described to be executed on the first memory module 320. However, the fault handling described with reference to FIGS. 31, 35, 36, and 37 may be used for all of the first to fourth memory modules 320 to 350.

For example, when the fault handling previously described with reference to FIGS. 31, 35, 36, and 37 is executed on the second type memory modules 340 and 350, the logical addresses LA described with reference to FIGS. 31, 35, 36, and 37 may be changed to the physical addresses PA of the third or fourth memory module 340 or 350.

In some embodiments, the page fault handler PFH may execute the fault handling in a different manner, depending on the type of memory modules. For example, in the situation where a page fault occurs in the first type memory modules 320 and 330, the page fault handler PFH may execute the fault handling described with reference to FIGS. 31, 35, 36, and 37 (i.e., according to the second embodiment described hereinabove).

However, in the situation where a page fault occurs in the second type memory modules 340 and 350, the page fault handler PFH may execute the fault handling described with reference to FIGS. 31, 32, and 33 (i.e., according to the first embodiment described hereinabove). In some embodiments, information on types of the first to fourth memory modules 320 to 350 may be provided to the processor 310 from the SPD devices 325, 335, 345, and 355, at initialization.

Figure 39:
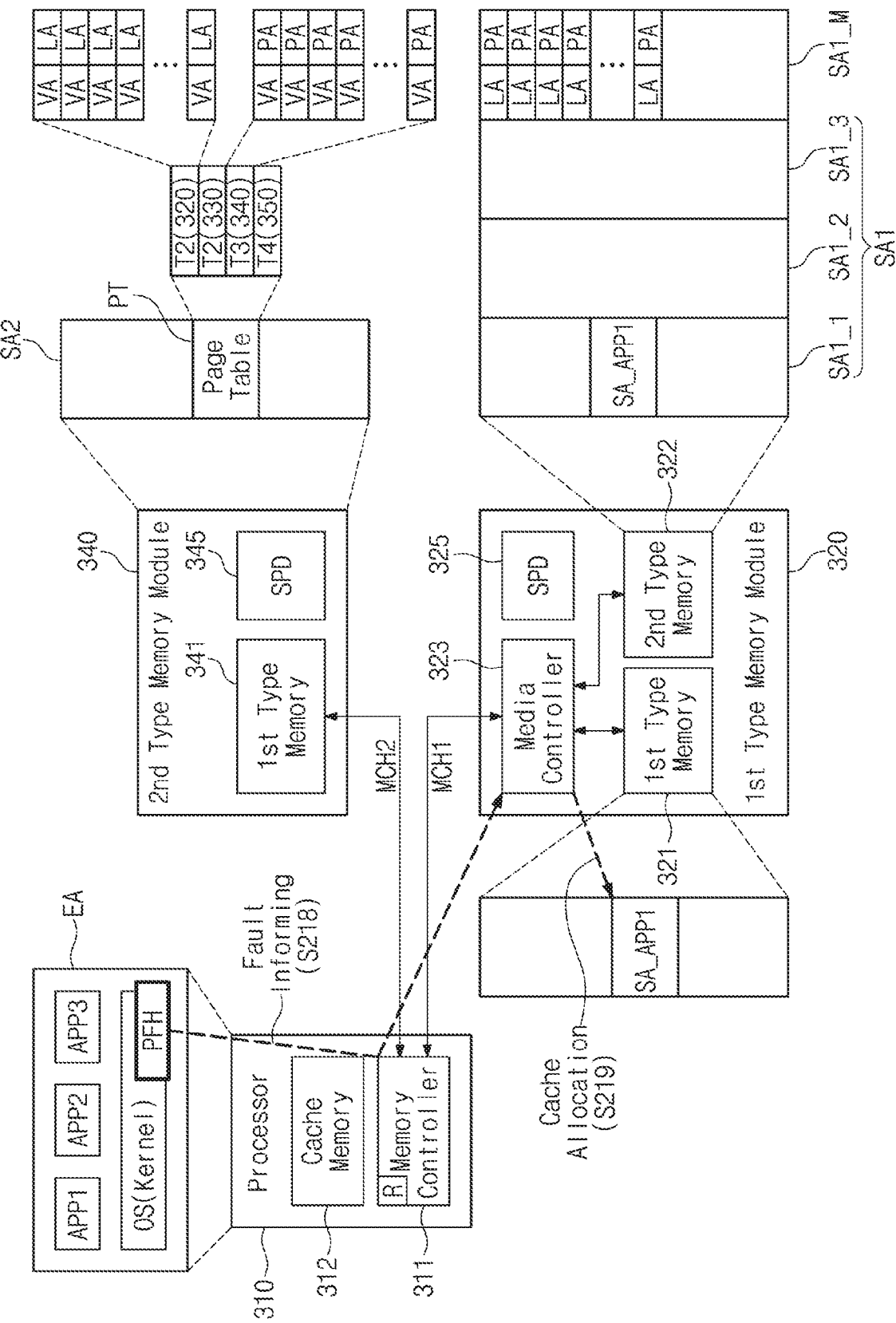
FIG. 39 illustrates an example in which results obtained by the fault handling are provided to a first memory module.

FIG. 39 illustrates an example in which results obtained by the fault handling are provided to the first memory module 320. Steps illustrated in FIG. 39 may be executed after the fault handling described with reference to FIGS. 29 and 30. Referring to FIGS. 27 and 39, the page fault handler PFH may execute fault informing operations, as shown by step S218.

For example, the page fault handler PFH may instruct the memory controller 311 to transmit the logical address LA, which is mapped during the fault handling, to the first memory module 320 associated with the corresponding logical address LA. The memory controller 311 may transmit the mapped logical address LA to the media controller 323 of the first memory module 320.

For example, the memory controller 311 may transmit a read command and a read address to the first memory module 320 to request a read operation. The memory controller 311 may transmit a write command and a write address to the first memory module 320 to request a write operation. The memory controller 311 may transmit the logical address LA, having a format different from the read command and the read address and from the write command and the write address, to the first memory module 320.

In some embodiments, the page fault handler PFH may execute the fault informing whenever the fault handling is executed. In certain embodiments, if the fault handling associated with successive addresses is repeated a specific number of times, the page fault handler PFH may execute the fault informing. In certain embodiments, if a new fault handling is not executed even when a specific time is elapsed after completion of a previous fault handling, the page fault handler PFH may execute the fault informing. Thus, the condition for the fault informing executed by the page fault handler PFH may be variously modified.

As described above, the fault handling may be executed when the first application APP1 requests allocation of a new memory. If the requested memory allocation is finished, the allocated memory may be exploited by the first application APP1. That is, if the fault handling is executed on a specific logical address LA, it may be expected that the specific logical address LA is planned to be accessed.

As shown by step S219 in FIG. 39, the media controller 323 may execute a cache allocation of mapping a storage space of the second type memory 322 corresponding to the specific logical address LA to the first type memory 321. For example, as the fault handling is executed on the logical addresses LA of the first application storage area SA_APP1 of the second type memory 322, the media controller 323 may map the first application storage area SA_APP1 to the first type memory 321.

In the case where the first application storage area SA_APP1 is mapped to the first type memory 321 by the media controller 323, a cache hit, not a cache miss, may occur in the first type memory 321, when the first application APP1 accesses the allocated memory. Thus, a speed of the memory system 300 may be increased.

Figure 40:
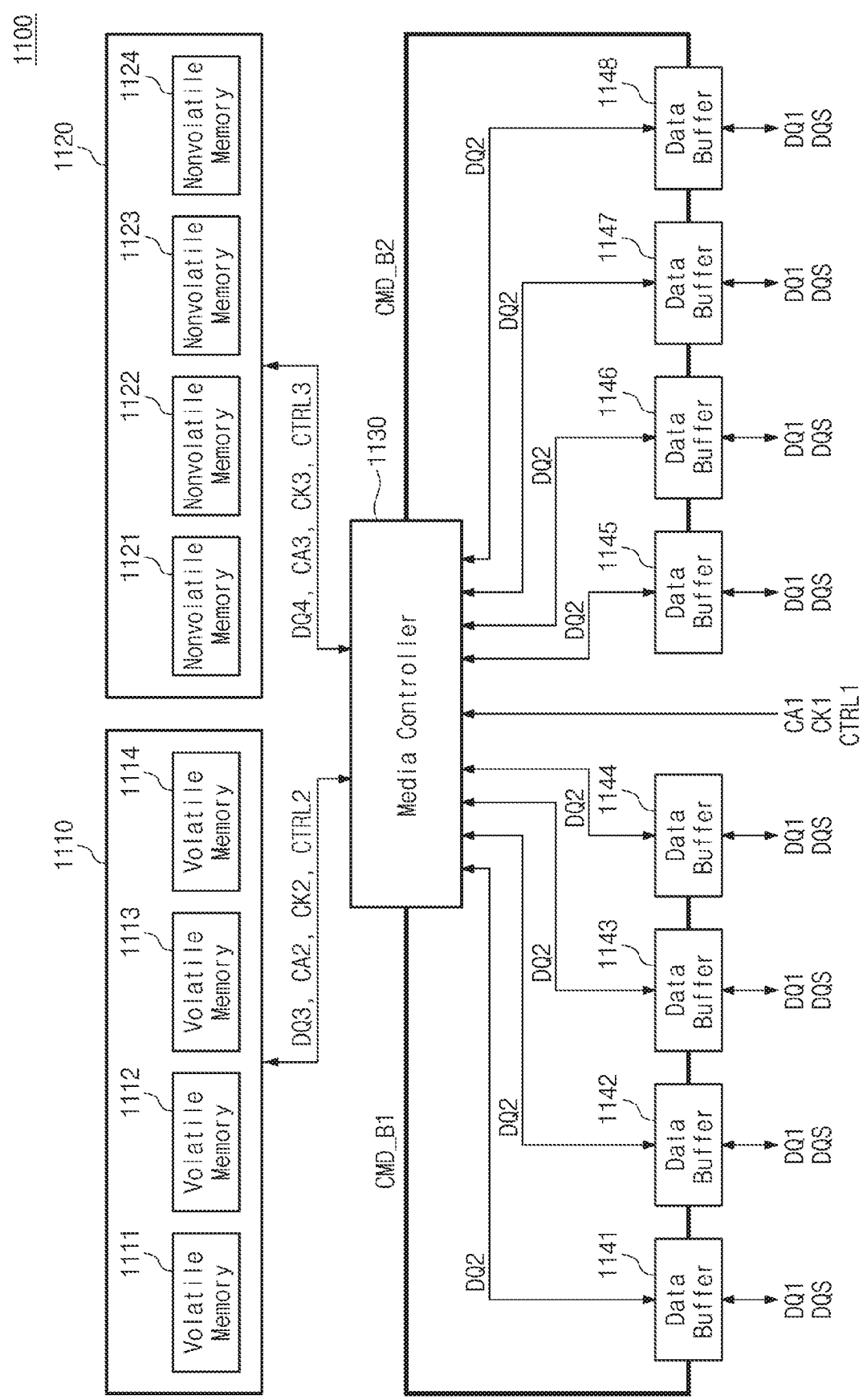
FIG. 40 is a block diagram illustrating a first type memory module according to some embodiments of the inventive concept.

FIG. 40 is a block diagram illustrating a first type memory module 1100 according to some embodiments of the inventive concept. In some embodiments, the first type memory module 1100 may be a memory module, which is provided to meet the requirements of the LRDIMM ("load reduced" DIMM) standard. Referring to FIGS. 27 and 40, the first type memory module 1100 may include a volatile memory device 1110, a non-volatile memory device 1120, a media controller 1130, and the first to eighth data buffers 1141 to 1148.

The volatile memory device 1110 may include first to fourth volatile memories 1111 to 1114. The first to fourth volatile memories 1111 to 1114 may be realized using a plurality of packages which are separated from each other. The first to fourth volatile memories 1111 to 1114 may include dynamic random access memories. The volatile memory device 1110 may be the first type memory 321 or 331.

The non-volatile memory device 1120 may include first to fourth non-volatile memories 1121 to 1124. The first to fourth non-volatile memories 1121 to 1124 may be realized using a plurality of packages which are separated from each other. The first to fourth non-volatile memories 1121 to 1124 may be different storage areas, which are provided in the non-volatile memory device 1120 and are identified with different addresses. The non-volatile memory device 1120 may be the second type memory 322 or 332.

In particular, the non-volatile memory device 1120 may include at least one of various non-volatile memory devices (e.g., including a FLASH memory device, a phase change memory device, a ferroelectric memory device, a resistive memory device, and a magnetic memory device).

The media controller 1130 may receive a first command and address CA1, a first clock signal CK1, and a first control signal CTRL1 from the memory controller 311. The media controller 1130 may exchange second data signals DQ2 with the first to eighth data buffers 1141 to 1148. The media controller 1130 may access the volatile memory device 1110 or the non-volatile memory device 1120, depending on the first command and address CA1, the first clock signal CK1, and the first control signal CTRL1.

The media controller 1130 may transmit a second command and address CA2, a second clock signal CK2, and a second control signal CTRL2 to the volatile memory device 1110 and may exchange third data signals DQ3 with the volatile memory device 1110. The media controller 1130 may transmit a third command and address CA3, a third clock signal CK3, and a third control signal CTRL3 to the non-volatile memory device 1120 and may exchange fourth data signals DQ4 with the non-volatile memory device 1120.

In some of these embodiments, the first command and address CA1, the second command and address CA2, and the third command and address CA3 may have different formats. In certain embodiments, at least two of the first command and address CA1, the second command and address CA2, and the third command and address CA3 may have the same format. For example, a format for the media controller 1130 to communicate with the volatile memory device 1110 may be different from a format for the media controller 1130 to communicate with the non-volatile memory device 1120.

The media controller 1130 may transmit a first buffer command CMD_B1 to control first to fourth data buffers 1141 to 1144. The media controller 1130 may transmit a second buffer command CMD_B2 to control fifth to eighth data buffers 1145 to 1148.

The first to eighth data buffers 1141 to 1148 may exchange first data signals DQ1 with the memory controller 311 in synchronization with data strobe signals DQS. The first to eighth data buffers 1141 to 1148 may transmit the first data signals DQ1 received from the memory controller 311 to the media controller 1130 as the second data signals DQ2.

The first to eighth data buffers 1141 to 1148 may transmit the second data signals DQ2, which are received from the media controller 1130 to the memory controller 311 as the first data signals DQ1. The first to eighth data buffers 1141 to 1148 may be realized using a plurality of packages which are separated from each other.

In some embodiments, the volatile memory device 1110 may be used as a cache memory of the non-volatile memory device 1120. A portion of the storage space of the non-volatile memory device 1120 may be mapped to the volatile memory device 1110.

When a first storage space, which is indicated by the first command and address CA1 received from the memory controller 311, is mapped to the volatile memory device 1110 (i.e., when a cache hit occurs), the media controller 1130 may transmit the second command and address CA2 to the volatile memory device 1110. The volatile memory device 1110 may execute a write or read operation, depending on the second command and address CA2.

In the case where the first storage space, which is indicated by the first command and address CA1 received from the memory controller 311, is not mapped to the volatile memory device 1110 (i.e., when a cache miss occurs), the media controller 1130 may map the first storage space, which is indicated by the first command and address CA1, to the volatile memory device 1110.

For example, it may be possible to secure a second storage space, which is associated with the first storage space of the non-volatile memory device 1120, in the volatile memory device 1110. If a storage space of the volatile memory device 1110 is insufficient, the media controller 1130 may discard other storage space, which is mapped to the volatile memory device 1110, or may return other storage space to the non-volatile memory device 1120, and in this case, it may be possible to secure a storage space in the volatile memory device 1110.

If there are data stored in the first storage space of the non-volatile memory device 1120, the media controller 1130 may copy the data in the first storage space to the second storage space of the volatile memory device 1110. Thereafter, the media controller 1130 may transmit the second command and address CA2 to the volatile memory device 1110. The volatile memory device 1110 may execute a write or read operation on the second storage space in response to the second command and address CA2.

In some embodiments, if the fault informing is transmitted through the first command and address CA1, the media controller 1130 may map a storage space of the non-volatile memory device 1120, which corresponds to a logical address or logical addresses included in the fault informing, to the volatile memory device 1110. The fault informing may be transmitted in a format different from the first command and address CA1 for the read operation or the first command and address CA1 for the write operation. For example, the media controller 1130 may receive the first command and address CA1 for the fault informing and may execute a cache allocation.

When the second storage space is released from the volatile memory device 1110, the media controller 1130 may check whether the second storage space is dirty. For example, in the case where a write operation has been executed on the second storage space, the second storage space may be determined to be dirty.

If the second storage space is not "dirty," the media controller 1130 may discard the data of the second storage space to release the second storage space. If the second storage space is "dirty," the media controller 1130 may write the data of the second storage space in the non-volatile memory device 1120 to return the second storage space. After the returning of the second storage space, the media controller 1130 may discard and release the second storage space.

In certain embodiments, the volatile memory device 1110 and the non-volatile memory device 1120 may be directly accessed by the memory controller 311. For example, in the case where the first command and address CA1 or the first control signal CTRL1 indicates the volatile memory device 1110, the media controller 1130 may transmit the second command and address CA2, the second clock signal CK2, or the second control signal CTRL2 to the volatile memory device 1110.

In the case where the first command and address CA1 or the first control signal CTRL1 indicates the non-volatile memory device 1120, the media controller 1130 may transmit the third command and address CA3, the third clock signal CK3, or the third control signal CTRL3 to the non-volatile memory device 1120.

In some embodiments, the number of volatile memories, the number of non-volatile memories, and the number of data buffers are not fixed. For example, the number of the volatile or non-volatile memories may be equal to the number of the data buffers, and the number of the data buffers may be changed to nine.

The media controller 1130 may store the mapping information between the logical addresses LA and the physical addresses PA in the first meta-storage area SA1_M (e.g., see FIG. 28) of the non-volatile memory device 1120. The first command and address CA1 received from the memory controller 311 may be based on the logical addresses LA of the non-volatile memory device 1120.

When the media controller 1130 accesses the non-volatile memory device 1120 according to the first command and address CA1, the media controller 1130 may convert the logical addresses LA into the physical addresses PA according to the mapping information. The media controller 1130 may use the converted physical addresses PA to access the non-volatile memory device 1120. That is, the third command and address CA3 may be based on the physical addresses PA.

The cache allocation of the non-volatile memory device 1120 to the volatile memory device 1110 may be executed based on the logical or physical addresses LA or PA. That is, the second command and address CA2 may be based on the logical or physical addresses LA or PA. In the media controller 1130, the logical or physical addresses LA or PA may be used to determine whether a cache hit or a cache miss occurs.

According to some embodiments of the inventive concept, when a page fault occurs, a memory system may allocate two or more pages during a single fault handling. Thus, it may be possible to more quickly execute fault handlings and to realize a memory system with an improved speed. In addition, according to some embodiments of the inventive concept, when the fault handling is executed, a semiconductor memory module may execute a cache allocation of addresses, which are allocated by the fault handling. Thus, it may be possible to more quickly execute an access following the fault handling and to realize a semiconductor memory module having improved speed.

Figure 41:
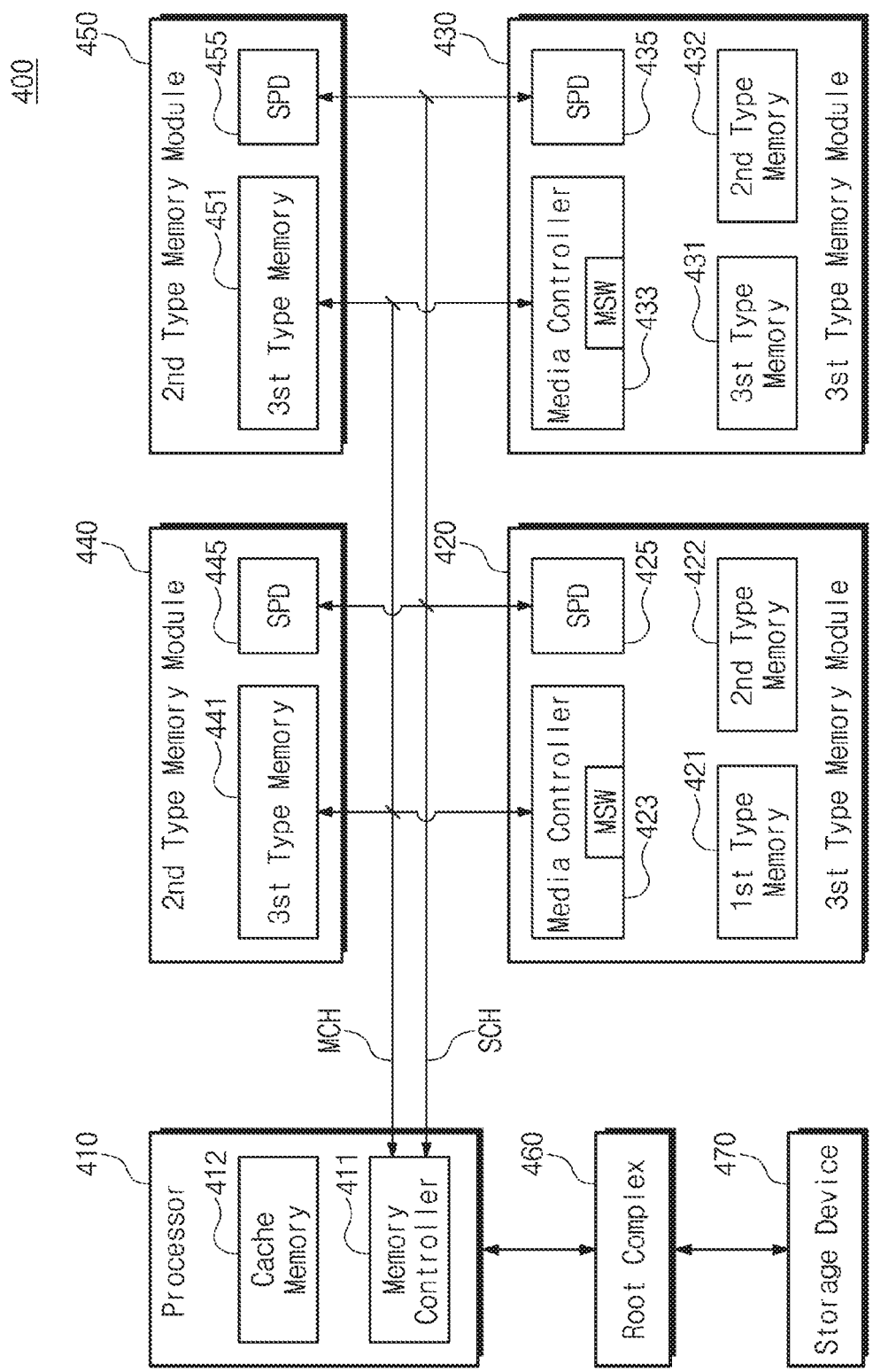
FIG. 41 is a block diagram illustrating a memory system according to an embodiment of the inventive concept.

FIG. 41 is a block diagram illustrating a memory system 400 according to an embodiment of the inventive concept. This memory system 400 may include a server such as an application server, a client server, or a data server. Or, the memory system 400 may include a personal computer or a workstation.

Referring to FIG. 41, the memory system 400 may include a processor 410, first to fourth memory modules 420 to 450, a root complex 460, and a storage device 470. The processor 410 may control components of the memory system 400 and operations of the components. The processor 410 may execute an operating system and applications and may process data by using the operating system or the applications.

The processor 410 may include a memory controller 411 and a cache memory 412, and the memory controller 411 may access the first to fourth memory modules 420 to 450 through main channels MCH and sub-channels SCH. The cache memory 412 may include a high-speed memory such as a static random access memory (SRAM).

The first to fourth memory modules 420 to 450 may be connected with the memory controller 411 through the main channels MCH and the sub-channels SCH. The main channels MCH may be channels which are used to store (i.e., write) data to the memory modules 420 to 450 (e.g., semiconductor memory modules) or to read data from the memory modules 420 to 450. The main channels MCH may include channels which are respectively provided with regard to the first to fourth memory modules 420 to 450.

The sub-channels SCH may provide additional functions associated with the first to fourth memory modules 420 to 450, except for storing or reading data to or from the first to fourth memory modules 420 to 450. For example, the first to fourth memory modules 420 to 450 may provide the memory controller 411 with their own unique information through the sub-channels SCH. The sub-channels SCH may include channels which are respectively provided with regard to the first to fourth memory modules 420 to 450.

The first to fourth memory modules 420 to 450 may be used as a main memory of the memory system 400. The first to fourth memory modules 420 to 450 may communicate with the memory controller 411 in compliance with one of standards of memory modules such as a dual in-line memory module (DIMM), a registered DIMM (RDIMM), and a load reduced DIMM (LRDIMM).

The root complex 460 may provide channels through which the processor 410 accesses various peripheral devices. For example, the storage device 470 may be connected to the root complex 460. The storage device 470 may include a hard disk drive, an optical disk drive, a solid state drive, etc.

The processor 410 may hierarchically manage the cache memory 412, the first to fourth memory modules 420 to 450 being the main memory, and the storage device 470. For example, the processor 410 may perform operations to transfer data between the storage device 470 and the main memory including the first to fourth memory modules 420 to 450. The processor 410 may also flush data, which need to be backed up, from the data stored in the main memory to the storage device 470.

A portion of a storage region of the main memory including the first to fourth memory modules 420 to 450 may be mapped onto the cache memory 412. And, when there is a need to access a specific storage space of the main memory, the processor 410 may determine whether the specific storage space has been mapped onto the cache memory 412.

For example, in the event the specific storage space has been mapped onto the cache memory 412, the processor 410 may access the specific storage space of the cache memory 412. However, in the event the specific storage space is not mapped onto the cache memory 412, the processor 410 may map (or fetch) a specific storage space of the first to fourth memory modules 420 to 450 onto the cache memory.

When a storage space of the cache memory 412 is insufficient, the processor 410 may release a storage space previously mapped onto the cache memory 412. In the case where data of a storage space to be released have been updated, the processor 410 may flush the updated data to the first to fourth memory modules 420 to 450. The first to fourth memory modules 420 to 450 may include heterogeneous memory modules. Thus, the first and second memory modules 420 and 430 may be first type memory modules, and the third and fourth memory modules 440 and 450 may be second type memory modules.

The first memory module 420 may include a first type memory 421, a second type memory 422, a media controller 423, and a serial presence detect (SPD) device 425. The second memory module 430 may include a first type memory 431, a second type memory 432, a media controller 433, and an SPD device 435. Below, the first type memory modules 420 and 430 will be described with reference to the first memory module 420.

The first type memory 421 may include a high-speed volatile memory, such as a dynamic random access memory (DRAM). The second type memory 422 may include a nonvolatile memory which is typically slower in speed than the first type memory 421, but is typically greater in capacity than the first type memory 421. For example, the second type memory 422 may include a nonvolatile memory such as a flash memory, a phase change memory, a ferroelectric memory, a magnetic (or magneto-resistive) memory, a resistive memory, etc.

The media controller 423 may transfer an access command, which is transferred through a corresponding channel of the main channels MCH from an external host device (e.g., the memory controller 411 or the processor 410) to the first type memory 421 or the second type memory 422. Depending on a command, the media controller 423 may exchange data with an external host device, for example, the memory controller 411 or the processor 410 through the corresponding channel of the main channels MCH.

The media controller 423 may provide a storage capacity or a storage space of the second type memory 422 to an external host device, such as the memory controller 411 within the processor 410. The media controller 423 may use the first type memory 421 as a cache memory of the second type memory 422.

In addition, the media controller 423 may map a portion of a storage space of the second type memory 422 onto the first type memory 421. In the case where a storage space of the second type memory 422 associated with an access command from an external host device, for example, the memory controller 411 or the processor 410 has been mapped onto the first type memory 421, the media controller 423 may transfer the access command to the first type memory 421.

In the case where the storage space of the second type memory 422 associated with the access command from the external host device, for example, the memory controller 411 or the processor 410 is not mapped onto the first type memory 421, the media controller 423 may map (or backup) the storage space onto the first type memory 421 from the second type memory 422.

When a storage space of the first type memory 421 is insufficient, the media controller 423 may release a storage space previously mapped onto the first type memory 421. In the case where data of a storage space to be released have been updated, the media controller 423 may flush the updated data to the second type memory 422.

The media controller 423 may include a media switch MSW. The media switch MSW may be implemented in the form of hardware which is included as a part of an integrated circuit in the media controller 423 or may be implemented in the form of firmware which is executed in the media controller 423. The media switch MSW may control communication with the first type memory 421 and the second type memory 422.

For example, during training, the media switch MSW may be configured to transfer a training command from an external host device, for example, the memory controller 411 or the processor 410 only to the first type memory 421. After the training is completed, the media switch MSW may transfer the access command to the first type memory 421 or the second type memory 422, depending on the access command from the external host device.

The SPD device 425 may communicate with an external host device, for example, the memory controller 411 or the processor 410 through a corresponding channel of the sub-channels SCH. For example, when the first memory module 420 is initialized, the SPD device 425 may provide information stored therein to an external host device, for example, the memory controller 411 or the processor 410 through the corresponding channel of the sub-channels SCH.

For example, the SPD device 425 may store information about a storage capacity to be provided to an external host device, for example, the memory controller 411 or the processor 410 as a storage space of the first memory module 420. For example, the SPD device 425 may store information about the storage capacity of the second type memory 422. During initialization, the SPD device 425 may provide information about the storage capacity of the second type memory 422 to an external host device, for example, the memory controller 411 or the processor 410.

For example, the capacity information stored in the SPD device 425 may include information about a user capacity of the second type memory 422. The storage capacity of the second type memory 422 may include a user capacity, a meta capacity, and a reserved capacity. The user capacity may be a storage capacity which the second type memory 422 provides to the external host device, for example, the memory controller 411.

The meta capacity may be a storage capacity which is used to store various meta information for managing the second type memory 422 and which is not disclosed to the external host device, for example, the memory controller 411. The reserved capacity may be a storage capacity which is secured to manage the second type memory 422 and which is not disclosed to the external host device, for example, the memory controller 411.

The capacity information stored in the SPD device 425 may include information about the user capacity of the second type memory 422. Below, the capacity of the second type memory 422 may be understood as indicating the user capacity of the second type memory 422.

The third memory module 440 may include a first type memory 441 and an SPD device 445. The fourth memory module 450 may include a first type memory 451 and an SPD device 455. Below, the second type memory modules 440 and 450 will be described with reference to the third memory module 440.

The first type memory 441 may include a dynamic random access memory like the first type memory 421 of the first memory module 420. The SPD device 445 may communicate with an external host device, for example, the memory controller 411 or the processor 410 through a corresponding channel of the sub-channels SCH. For example, when the third memory module 440 is initialized, the SPD device 445 may provide information stored therein to an external host device, for example, the memory controller 411 or the processor 410 through the corresponding channel of the sub-channels SCH.

For example, the SPD device 445 may store information about a storage capacity provided to an external host device, for example, the memory controller 411 or the processor 410 as a storage space of the third memory module 440. For example, the SPD device 445 may store information about the storage capacity of the first type memory 441. During initialization, the SPD device 445 may provide information about the storage capacity of the first type memory 441 to an external host device, for example, the memory controller 411 or the processor 410.

When a power is supplied to the memory system 400, the memory controller 411 may perform initialization on the first to fourth memory modules 420 to 450. For example, the SPD devices 425 to 455 of the first to fourth memory modules 420 to 450 may provide the capacity information to the memory controller 411 through the sub-channels SCH, respectively.

The SPD devices 425 and 435 of the first type memory modules 420 and 430 may provide the pieces of capacity information of the second type memories 422 and 432 to the memory controller 411, respectively. The SPD devices 445 and 455 of the second type memory modules 440 and 450 may provide the pieces of capacity information of the first type memories 441 and 451 to the memory controller 411, respectively. For example, the memory controller 411 may read the storage capacities from the SPD devices 425 to 455, respectively.

After initialization is performed, the memory controller 411 may perform training on the first to fourth memory modules 420 to 450. For example, the memory controller 411 may perform training by transferring a training command to the first to fourth memory modules 420 to 450.

The training command may include two or more read commands or two or more write commands. During the training operation, by iteratively transferring commands to the first to fourth memory modules 420 to 450, the memory controller 411 may align timings to transfer commands in synchronization with a clock signal and may check the integrity of storage capacities of the first to fourth memory modules 420 to 450.

The storage spaces of the second type memory modules 440 and 450, which the memory controller 411 identifies, are storage spaces of the first type memories 441 and 451. Accordingly, the training command of the memory controller 411 is transferred to the first type memories 441 and 451.

The storage spaces of the first type memory modules 420 and 430, which the memory controller 411 identifies, are storage spaces of the second type memories 422 and 432. Accordingly, the memory controller 411 may transfer the training command to the storage spaces of the second type memories 422 and 432.

However, the training command of the memory controller 411, which controls main memories, may be determined to coincide with a first type memory, that is, a dynamic random access. A structure or a function of the memory controller 411 should be changed to allow the memory controller 411 to perform training on the storage spaces of the second type memories 422 and 432. However, the change of the existing memory controller 411 causes a significant increase in costs.

To solve the above issue, the first type memory modules 420 and 430 according to an embodiment of the inventive concept may provide the storage spaces of the second type memories 422 and 432 to the memory controller 411 while performing the training operation only on the first type memory 421. Accordingly, it may be possible to provide the storage spaces of the second type memories 422 and 432 to the memory controller 411 without having any influence on the training operation of the memory controller 411 or without causing an abnormal operation.

In the above embodiment, the storage device 470 is illustrated as being connected to the root complex 460. However, a device connected to the root complex 460 is not limited to the storage device 470.

Figure 42:
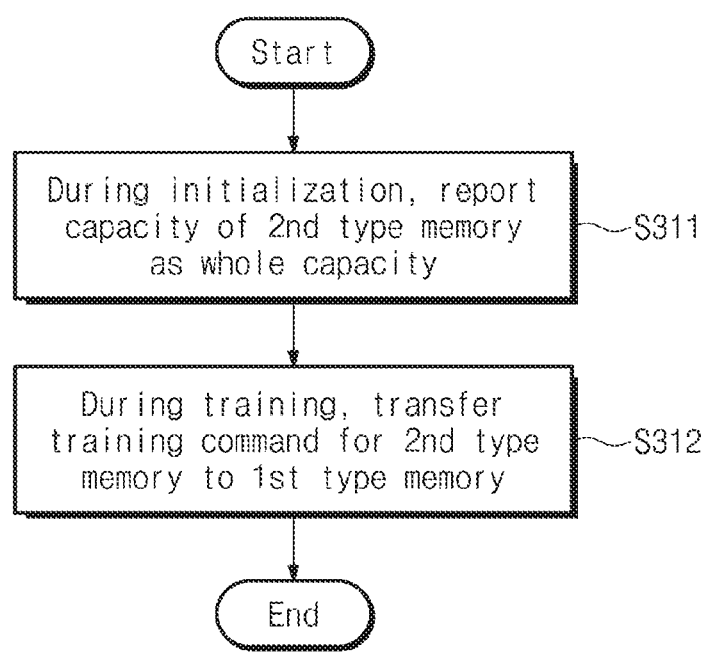
FIG. 42 is a flowchart illustrating an operating method of a first type memory module according to an embodiment of the inventive concept.

FIG. 42 is a flowchart illustrating an operating method of the first type memory module 420 or 430 according to an embodiment of the inventive concept. In an embodiment, an operating method of the first memory module 420 will be described. However, the second memory module 430 may also perform the operating method described with reference to FIG. 42.

Referring to FIGS. 41 and 42, in operation S311, during initialization, the first memory module 420 reports a capacity of the second type memory 422 as the whole capacity of the first memory module 420. For example, the first memory module 420 may transfer capacity information stored in the SPD device 425 to the memory controller 411. The capacity information may include capacity information of the second type memory 422.

In operation S312, during training, the first memory module 420 may transfer the training command for the second type memory 422 received from the memory controller 411 to the first type memory 421. The first type memory 421 may perform the training operation with the memory controller 411 in response to the training command.

By transferring the training command for the second type memory 422 to the first type memory 421 instead of the second type memory 422, the first memory module 420 may have no influence on the training operation and it may therefore prevent the occurrence of an abnormal operation during the training operation.

Figure 43:
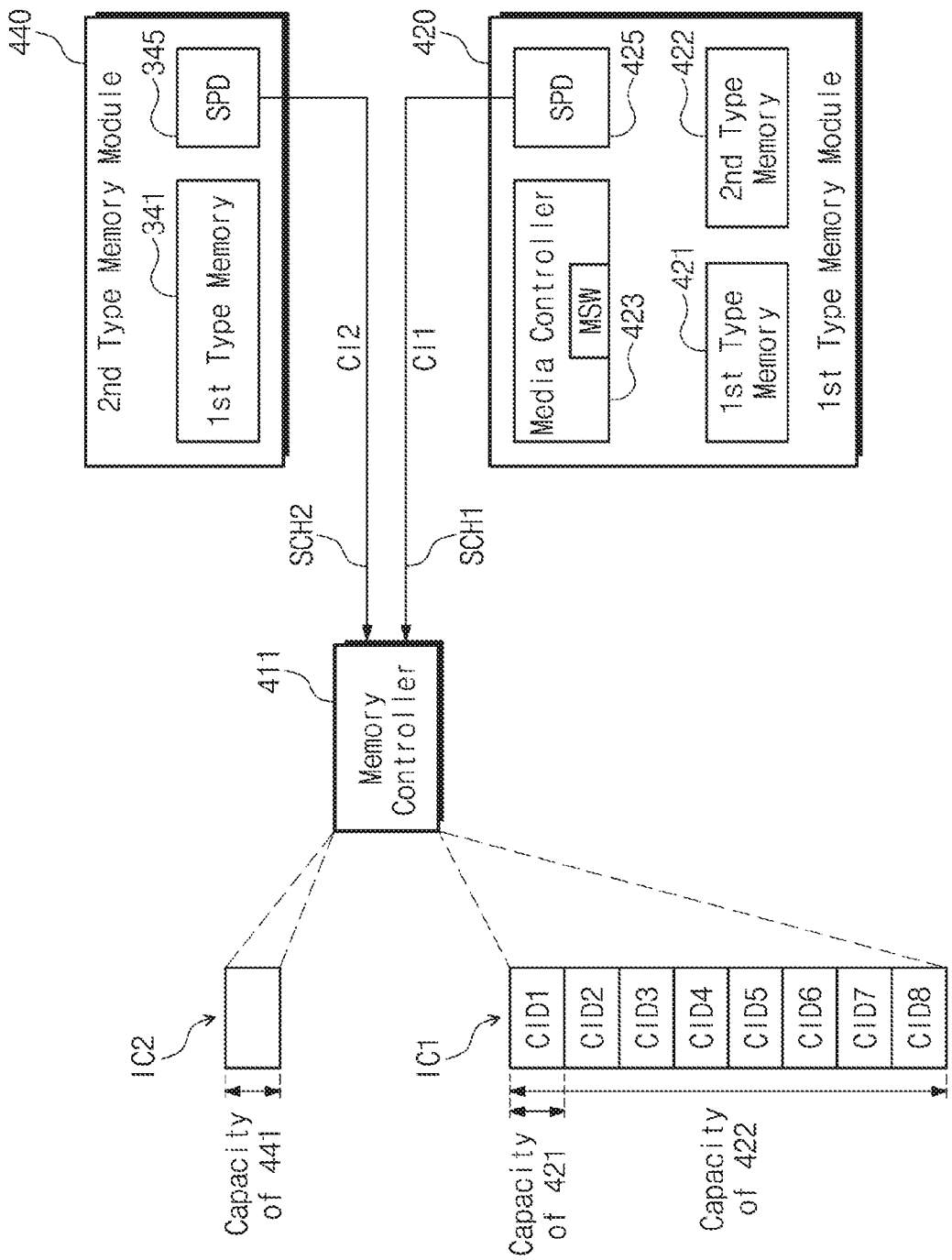
FIG. 43 is a diagram illustrating an example in which a memory controller performs initialization with first and third memory modules.

FIG. 43 is a diagram illustrating an example in which the memory controller 411 performs initialization with the first and third memory modules 420 and 440. Referring to FIG. 43, the first and third memory modules 420 and 440 may transfer first and second capacity information CI1 and CI2 to the memory controller 411 through first and second sub-channels SCH1 and SCH2, respectively. For example, the memory controller 411 may read the first and second capacity information CI1 and CI2 from the SPD devices 425 and 445, respectively.

The first capacity information CI1 may indicate the capacity of the second type memory 422 as a capacity of the first memory module 420. The capacity of the second type memory 422, which the first capacity information CI1 indicates, may be associated with a capacity (hereinafter referred to as a "unit capacity") of the first type memory 421. For example, the capacity of the second type memory 422 included in the first capacity information CI1 may be N times the unit capacity (N being a positive integer).

The first capacity information CI1 may indicate that "N" memories each having the unit capacity exist. For example, the first capacity information CI1 may indicate that "N" ranks each having the unit capacity exist. For example, the first capacity information CI1 may represents the storage space of the second type memory 422 as "N" storage spaces (e.g., virtually distinguished memories) which are distinguished physically or logically.

The memory controller 411 may identify the capacity of the first memory module 420 as a first identified capacity IC1 depending on the first capacity information CI1. The memory controller 411 may assign identifiers to the "N" virtually distinguished memories each having the unit capacity. For example, in the case where "N" is 8, the memory controller 411 may assign first to eighth identifiers CID1 to CID8 to "8" virtual memories having the unit capacity.

Depending on the first capacity information CI1, the memory controller 411 may identify that the "N" memories (e.g., the virtually distinguished memories) are present in the first memory module 420. After the initialization and the training are completed, the memory controller 411 may individually access the "N" memories. After the initialization and the training are completed, the media controller 423 of the first memory module 420 may identify accesses to the "N" memories as accesses to the physically or logically distinguished storage spaces of the second type memory 422.

The second capacity information CI2 may indicate the capacity of the first type memory 441 as the capacity of the third memory module 440. Depending on the second capacity information CI2, the memory controller 411 may identify the capacity of the third memory module 440 as a second identified capacity IC2. For example, depending on the second capacity information CI2, one or more identifiers may be assigned to the second identified capacity IC2.

Figure 44:
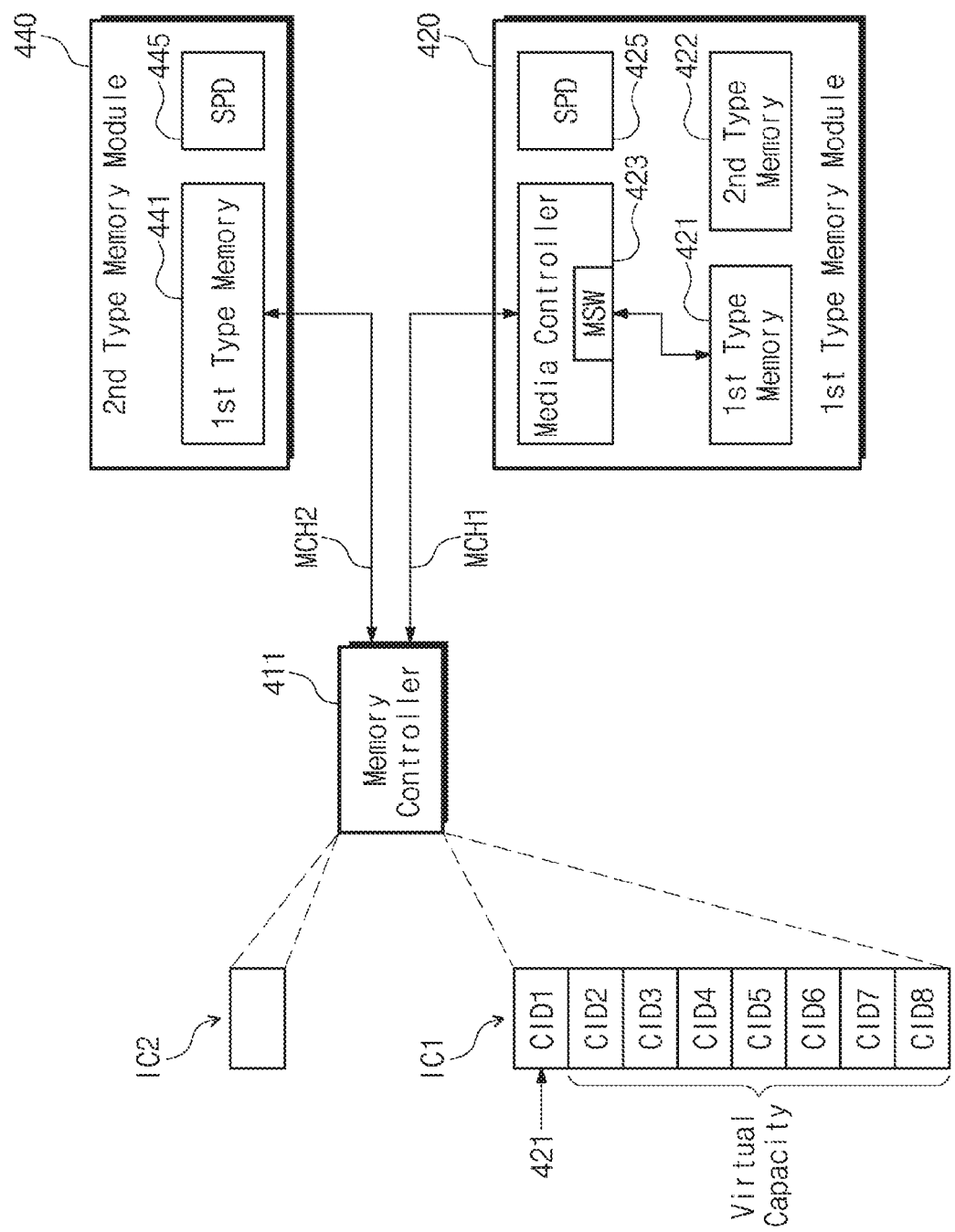
FIG. 44 is a diagram illustrating an example in which a media controller establishes a channel with a memory controller during training after initialization is performed.

FIG. 44 is a diagram illustrating an example in which the media controller 423 establishes a channel with the memory controller 411 during training after initialization is performed. Referring to FIG. 44, a media may communicate with the memory controller 411 through a first main channel MCH1, as shown. The media switch MSW of the media controller 423 may establish a channel only with the first type memory 421 without establishing a channel with the second type memory 422.

A capacity, which corresponds to the first type memory 421, of the first identified capacity IC1 identified by the memory controller 411, for example, includes a capacity to which the first identifier CID1 is assigned and may have an actual storage space. A capacity, which does not correspond to the first type memory 421, of the first identified capacity IC1, for example, includes capacities which the second to eighth identifiers CID2 to CID8 are assigned and may be a virtual capacity which does not have an actual storage space.

Unlike the first memory module 420, the first type memory 441 of the third memory module 440 may establish a direct channel with the memory controller 411 through a second main channel MCH2, as shown. The second identified capacity IC2 may have the storage space of the first type memory 441 in the third memory module 440.

Figure 45:
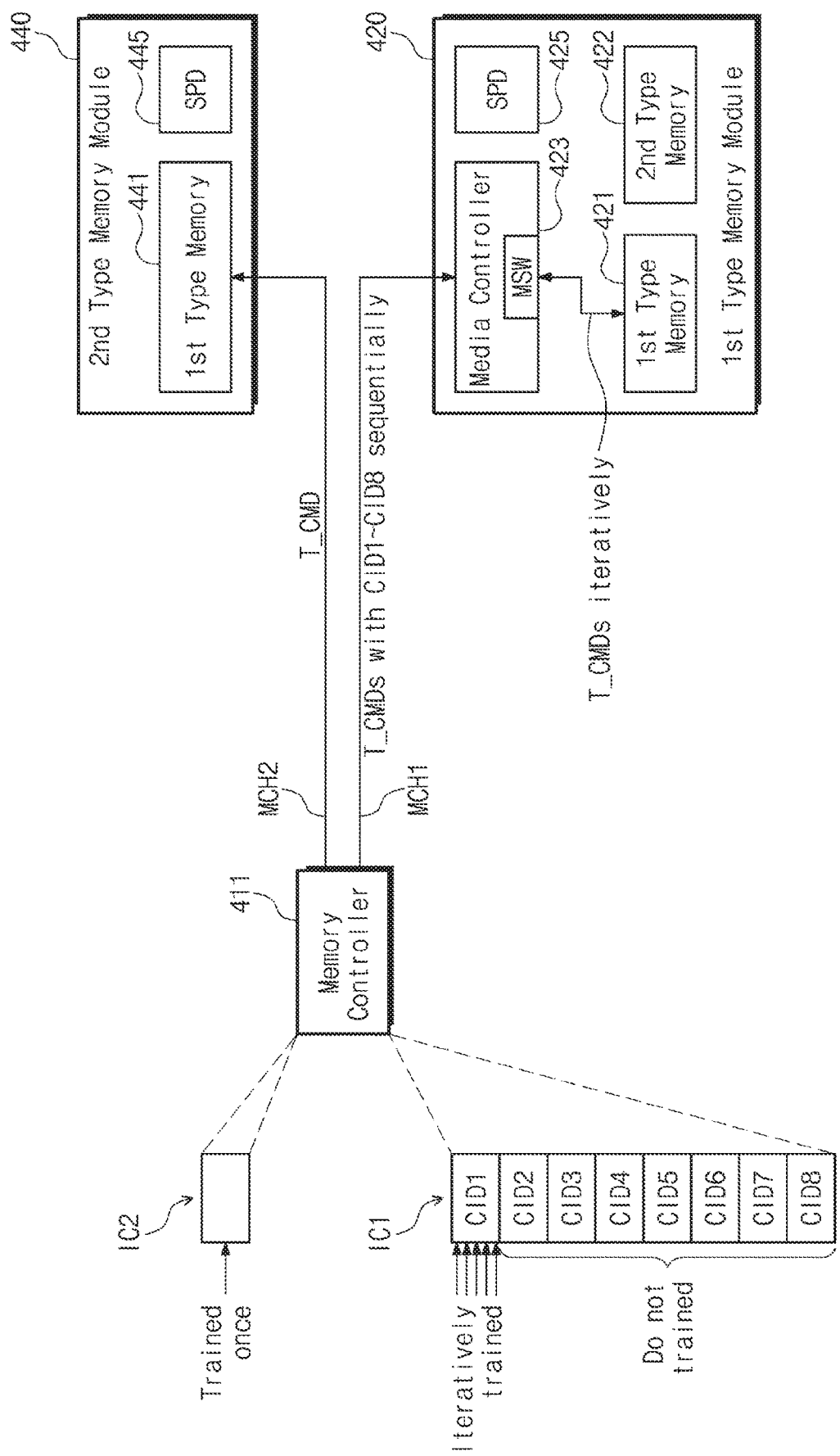
FIG. 45 is a diagram illustrating an example in which a media controller controls training commands during training.

FIG. 45 is a diagram illustrating an example in which the media controller 423 controls training commands during training. Referring to FIG. 45, depending on the first identified capacity IC1, the memory controller 411 recognizes memories having the first to eighth identifiers CID1 to CID8 to be present in the first memory module 420.

Accordingly, the memory controller 411 may sequentially transfer training commands T_CMD having the first to eighth identifiers CID1 to CID8 to the first memory module 420. For example, the memory controller 411 may transfer the training command T_CMD having the first identifier CID1 to the first memory module 420 and may attempt a training operation on a memory having the first identifier CID1.

After the training operation associated with the memory having the first identifier CID1 is completed, the memory controller 411 may transfer the training command T_CMD having the second identifier CID2 to the first memory module 420 and may attempt a training operation on a memory having the second identifier CID2. For example, the training command T_CMD may include various commands such as at least one write command, at least one read command, or at least one refresh command.

The media switch MSW may transfer all the training commands T_CMD to the first type memory 421. For example, the media switch MSW may iteratively transfer the training commands T_CMD to the first type memory 421, regardless of the identifiers CID1 to CID8 included in the training commands T_CMD. For example, the media switch MSW may recognize all the training commands T_CMD to have the first identifier CID1.

As the memory controller 411 sequentially transfers the training commands T_CMD having the first to eighth identifiers CID1 to CID8, the middle switch MSW may iteratively transfer the training commands T_CMD corresponding to the first to eighth identifiers CID1 to CID8 to the first type memory 421.

That is, in the first identified capacity IC1, virtual capacities having the second to eighth identifiers CID2 to CID8 may not be trained, and the capacity of the first type memory 421 having the first identifier CID1 may be iteratively trained.

The first type memory 421 coincides with a training procedure of the first main channel MCH1. Accordingly, when the training commands T_CMD are transferred from the memory controller 411 to the first type memory 421, the first memory module 420 may be prevented from having an influence on the training operation with the memory controller 411 or from causing an abnormal operation.

The initialization or training for the second type memory 422 may be performed by the media controller 423. Accordingly, the initialization and training of the first type memory 421 and the second type memory 422 may be performed without an abnormal operation.

Unlike the first memory module 420, the training command T_CMD for the third memory module 440 is directly transferred to the first type memory 441. The first type memory 441 coincides with a training procedure of the second main channel MCH2. Accordingly, the training of the third memory module 440 is performed without an abnormal operation.

As described above, during the training, the media switch MSW may prevent the training commands T_CMD from be transferred from the memory controller 411 to the second type memory 422. During the training, the media switch MSW may transfer the training commands T_CMD from the memory controller 411 to the first type memory 421. Accordingly, the training operation may be performed without an abnormal operation in the first memory module 420 which provides the second type memory 422 not coinciding with the training procedure of the first main channel MCH1 as a storage space.

Figure 46:
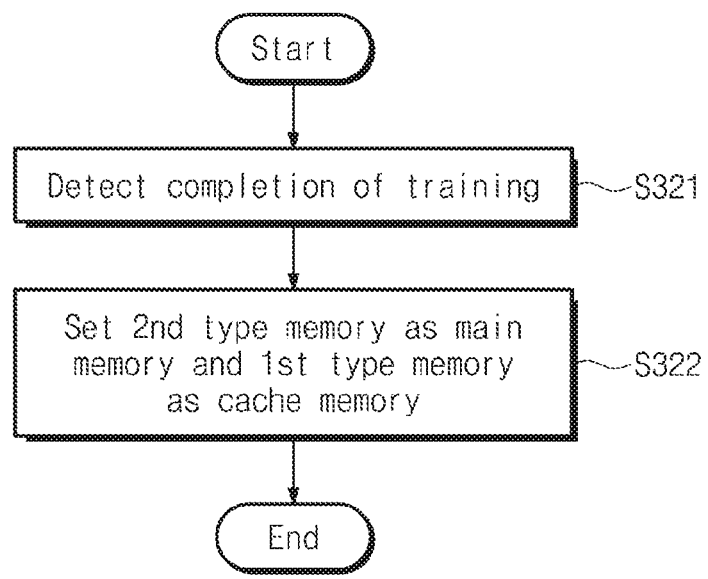
FIG. 46 is a diagram illustrating an example in which a media controller establishes a channel with a second type memory.

FIG. 46 is a diagram illustrating an example in which the media controller 423 establishes a channel with the second type memory 422. Referring to FIGS. 45 and 46, in operation S321, the media controller 423 may detect (or determine) completion of training. When the completion of the training is detected, in operation S322, the media controller 423 may set the second type memory 422 as a main memory and the first type memory 421 as a cache memory.

For example, depending on the first identified capacity IC1, the memory controller 411 may identify the storage capacity of the first memory module 420 as the storage capacity of the second type memory 422. A portion of the storage space of the second type memory 422 may be mapped onto the first type memory 421. In the case where a storage space of the second type memory 422, which the memory controller 411 will access, has been mapped onto the first type memory 421, the media controller 423 may transfer an access command from the memory controller 411 to the first type memory 421.

In the case where the storage space of the second type memory 422, which the memory controller 411 will access, is not mapped onto the first type memory 421, the media controller 423 may map the access-requested storage space onto the first type memory 421 from the second type memory 422. Afterwards, the media controller 423 may transfer the access command from the memory controller 411 to the first type memory 421.

According to an embodiment of the inventive concept, the first memory module 420 may transfer an access request of the memory controller 411 to the first type memory 421, securing an access speed which the memory controller 411 requires. Also, the first memory module 420 may map the storage space of the second type memory 422 onto the first type memory 421 (e.g., backup) or may flush the storage space of the first type memory 421 to the second type memory 422, providing a large storage capacity and a nonvolatile function of the second type memory 422 to the memory controller 411.

Figure 47:
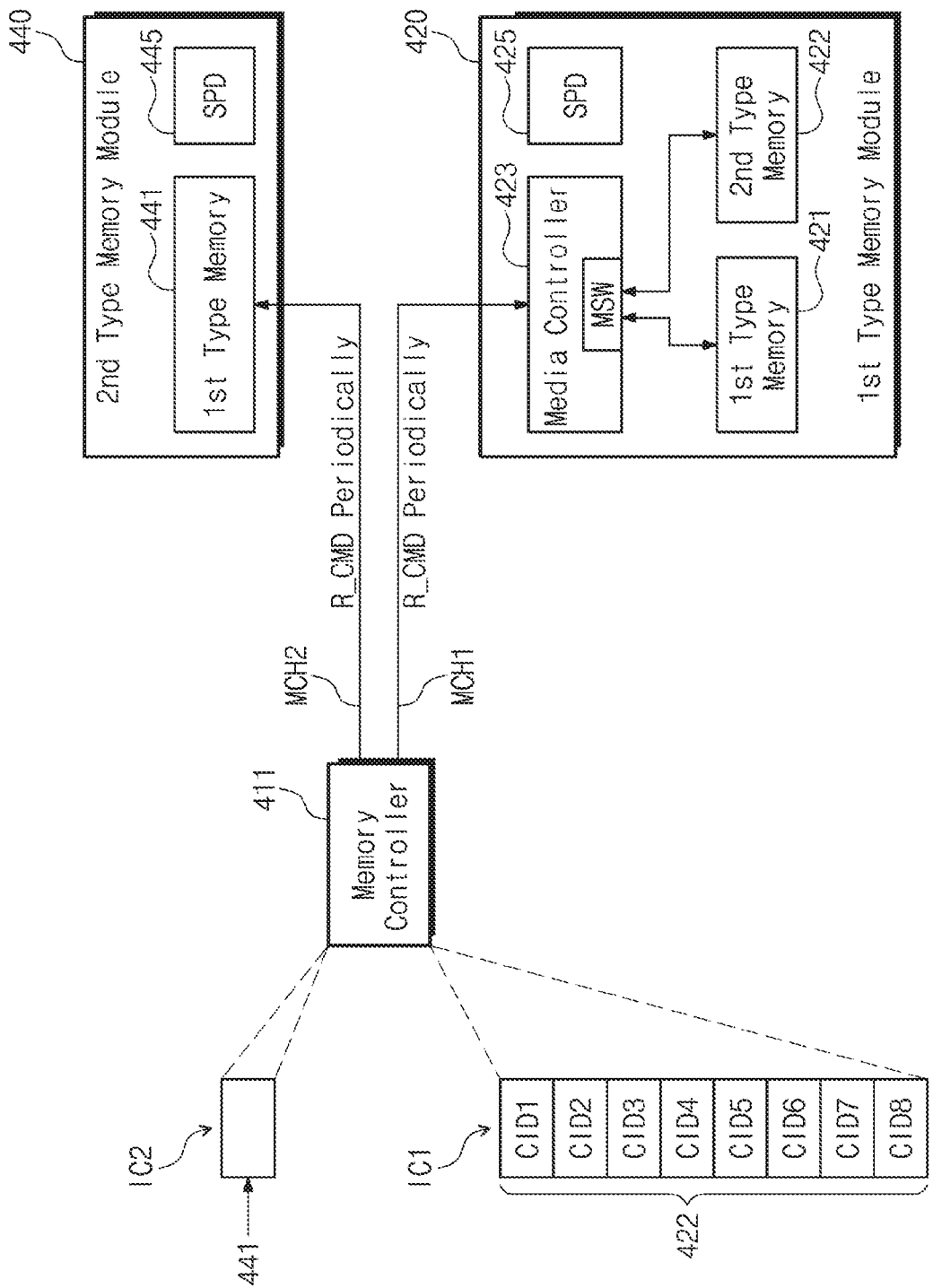
FIG. 47 is a diagram illustrating an example in which a media controller detects completion of training.

FIG. 47 is a diagram illustrating an example in which the media controller 423 detects completion of training. Referring to FIG. 45, initialization and training are performed by a basic input output system (BIOS). When the initialization and the training are completed, the memory controller 411 may periodically transfer a refresh command R_CMD to the first memory module 420 and the third memory module 440.

When the refresh command R_CMD is periodically (or continuously) received, the media controller 423 may detect that the training is completed. For example, when only the refresh command R_CMD is periodically (or continuously) received by the specific number of times or more while any other command is not inserted between the refresh commands R_CMD, the media controller 423 may detect that the training is completed.

When the completion of the training is detected, the media switch MSW may establish a channel with both the first type memory 421 and the second type memory 422. In an embodiment, the refresh command R_CMD may be received in the form of a noise while the training is performed. The media controller 423 may determine whether only the refresh command R_CMD is periodically or continuously received, distinguishing the refresh command R_CMD received in the form of a noise during the training and the refresh command R_CMD received after the training is completed.

Figure 48:
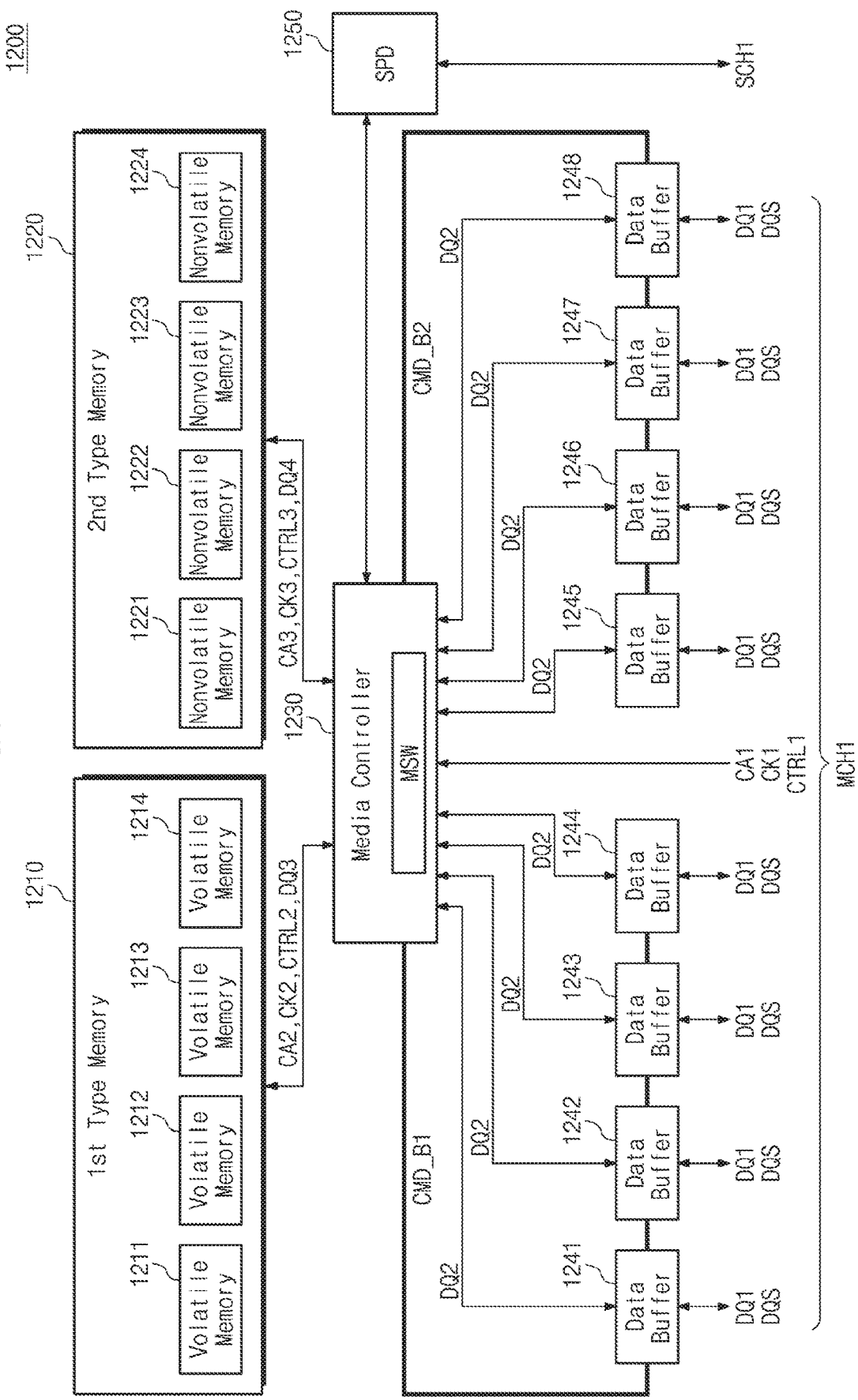
FIG. 48 is a block diagram illustrating a first type memory module according to an embodiment of the inventive concept.

FIG. 48 is a block diagram illustrating a first type memory module 1200 according to an embodiment of the inventive concept. In this embodiment, the first type memory module 1200 may be a memory module based on the LRDIMM standard. In an embodiment, the first type memory module 1200 will be described with reference to the first memory module 420.

Referring to FIGS. 41 and 48, the first type memory module 1200 includes a first type memory 1210, a second type memory 1220, a media controller 1230, first to eighth data buffers 1241 to 1248, and an SPD device 1250.

The first type memory 1210 may be a volatile memory. For example, the first type memory 1210 includes first to fourth volatile memories 1211 to 1214. The first to fourth volatile memories 1211 to 1214 may be implemented with packages separated from each other. The first to fourth volatile memories 1211 to 1214 may include dynamic random access memories.

The second type memory 1220 may be a nonvolatile memory. For example, the second type memory 1220 may include first to fourth nonvolatile memories 1221 to 1224. The first to fourth nonvolatile memories 1221 to 1224 may be implemented with packages separated from each other. The first to fourth nonvolatile memories 1221 to 1224 may be storage regions of the second type memory 1220, which are identified by different addresses.

The second type memory 1220 may include at least one of various nonvolatile memory devices such as a flash memory device, a phase change memory device, a ferroelectric memory device, a resistive memory device, and a magneto-resistive memory device.

The media controller 1230 may receive a first command and address CA1, a first clock signal CK1, and a first control signal CTRL1 from the memory controller 411. The media controller 1230 may exchange second data signals DQ2 with the first to eighth data buffers 1241 to 1248. The media controller 1230 may access the first type memory 1210 or the second type memory 1220 depending on the first command and address CA1, the first clock signal CK1, and the first control signal CTRL1.

The media controller 1230 may transfer a second command and address CA2, a second clock signal CK2, and a second control signal CTRL2 to the first type memory 1210 and may exchange third data signals DQ3 with the first type memory 1210. The media controller 1230 may transfer a third command and address CA3, a third clock signal CK3, and a third control signal CTRL3 to the second type memory 1220 and may exchange fourth data signals DQ4 with the second type memory 1220.

In an embodiment, the first command and address CA1, the second command and address CA2, and the third command and address CA3 may have different formats. For another example, at least two of the first command and address CA1, the second command and address CA2, and the third command and address CA3 may have the same format. For example, a format which the media controller 1230 uses to communicate with the first type memory 1210 may be different from a format which the media controller 1230 uses to communicate with the second type memory 1220.

The media controller 1230 may transfer a first buffer command CMD_B1 to control the first to fourth data buffers 1241 to 1244. The media controller 1230 may transfer a second buffer command CMD_B2 to control the fifth to eighth data buffers 1245 to 1248.

The media controller 1230 may include the media switch MSW. As described above, when the first type memory module 1200 is initialized, the media switch MSW may transfer a training command for the second type memory 1220, which is transferred from the memory controller 411, to the first type memory 1210. When training is completed, the media switch MSW may provide a storage capacity of the second type memory 1220 to the memory controller 411 as a storage space of the first type memory module 1200.

The first to eighth data buffers 1241 to 1248 may exchange the first data signals DQ1 with the memory controller 411 through the first main channel MCH1 in synchronization with data strobe signals DQS. The first to eighth data buffers 1241 to 1248 may transfer the first data signals DQ1 received from the memory controller 411 through the first main channel MCH1 to the media controller 1230 as the second data signals DQ2.

The first to eighth data buffers 1241 to 1248 may transfer the second data signals DQ2 received from the media controller 1230 to the memory controller 411 through the first main channel MCH1 as the first data signals DQ1. The first to eighth data buffers 1241 to 1248 may be implemented with packages separated from each other.

The SPD device 1250 may communicate with the media controller 1230 and may communicate with the memory controller 411 through a first sub-channel SCH1. The SPD device 1250 may be based on at least one of various communication manners such as a system management bus (SMBus) and an inter-integrated circuit (I2C).

In an embodiment, the first type memory 1210 may be used as a cache memory of the second type memory 1220. A portion of the storage space of the second type memory 1220 may be mapped onto the first type memory 1210.

When a first storage space indicated by the first command and address CA1 received from the memory controller 411 has been mapped onto the first type memory 1210, that is, when a cache hit occurs, the memory controller 411 may transfer the second command and address CA2 to the first type memory 1210. The first type memory 1210 may perform a read or write operation depending on the second command and address CA2.

When the first storage space indicated by the first command and address CA1 received from the memory controller 411 is not mapped onto the first type memory 1210, that is, when a cache miss occurs, the memory controller 411 may map the first storage space indicated by the first command and address CA1 onto the first type memory 1210.

For example, a second storage space associated with the first storage space of the second type memory 1220 may be secured for the first type memory 1210. When a storage space of the first type memory 1210 is insufficient, the media controller 1230 may secure a storage space at the first type memory 1210 by discarding any other storage space mapped onto the first type memory 1210 or returning any other storage space to the second type memory 1220.

In the case where data have been stored in the first storage space of the second type memory 1220, the media controller 1230 may copy data of the first storage space to the second storage space of the first type memory 1210. Afterwards, the media controller 1230 may transfer the second command and address CA2 to the first type memory 1210. The first type memory 1210 may perform a read or write operation on the second storage space in response to the second command and address CA2.

When intending to release the second storage space from the first type memory 1210, the media controller 1230 may check whether the second storage space is "dirty." For example, when a write operation is performed on the second storage space, the second storage space may be determined as being "dirty."

In the case where the second storage space is not "dirty," the media controller 1230 may release the second storage space by discarding data of the second storage space. In the case where the second storage space is "dirty," the media controller 1230 may return the second storage space by writing data of the second storage space to the second type memory 1220. After the second storage space is returned, the media controller 1230 may release the second storage space by discarding the second storage space.

For another example, the first type memory 1210 and the second type memory 1220 may be directly accessed by the memory controller 411. For example, when the first command and address CA1 or the first control signal CTRL1 indicates the first type memory 1210, the media controller 1230 may convey the second command and address CA2, the second clock signal CK2, or the second control signals CTRL2 to the first type memory 1210.

When the first command and address CA1 or the first control signal CTRL1 indicates the second type memory 1220, the media controller 1230 may convey the third command and address CA3, the third clock signal CK3, or the third control signal CTRL3 to the second type memory 1220.

In an embodiment, the number of volatile memories, the number of nonvolatile memories, and the number of data buffers are not limited. The number of volatile memories or nonvolatile memories may be the same as the number of data buffers. The number of data buffers may be changed to "9".

Figure 49:
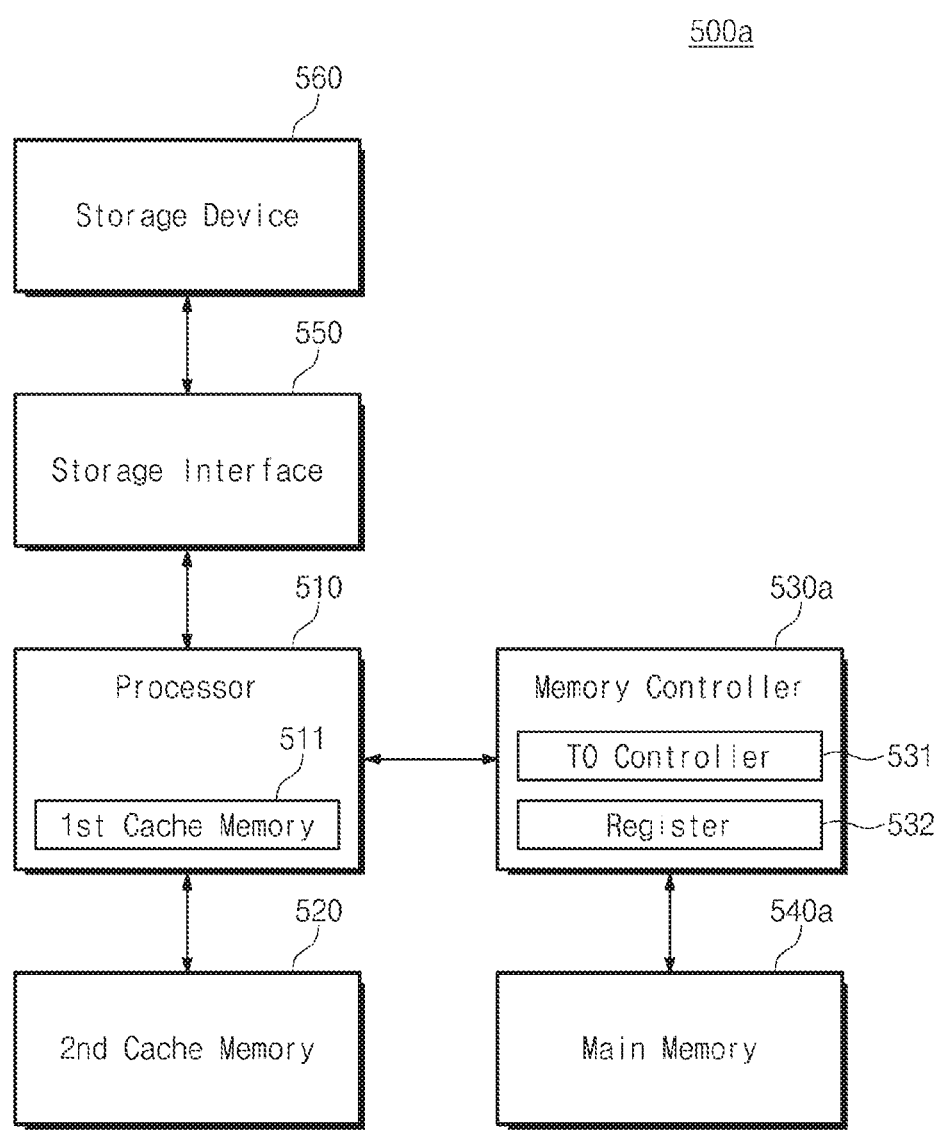
FIG. 49 is a block diagram illustrating a computing device according to some embodiments of the present inventive concept.

FIG. 49 is a block diagram illustrating a computing device 500a according to some embodiments of the inventive concept. For example, the computing device 500a may include servers such as an application server, a client server, and a data server. In some embodiments, the computing device 500a may include a personal computer or a workstation.

Referring to FIG. 49, the computing device 500a may include a processor 510, a second cache memory 520, a memory controller 530a, a main memory 540a, a storage interface 550, and a storage device 560. It will be understood that, although the terms first, second, third, etc. may be used herein to describe various elements, elements should not be limited by these terms; rather, these terms are only used to distinguish one element from another element. Thus, a first element discussed below could be termed a second element without departing from the scope of the present inventive concepts.

The processor 510 may control components of the computing device 500a and operations of the components. The processor 510 may execute an operating system and applications, and process data using the operating system and the applications. The processor 510 may include a first cache memory 511. The first cache memory 511 may include a high-speed memory such as a static random access memory (SRAM).

The second cache memory 520 may communicate with the processor 511. The second cache memory 520 may include a high-speed random access memory such as a static random access memory (SRAM) and a dynamic random access memory (DRAM).

The memory controller 530a may access the main memory 540a in response to a request of the processor 510. For example, the memory controller 530a may be based on one of standards of memory modules such as a dual in-line memory module (DIMM), a registered DIMM (RDIMM), a load reduced DIMM (LRDIMM), etc. In some embodiments, the memory controller 530a may be disposed outside the processor 510 as shown in FIG. 49 or may be included in the processor 510.

The memory controller 530a may include a time-out controller 531 and a register 532. The time-out controller 531 may measure a time when the memory controller 530a accesses the main memory 540a. The register 532 may store various parameters associated with the memory controller 530a.

For example, the register 532 may store various time-out values associated with when the memory controller 530a accesses the main memory 540a. The time-out controller 531 may control a time-out when the memory controller 530a accesses the main memory 540a based on the time-out values stored in the register 532.

The main memory 540a may include a storage class memory (SCM) that has a nonvolatile storage capability or a large capacity and has an access speed and a random access capability similar to a dynamic random access memory (DRAM).

To support compatibility with existing computing devices, the main memory 540a may be implemented based on one of the standards of the memory modules such as DIMM, RDIMM, LRDIMM, etc. The memory controller 530a and the main memory 540a may form a memory system.

The storage interface 550 may receive a request of the processor 510 or transmit data to the storage device 560. The storage interface 550 may transmit data received from the storage device 560 to the processor 510. The storage interface 550 may be based on one of various standards such as a peripheral component interconnect express (PCIe), a non-volatile memory express (NVMe), a serial advanced technology attachment (SATA), etc.

The storage device 560 may store data received from the storage interface 550 in response to a request received from the storage interface 550. The storage device 560 may transmit the stored data through the storage interface 550 in response to a request received from the storage interface 550.

The storage device 560 may include a nonvolatile storage medium and a controller to control the nonvolatile storage medium. The storage device 560 may include a hard disk drive (HDD), a solid state drive (SDD), etc.

The processor 510 may process data hierarchically. For example, a source data of the operating system, a source data of the application, and a user data, which are used in the computing device 500a, may be stored in the storage device 560. The user data may include data generated by a user of the operating system, the application, or the computing device 500a.

When a particular data (e.g., the source data and/or the user data) needed by the processor 510 is stored in the storage device 560, the processor 510 may read the particular data from the storage device 560 and may store the particular data to the main memory 540a. The processor 510 may backup the particular data stored in the main memory 540a to the storage device 560 when the particular data is updated or modified.

Some of the storage areas of the main memory 540a may be mapped to the second cache memory 520. Some of storage areas of the second cache memory 520 may be mapped to the first cache memory 511. In some embodiments, at least one of the first and second cache memories 511 and 520 in the computing device 500a may be omitted.

In an embodiment, the main memory 540a may have the same structure as described referring to FIG. 26, and operate identically as described referring to FIG. 26. In another embodiment, the main memory 540a may have the same structure as described referring to FIG. 40, and operate identically as described referring to FIG. 40.

Figure 50:
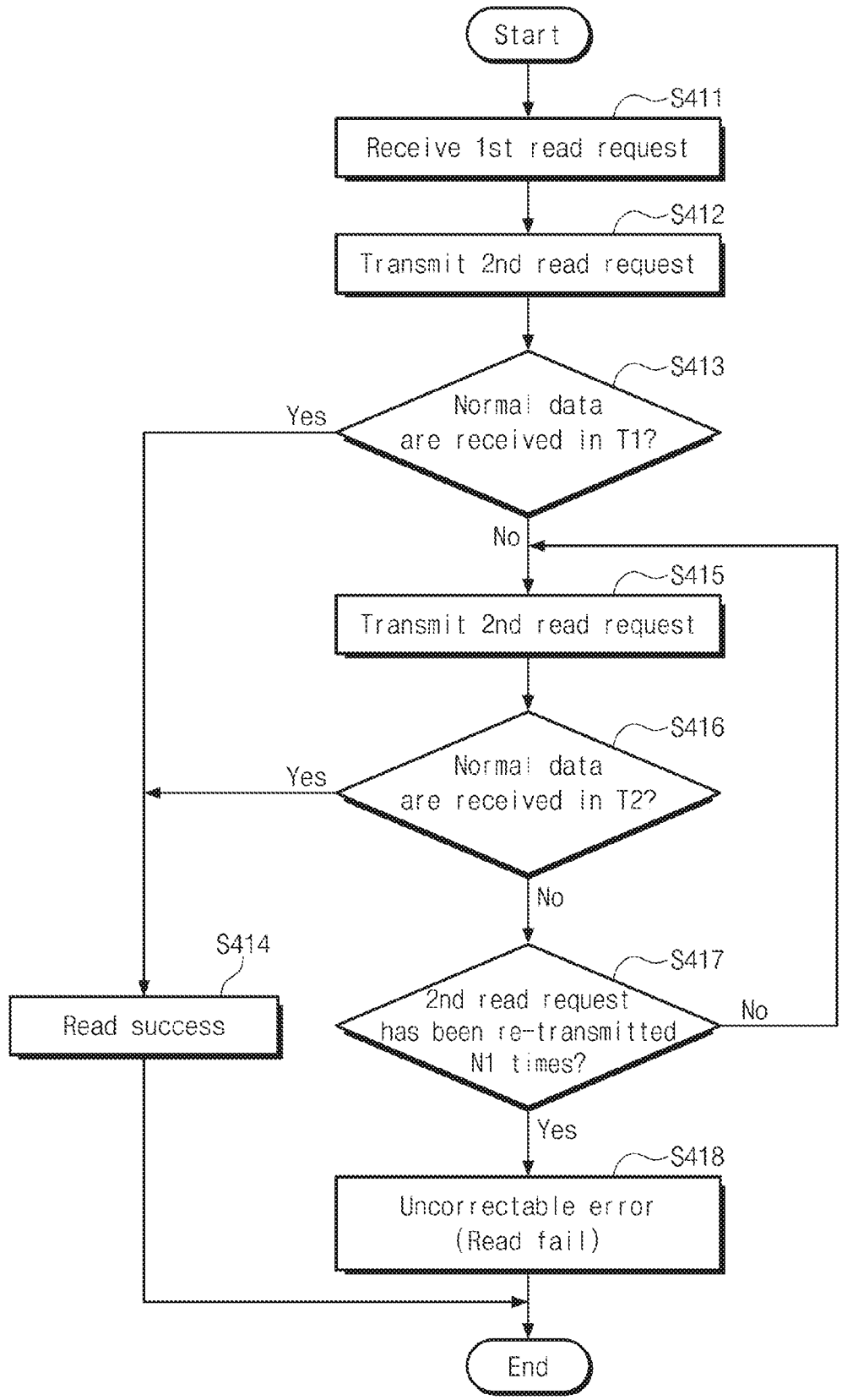
FIG. 50 is a flowchart for describing a read operation of the memory controller 530a for the main memory 540a according to some embodiments of the present inventive concept.

FIG. 50 is a flowchart for describing a read operation of the memory controller 530a for the main memory 540a. Referring to FIG. 49, FIG. 26 or 40, and FIG. 50, in operation S411, the memory controller 530a may receive a first read request. For example, the memory controller 530a may receive the first read request from the processor 510.

In operation S412, the memory controller 530a may transmit a second read request to the media controller 1230. For example, the memory controller 530a may generate the second read request using the first read request. A format of the first read request may be the same as or different from a format of the second read request. One or more the second read requests may be generated from one first read request.

In operation S413, the memory controller 530a may determine whether a normal data is received within a first time T1. For example, the normal data may include an error-free data or correctable data having an error within a correctable range. The correctable range may be determined according to a type of an error correction code used to communicate between the memory controller 530a and the media controller 1230.

Unlike the normal data, data having an error or data having an error outside the correctable range may be an error data. When the normal data is received within the first time T1, in operation S414, a read success may be determined. The memory controller 530a may transmit the received normal data to the processor 510.

When the normal data is not received within the first time T1 or the error data is received within the first time T1, in operation S415, the memory controller 530a may retransmit the second read request to the media controller 1230. For example, the second read request transmitted in operation S415 may be the same as the second read request transmitted in operation S412. Operation S415 may be referred to as a read retry.

In operation S416, the memory controller 530a may determine whether the normal data is received within a second time T2. The second time T2 may be equal to or different from the first time T1. When the normal data is received within the second time T2, in operation S414, the read success may be determined.

When the normal data is not received within the second time T2, operation S417 may be performed. In operation S417, the memory controller 530a may determine whether the second read request is retransmitted at least the number of times (N1 times) of a first value N1. For example, the memory controller 530*a* may determine whether the read retry is performed by the number of times of a first value N1.

When the read retry is not performed by the number of times of the first value N1, in operation S415, the read retry may be performed. When the read retry is performed by the number of times of the first value N1, operation S418 may be performed. In operation S418, when an uncorrectable error occurs, the memory controller 530*a* may determine a read fail. This prevents the read requests of the memory controller 530*a* from becoming stuck in an endless loop.

Figure 51:
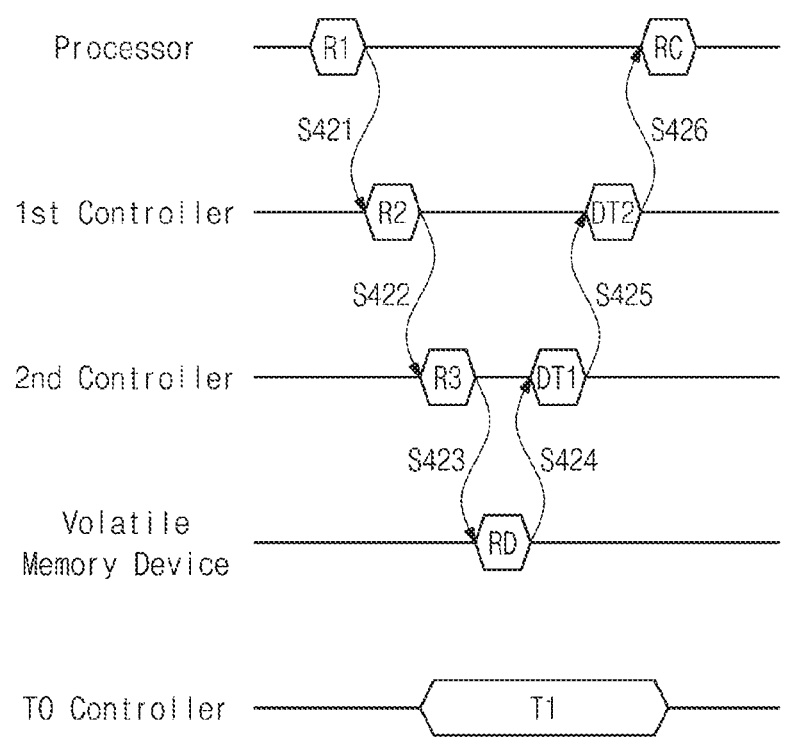
FIG. 51 is a timing diagram of an example read operation according to the operating method illustrated in FIG. 50 according to some embodiments of the present inventive concept.

FIG. 51 is an example for describing a read operation according to the operating method illustrated in FIG. 50. For example, the first command and address CA1 may be associated with the volatile memory device 1210, and a read operation performed in the volatile memory device 1210 is illustrated in FIG. 51.

Referring to FIG. 49 to FIG. 51, the processor 510 may generate a first read request R1. In operation S421, the processor 510 may transmit the first read request R1 to the memory controller 530*a*. The memory controller 530*a* may generate a second read request R2 according to the first read request R1.

In operation S422, the memory controller 530*a* may transmit the second read request R2 to the media controller 1230. The second read request R2 may be transmitted to the media controller 1230 as the first command and address CA1. According to transmitting the second read request R2, the time-out controller 531 may begin measuring (or counting) for the first time T1 (operation S413 shown in FIG. 50). In other words, a timer associated with first time T1 may be started after transmitting the second read request R2 by the memory controller 530*a* and/or upon receipt of the second read request R2 by the media controller 1230.

The media controller 1230 may generate a third read request R3 according to the second read request R2. In operation S423, the media controller 1230 may transmit the third read request R3 to the volatile memory device 1210. The third read request R3 may be transmitted to the volatile memory device 1210 as the second command and address CA2.

For example, the media controller 1230 may not process the second read request R2 and may transmit the unprocessed second read request R2 to the volatile memory device 1210 as the third read request R3. In some embodiments, the media controller 1230 may process the second read request R2 into a form appropriate to the volatile memory device 1210, and may transmit the processed second read request R2 to the volatile memory device 1210 as the third read request R3.

The volatile memory device 1210 may perform a read operation RD in response to the third read request R3. Data read from the volatile memory device 1210 may be transmitted to the media controller 1230. In operation S424, the read operation RD may be completed.

The media controller 1230 may perform a first data transmission DT1 to transmit the data read from the volatile memory device 1210 to the memory controller 530*a*. In operation S425, the first data transmission DT1 may be completed, and the data may be transmitted to the memory controller 530*a*.

The memory controller 530*a* may receive data from the main memory 540*a* before the first time T1 passes after transmitting the second read request R2. For example, the received data may be the normal data. Therefore, the memory controller 530*a* may determine the read success.

The memory controller 530*a* may perform a second data transmission DT2 to transmit data received from the media controller 1230 to the processor 510. In operation S426, the second data transmission DT2 may be completed, and the data may be transmitted to the processor 510. The processor 510 may determine a read completion RC.

Figure 52:
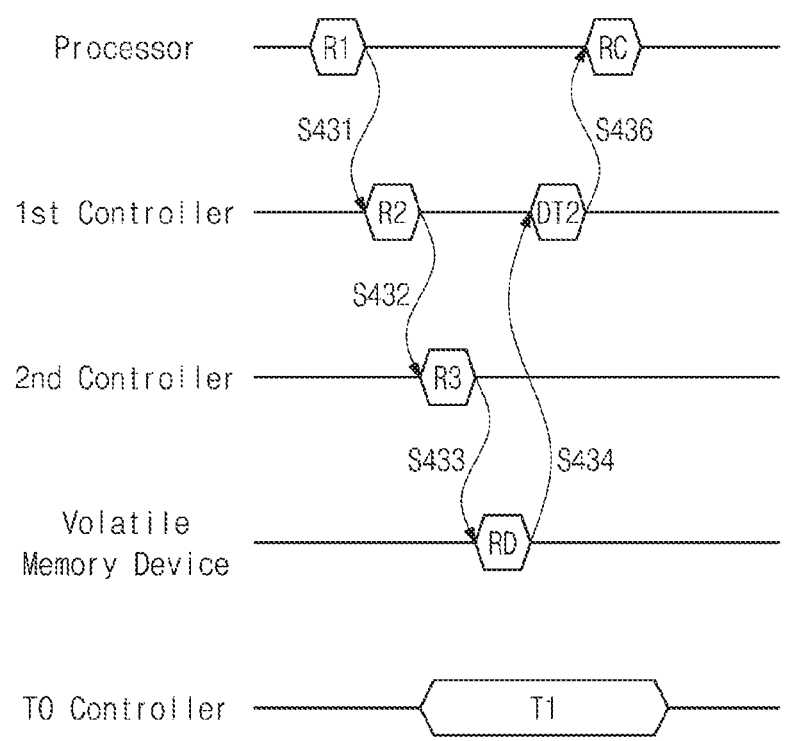
FIG. 52 is a timing diagram of an example read operation illustrated in FIG. 50 according to some embodiments of the present inventive concept.

FIG. 52 is an example for the read operation illustrated in FIG. 51. Referring to FIG. 49 to FIG. 50 and FIG. 52, since operation S431 to operation S433 are the same as operation S421 to operation S423 shown in FIG. 51, detailed description thereof will be omitted.

When the volatile memory device 1210 performs the read operation RD, in operation S434, the read data may be directly transmitted to the memory controller 530*a* through the media controller 1230 and the first to eighth data buffers 1241 to 1248 without being controlled and buffered by the media controller 1230. Since LRDIMM is based on the dynamic random access memory (DRAM), the volatile memory device 1210 may communicate directly with the memory controller 530*a*.

Operation S436 may be the same as operation S426 shown in FIG. 51. When the data read from the volatile memory device 1210 is directly transmitted to the memory controller 530*a*, a time until the memory controller 530*a* receives data after transmitting the second read request R2 may be decreased.

Figure 53:
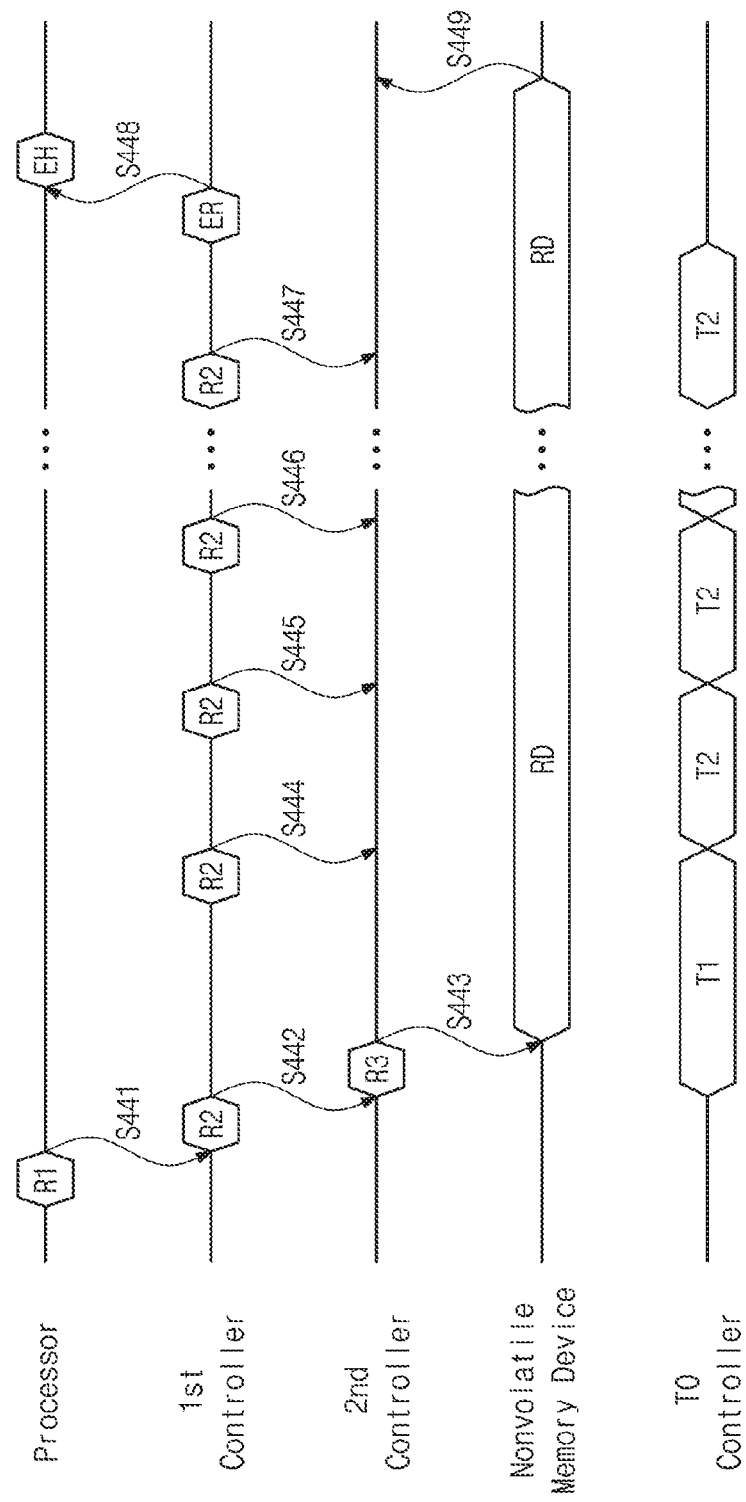
FIG. 53 is an example for describing a read operation according to the operating method illustrated in FIG. 50 according to some embodiments of the present inventive concept.

FIG. 53 is an example embodiment for describing a read operation according to the operating method illustrated in FIG. 50. For example, the first command and address CA1 may be associated with the nonvolatile memory device 1220. A read operation performed in the nonvolatile memory device 1220 is illustrated in FIG. 53.

Referring to FIG. 49 to FIG. 50 and FIG. 53, the processor 510 may generate a first read request R1. In operation S441, the processor 510 may transmit the first read request R1 to the memory controller 530*a*. The memory controller 530*a* may generate a second read request R2 according to the first read request R1.

In operation S442, the memory controller 530*a* may transmit the second read request R2 to the media controller 1230. The second read request R2 may be transmitted to the media controller 1230 as the first command and address CA1. According to transmitting the second read request R2, the time-out controller 531 may begin measuring (or counting) for the first time T1 (operation S413 shown in FIG. 50). In other words, a timer associated with the first time T1 may be started after transmitting the second read request R2 by the memory controller 530*a* and/or upon receipt of the second read request R2 by the media controller 1230.

The media controller 1230 may generate a third read request R3 according to the second read request R2. In operation S443, the media controller 1230 may transmit the third read request R3 to the nonvolatile memory device 1220. The third read request R3 may be transmitted to the nonvolatile memory device 1220 as the third command and address CA3.

For example, the media controller 1230 may not process the second read request R2 and may transmit the unprocessed second read request R2 to the nonvolatile memory device 1220 as the third read request R3. In some embodiments, the media controller 1230 may process the second read request R2 into a form appropriate to the nonvolatile memory device 1220, and may transmit the processed second read request R2 to the nonvolatile memory device 1220 as the third read request R3.

The nonvolatile memory device 1220 may perform a read operation RD in response to the third read request R3. Data read from the nonvolatile memory device 1220 may be transmitted to the media controller 1230.

In an exemplary embodiment, a read speed of the nonvolatile memory device 1220 may be lower than a read speed of the volatile memory device 1210. A time required to read data from the nonvolatile memory device 1220 may be longer than a time required to read data from the volatile memory device 1210.

As described above, LRDIMM is based on the dynamic random access memory (DRAM). Therefore, the first time T1 and the second time T2 are determined by a read time of the dynamic random access memory (DRAM). The first time T1 and the second time T2 are shorter than a read time of the nonvolatile memory device 1220.

Until the first time T1 passes after the memory controller 530*a* transmits the second read request R2 in operation S442, the read operation RD of the nonvolatile memory device 1220 may not be completed. In operation S444, the memory controller 530*a* may retransmit the second read request R2 to the media controller 1230 to perform the read retry (operation S415 shown in FIG. 50).

Until the second time T2 passes after the memory controller 530*a* transmits the second read request R2 in operation S444, the read operation RD of the nonvolatile memory device 1220 may not be completed. In operation S445, the memory controller 530*a* may retransmit the second read request R2 to the media controller 1230 to perform the read retry (operation S415 shown in FIG. 50).

Until the second time T2 passes after the memory controller 530*a* transmits the second read request R2 in operation S445, the read operation RD of the nonvolatile memory device 1220 may not be completed. In operation S446 and operation S447, the memory controller 530*a* may retransmit the second read request R2 to the media controller 1230 to perform the read retry (operation S415 shown in FIG. 50).

The read operation RD of the nonvolatile memory device 1220 may not be completed until the read retry is performed by the number of times of the first value N1. The memory controller 530*a* may determine that the read fail occurs after reaching N1 retries. The memory controller 530*a* may generate an error report ER. The error report ER may be transmitted to the processor 510 in operation S448. The processor 510 may perform error handing EH, according the error report ER. The error handing EH may include exception handling comprising known processes such as machine check handling.

In operation S449, the read operation RD of the nonvolatile memory device 1220 may be completed, and data may be transmitted to the media controller 1230. However, the memory controller 530*a* may have already determined that the read fail occurs. Therefore, when the read operation to the nonvolatile memory device 1220 of the main memory 540*a* is performed, the read operation to the main memory 540*a* may be failed by a difference between the read speed of the nonvolatile memory device 1220 and the read speed of the volatile memory device 1210.

To solve this problem, the memory controller 530*a*, according to embodiments of the inventive concept, may perform the read retry without a limitation to a number of times. For example, the first value N1 may be stored in the register 532. The memory controller 530*a* according to embodiments of the inventive concept may invalidate the first value N1 stored in the register 532 or may set the first value N1 to infinity or a very large number that logically approaches infinity.

Figure 54:
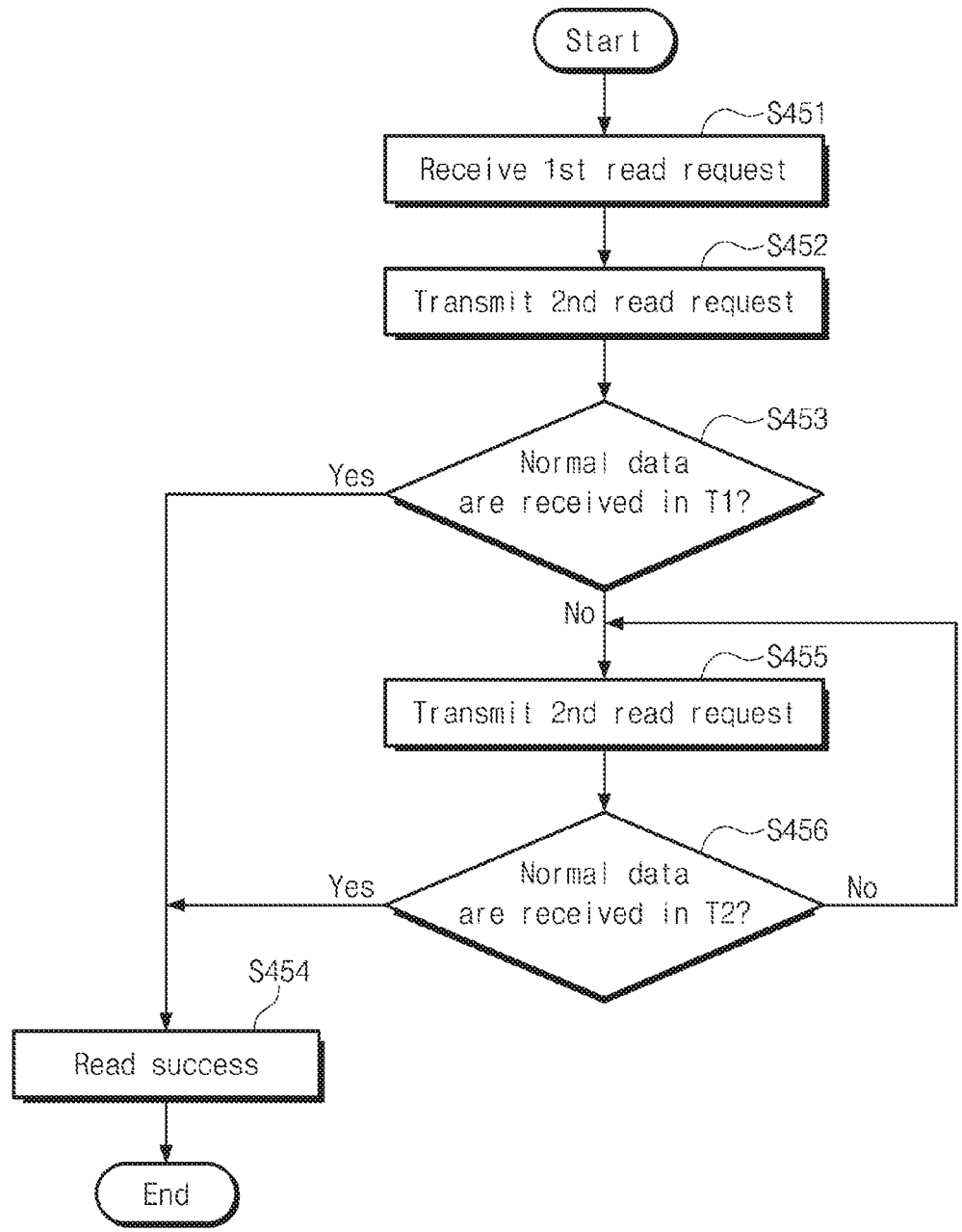
FIG. 54 is a flowchart for describing an operating method of the memory controller 530a according to some embodiments of the present inventive concept.

FIG. 54 is a flowchart for describing an operating method of the memory controller 530*a* according to some embodiments of the inventive concept. Referring to FIG. 49, FIG. 26 or 40, and FIG. 54, in operation S451, the memory controller 530*a* may receive a first read request. For example, the memory controller 530*a* may receive the first read request from the processor 510.

In operation S452, the memory controller 530*a* may transmit a second read request to the media controller 1230. For example, the memory controller 530*a* may generate the second read request using the first read request. A format of the first read request may be the same as or different from a format of the second read request. One or more the second read requests may be generated from one first read request.

In operation S453, the memory controller 530*a* may determine whether a normal data is received within a first time T1. When the normal data is received within the first time T1, in operation S454, a read success may be determined. The memory controller 530*a* may transmit the received normal data to the processor 510.

When the normal data is not received within the first time T1 or the error data is received within the first time T1, in operation S455, the memory controller 530*a* may retransmit the second read request to the media controller 1230 to perform a read retry.

In operation S456, the memory controller 530*a* may determine whether the normal data is received within a second time T2. The second time T2 may be shorter than the first time T1. When the normal data is received within the second time T2, in operation S454, the read success may be determined.

When the normal data is not received within the second time T2, the memory controller 530*a* may perform the read retry in operation S455. That is, the memory controller 530*a* may retransmit the read request without the limitation to the number of times.

Figure 55:
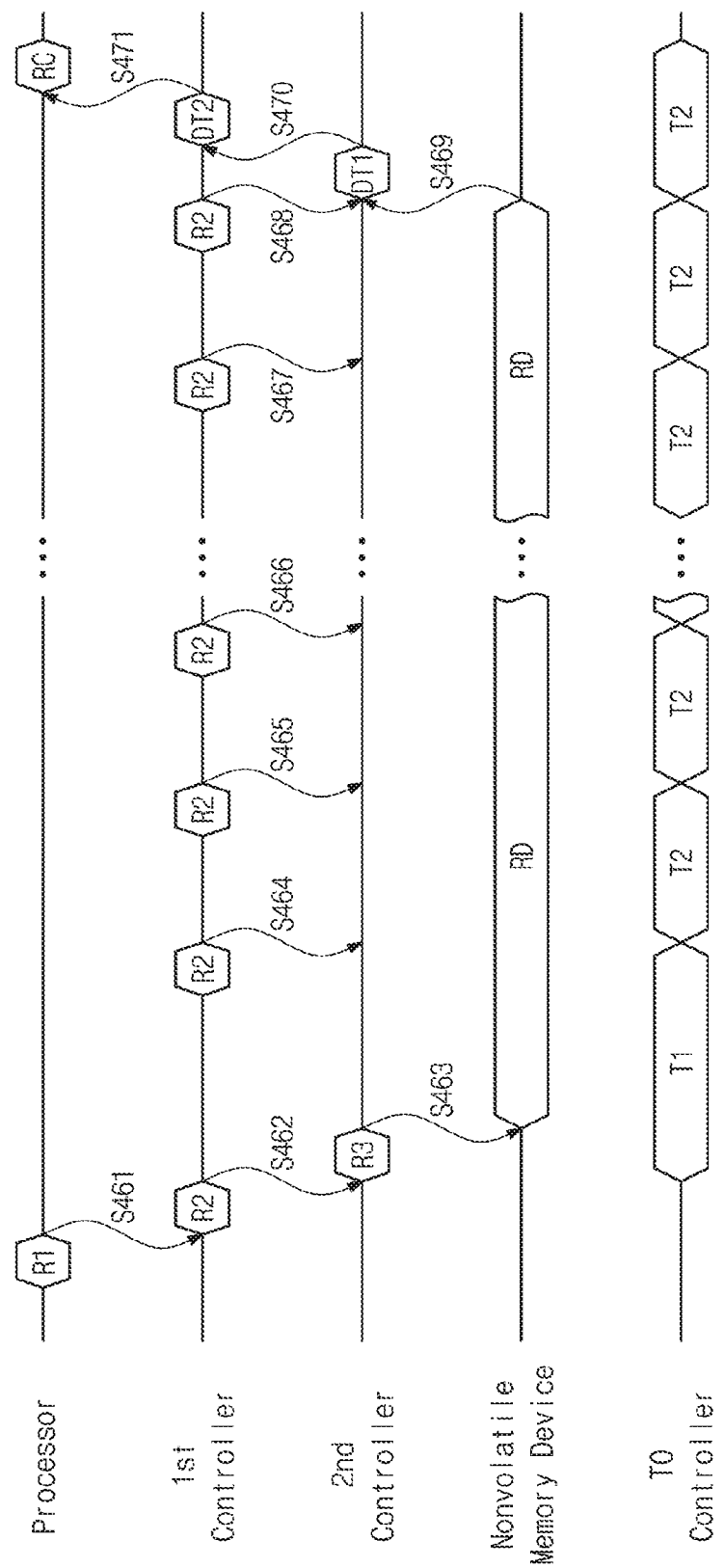
FIG. 55 is an example for describing a read operation according to the operating method illustrated in FIG. 54 according to some embodiments of the present inventive concept.

FIG. 55 is an example for describing a read operation according to the operating method illustrated in FIG. 54. For example, the first command and address CA1 may be associated with the nonvolatile memory device 1220, and a read operation performed in the nonvolatile memory device 1220 is illustrated in FIG. 55.

Referring to FIG. 49, FIG. 26 or 40, FIG. 54, and FIG. 55, the processor 510 may generate a first read request R1. In operation S461, the processor 510 may transmit the first read request R1 to the memory controller 530*a*. The memory controller 530*a* may generate a second read request R2 according to the first read request R1.

In operation S462, the memory controller 530*a* may transmit the second read request R2 to the media controller 1230. The second read request R2 may be transmitted to the media controller 1230 as the first command and address CA1. According to transmitting the second read request R2, the time-out controller 531 may begin measuring (or counting) for the first time T1 (operation S453 shown in FIG. 54).

The media controller 1230 may generate a third read request R3 according to the second read request R2. In operation S463, the media controller 1230 may transmit the third read request R3 to the nonvolatile memory device 1220. The third read request R3 may be transmitted to the nonvolatile memory device 1220 as the third command and address CA3.

The nonvolatile memory device 1220 may perform a read operation RD in response to the third read request R3. Data read from the nonvolatile memory device 1220 may be transmitted to the media controller 1230.

Until the first time T1 passes after the memory controller 530*a* transmits the second read request R2 in operation S462, the read operation RD of the nonvolatile memory device 1220 may not be completed. In operation S464, the memory controller 530*a* may retransmit the second read request R2 to the media controller 1230 to perform the read retry (operation S455 shown in FIG. 54).

Until the second time T2 passes after the memory controller 530*a* transmits the second read request R2 in operation S464, the read operation RD of the nonvolatile memory device 1220 may not be completed. In operation S465, the memory controller 530*a* may retransmit the second read request R2 to the media controller 1230 to perform the read retry (operation S455 shown in FIG. 54).

Similarly, as the second time T2 passes, the memory controller 530*a* may retransmit the second read request R2 to the media controller 1230 to perform the read retry in operation S466 to operation S468. While the read operation RD is performed in the nonvolatile memory device 1220, the media controller 1230 may ignore the second read requests (e.g., the second read requests received in operation S464 to operation S468) received in association with the read operation RD.

In operation S469, the read operation RD may be completed in the nonvolatile memory device 1220, and the read data may be transmitted to the media controller 1230. The media controller 1230 may perform a first data transmission DT1 to transmit the data read from the nonvolatile memory device 1220 to the memory controller 530*a*. In operation S470, the first data transmission DT1 may be completed, and the data may be transmitted to the memory controller 530*a*.

The memory controller 530*a* may receive data from the main memory 540*a* before the second time T2 passes after transmitting the second read request R2 in operation S468. For example, the received data may be the normal data. Therefore, the memory controller 530*a* may determine the read success.

The memory controller 530*a* may perform a second data transmission DT2 to transmit data received from the media controller 1230 to the processor 510. In operation S471, the second data transmission DT2 may be completed, and the data may be transmitted to the processor 510. The processor 510 may determine a read completion RC.

As described above, since the memory controller 530*a* may perform the read request without the limitation to the number of times, the normal data may be read from the nonvolatile memory device 1220.

Figure 56:
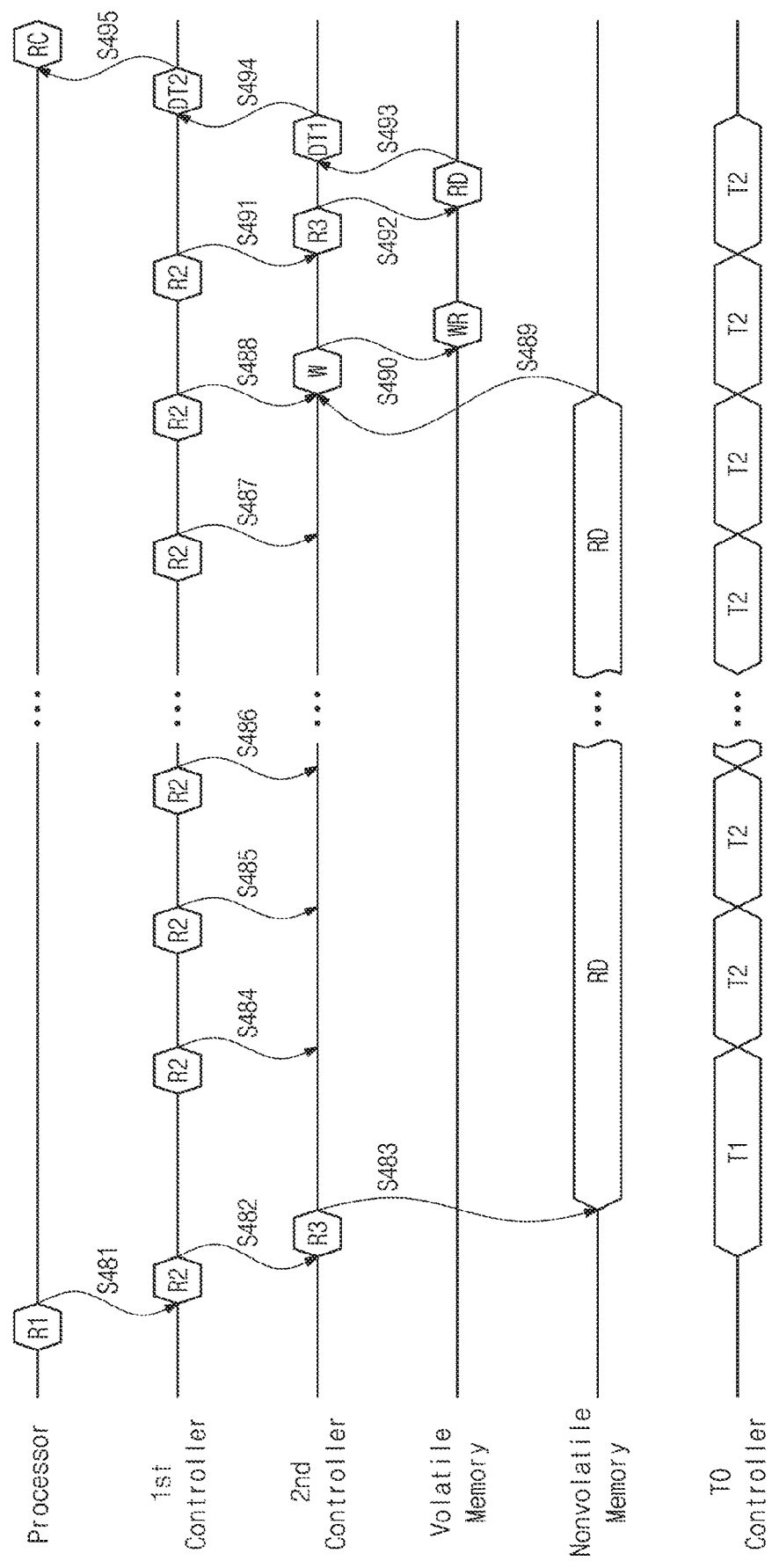
FIG. 56 is an example for describing a read operation according to the operating method illustrated in FIG. 54 according to some embodiments of the present inventive concept.

FIG. 56 is an example for describing a read operation according to the operating method illustrated in FIG. 54. For example, the first command and address CA1 may be associated with the nonvolatile memory device 1220, and an example in which the volatile memory device 1210 is used as the cache memory of the nonvolatile memory device 1220 is illustrated in FIG. 56.

Referring to FIG. 49, FIG. 26 or 40, FIG. 54, and FIG. 56, in operation S481, the processor 510 may transmit a first read request R1 to the memory controller 530*a*. The memory controller 530*a* may generate a second read request R2 according to the first read request R1.

In operation S482, the memory controller 530*a* may transmit the second read request R2 to the media controller 1230. The second read request R2 may be transmitted to the media controller 1230 as the first command and address CA1. According to transmitting the second read request R2, the time-out controller 531 may begin measuring (or counting) for the first time T1 (operation S453 shown in FIG. 54).

The media controller 1230 may determine whether a storage space associated with the second read request R2 is mapped to the volatile memory device 1210 (i.e., whether it is a cache hit). When the storage space associated with the second read request R2 is mapped to the volatile memory device 1210, that is, when the cache hit occurs, the media controller 1230 may transmit a third read request R3 as the second command and address CA2 or the second control signal CTRL2 to the volatile memory device 1210.

A read operation of the volatile memory device 1210 is the same as that of the volatile memory device 1210 described with reference to FIG. 51 or FIG. 52. Therefore, detailed description thereof will be omitted.

When the storage space associated with the second read request R2 is not mapped to the volatile memory device 1210, that is, when the cache miss occurs, the media controller 1230 may map the storage space associated with the second read request R2 to the volatile memory device 1210.

The media controller 1230 may generate a third read request R3 for storage space associated with the second read request R2. In operation S483, the media controller 1230 may transmit the third read request R3 to the nonvolatile memory device 1220. The third read request R3 may be transmitted to the nonvolatile memory device 1220 as the third command and address CA3.

The nonvolatile memory device 1220 may perform a read operation RD in response to the third read request R3. Data read from the nonvolatile memory device 1220 may be transmitted to the media controller 1230.

As the first time T1 or the second time T2 passes or expires, the memory controller 530*a* may transmit the second read request R2 to perform the read retry in operation S484 to operation S488. The second read request R2 may be transmitted repeatedly, as needed, to produce a successful read operation.

In operation S489, the read operation RD of the nonvolatile memory device 1220 may be completed successfully, and the data read from the nonvolatile memory device 1220 may be transmitted to the media controller 1230.

As the data is transmitted from the nonvolatile memory device 1220, in operation S490, the media controller 1230 may transmit a write request W to the volatile memory 1210. The write request W may include the data read from the nonvolatile memory device 1220. In some embodiments, the write request W may be transmitted with the data read from the nonvolatile memory device 1220.

For example, the write request W may be transmitted to the volatile memory device 1210 as the second command and address CA2. In some embodiments, the write request W may be transmitted to the volatile memory device 1210 as the second control signal CTRL2. For example, the media controller 1230 may activate a particular control signal such as SAVEn.

While the particular control signal is activated, the media controller 1230 may transmit the data read from the nonvolatile memory device 1220 to the volatile memory device 1210. The volatile memory device 1210 may write the data received from the media controller 1230 in response to the activated particular control signal.

The volatile memory device 1210 may perform a write operation WR according to the write request W. Since the volatile memory device 1210 performs a write operation WR, the first storage space of the nonvolatile memory device 1220 associated with the second read request R2 may be mapped (or backed up) to the second storage space of the volatile memory device 1210.

After the write operation WR is completed, in operation S491, the memory controller 530*a* may transmit the second read request R2 to the media controller 1230. In operation S492, the media controller 1230 may transmit the third read request R3 to the volatile memory device 1210 in response to the second read request R2 received in operation S491 after the read operation RD is completed. The third read request R3 may request a read of data mapped from the nonvolatile memory device 1220 to the volatile memory device 1210.

The volatile memory device 1210 may perform the read operation RD in response to the third read request R3. When the read operation RD is completed, in operation S493, data associated with the second read request R2 may be transmitted to the media controller 1230. The media controller 1230 may perform a first data transmission DT1.

As the first data transmission DT1 is performed, in operation S494, the data may be transmitted to the memory controller 530a. The memory controller 530a may receive the data associated with the second read request R2 before the second time T2 passes after transmitting the second read request R2 in operation S491. Therefore, the memory controller 530a may determine the read success (operation S454 shown in FIG. 54).

The memory controller 530a may perform a second data transmission DT2 to transmit the data to the processor 510. As the data is transmitted, the processor 510 may determine a read completion.

Figure 57:
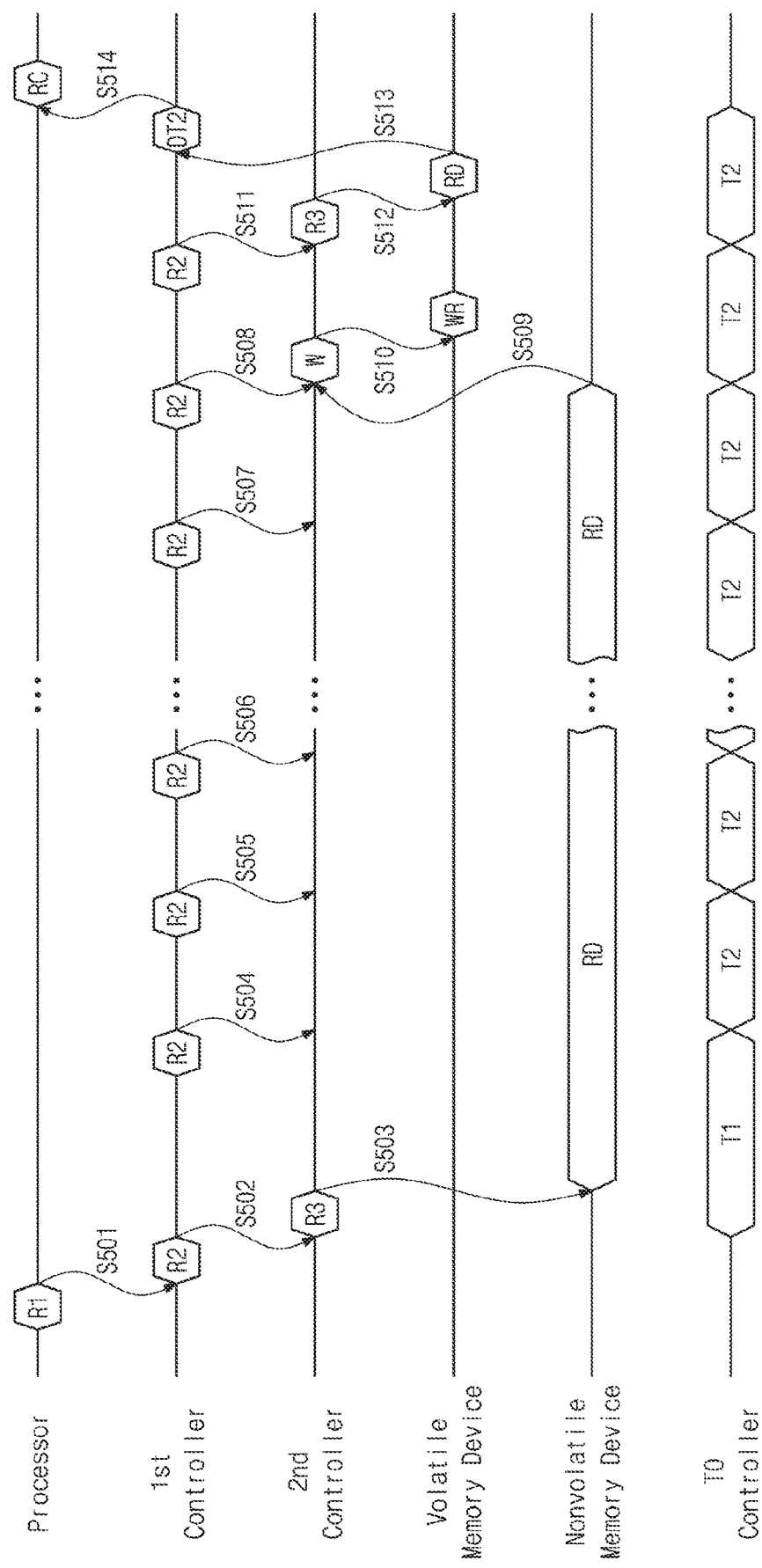
FIG. 57 is an example for the read operation illustrated in FIG. 54 according to some embodiments of the present inventive concept.

FIG. 57 is an example for the read operation illustrated in FIG. 56. Referring to FIG. 49, FIG. 26 or 40, FIG. 54, and FIG. 57, since operation S501 to operation S510 are the same as operation S481 to operation S490 shown in FIG. 56, detailed description thereof will be omitted.

In operation S511 of FIG. 57, the memory controller 530a may transmit the second read request R2 to the media controller 1230. In operation S512, the media controller 1230 may transmit the third read request R3 to the volatile memory device 1210 in response to the second read request R2. For example, the media controller may transmit the second read request R2 received from the memory controller 530a to the volatile memory device 1210 as the third read request R3.

When the volatile memory device 1210 performs the read operation RD, in operation S513, the read data may be directly transmitted to the memory controller 530a through the media controller 1230 and the first to eighth data buffers 1241 to 1248 without being controlled and buffered by the media controller 1230. Since LRDIMM is based on the dynamic random access memory (DRAM), the volatile memory device 1210 may communicate directly with the memory controller 530a.

Operation S514 may be the same as operation S495 shown in FIG. 56. When the data read from the volatile memory device 1210 is directly transmitted to the memory controller 530a, a time until the memory controller 530a receives data after transmitting the second read request R2 may be decreased.

Figure 58:
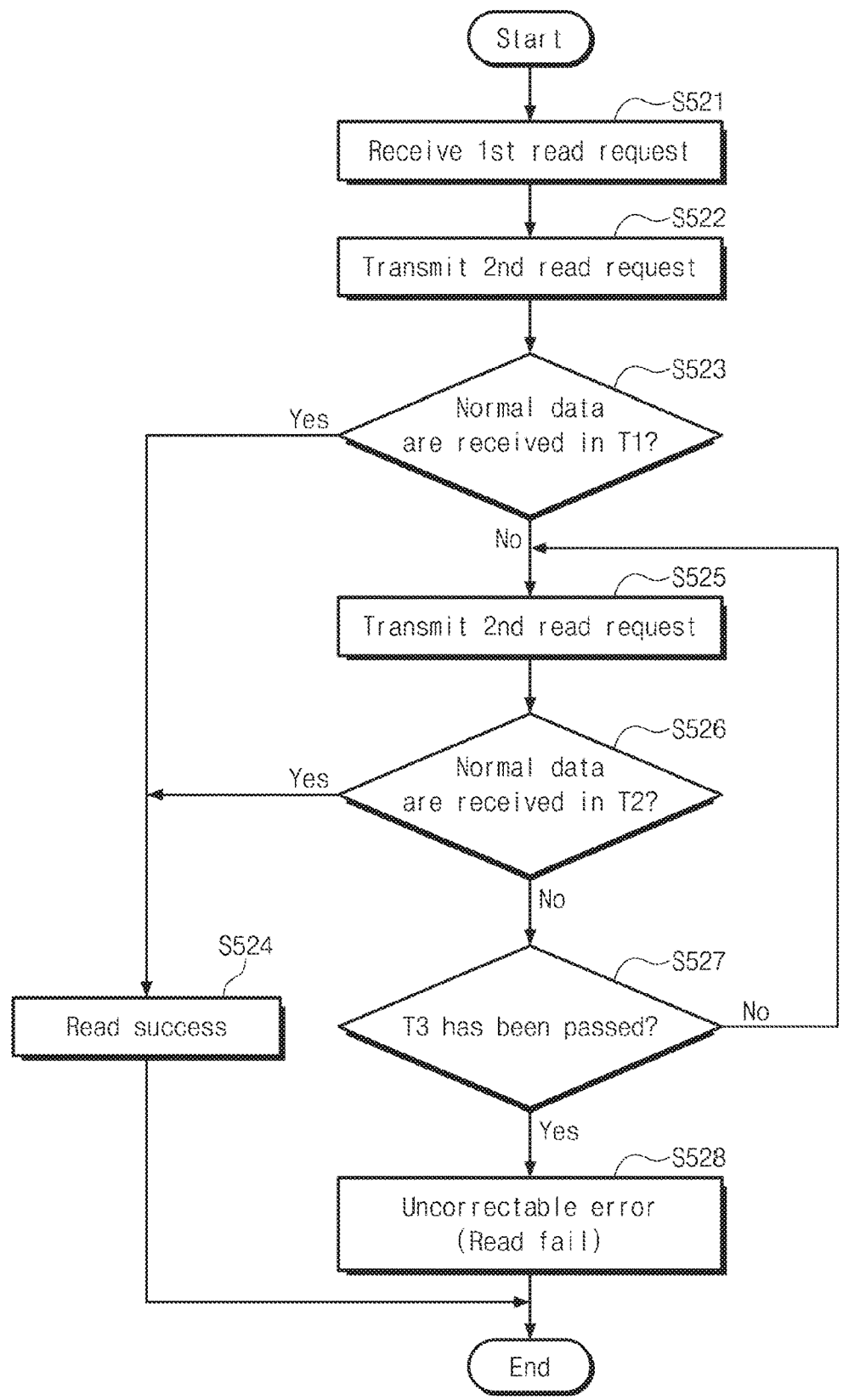
FIG. 58 is a flowchart for describing an application example of the operating method illustrated in FIG. 54 according to some embodiments of the present inventive concept.

FIG. 58 is a flowchart for describing an application example of the operating method illustrated in FIG. 54. Referring to FIG. 49, FIG. 26 or 40, and FIG. 58, operation S521 to operation S525 may be the same as operation S451 to operation S455 described with reference to FIG. 54. That is, the memory controller 530a may perform the read retry without the limitation to the number of times.

In operation S560, when the normal data is not received within the second time T2, operation S570 may be performed. In operation S570, after the second read request R2 is transmitted for the first time, it is determined whether a third time T3 has been passed. When the third time T3 is not passed, in operation S525, the read retry may be performed without the limitation to the number of times.

When the third time T3 is passed, in operation S580, the memory controller 530a may determine a read fail when an uncorrectable error occurs. In some embodiments, information on the third time T3 may be stored in the register 532.

The third time T3 may be determined according to a time (e.g., a read time) required to perform the read operation in the nonvolatile memory device 1220. For example, the third time T3 may be longer (e.g., twice or more) than the read time.

Figure 59:
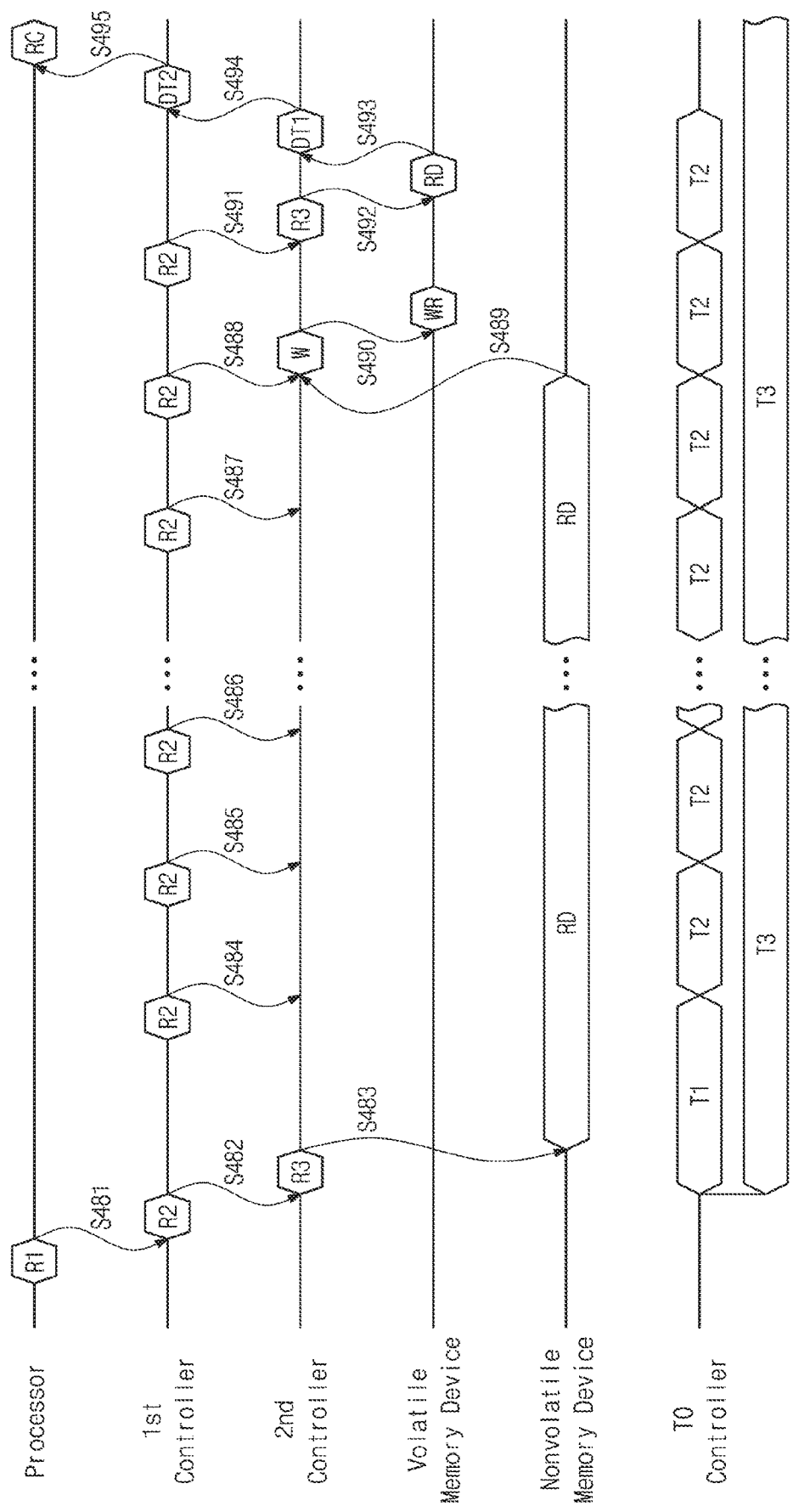
FIG. 59 is an example of performing a read operation with measuring the third time T3 according to some embodiments of the present inventive concept.

FIG. 59 is an example of performing a read operation with measuring the third time T3. Compared with FIG. 56, in operation S482, as the memory controller 530a transmits the second read request R2 to the media controller 1230, the time-out controller 531 may begin measuring (or counting) for the third time T3.

In some embodiments, the third time T3 may be longer than a time when a read operation to the nonvolatile memory device 1220 is performed. When a time-out is measured, the memory controller 530a may be prevented from repeatedly performing the read retry when the normal data is not read due to an error in the main memory 540a. That is, a hang may be prevented from occurring in a memory system including the memory controller 530a and the main memory 540a.

Figure 60:
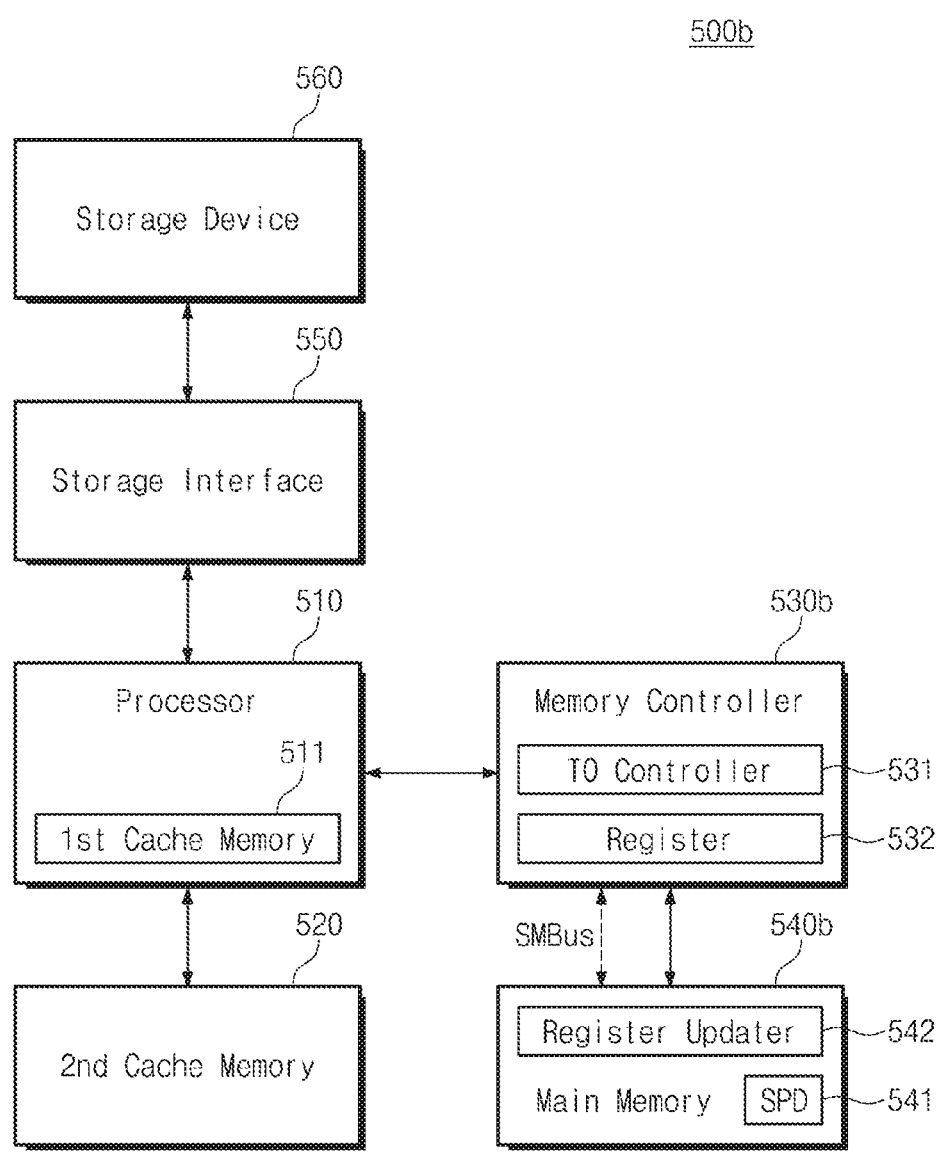
FIG. 60 is a block diagram illustrating a computing device according to some embodiments of the present inventive concept.

FIG. 60 is a block diagram illustrating a computing device 500b according to some embodiments of the inventive concept. Referring to FIG. 60, the computing device 500b may include a processor 510, a second cache memory 520, a memory controller 530b, a main memory 540b, a storage interface 550, and a storage device 560.

Operations of the processor 510, the second cache memory 520, the storage interface 550, and the storage device 560 may be the same as or similar to those of the processor 510, the second cache memory 520, the storage interface 550, and the storage device 560 described with reference to FIG. 49. Therefore, detailed description thereof will be omitted.

Compared with FIG. 49, the memory controller 530b may further communicate with the main memory 540b through a system management bus SMBus. The main memory 540b may include a serial presence detect (SPD) device 541 and a register updater 542. SPD device 541 may make it possible for the memory controller 530b to know that the main memory 540b is present, and what timings to use to access the main memory 540b.

The SPD device 541 may include information on the main memory 540b. When a power is supplied to the memory controller 530b and the main memory 540b, the memory controller 530b may access the SPD device 541 of the main memory 540b to acquire the information on the main memory 540b.

Based on the acquired information, the memory controller 530b may set or adjust methods or parameters to access the main memory 540b. For example, the memory controller 530b may access the SPD device 541 through the system management bus SMBus.

The register updater 542 may update a register 532 of the memory controller 530b through the system management bus SMBus. For example, when the memory controller 530b accesses the SPD device 541 of the main memory 540b, the memory controller 530b may allow the main memory 540b to access the register 532 through the system management bus SMBus.

While the memory controller 530b accesses the SPD device 541, the register updater 542 may update some of information stored in the register 532. For example, the register updater 542 may update information stored in the register 532 so that operations described with reference to FIG. 54 to FIG. 59 are allowed.

Figure 61:
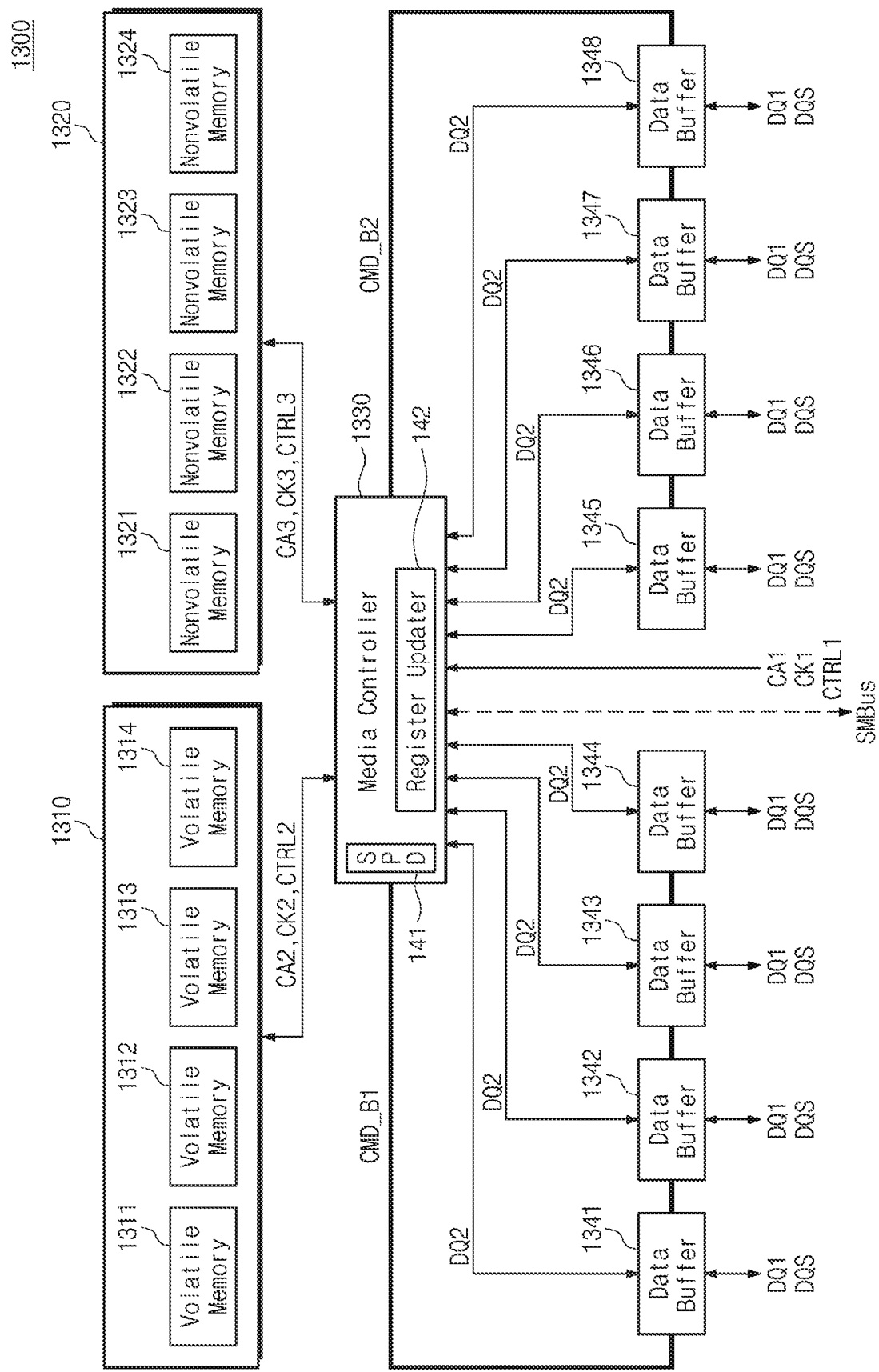
FIG. 61 is a block diagram of a main memory including a SPD device and a register updater according to some embodiments of the present inventive concept.

FIG. 61 is block diagram illustrating the main memory 1300 including the SPD device 1331 and the register updater 1332. Compared with FIG. 26 or 40, a media controller 1330 may include the SPD device 1331 and the register updater 542.

The SPD device 1331 may be included in the media controller 1230, or may be provided as a package separated from the media controller 1330 to be disposed outside the media controller 1230. The SPD device 1331 and the register updater 1332 may communicate with the memory controller 1330 through the system management bus SMBus.

Figure 62:
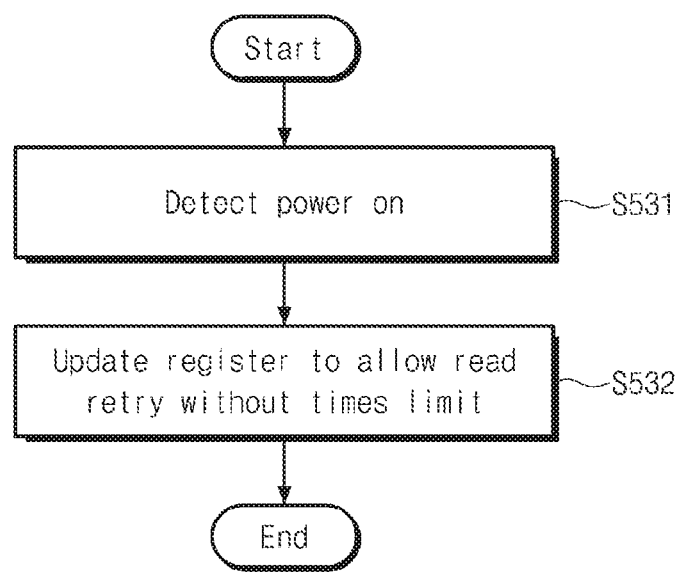
FIG. 62 is a flowchart for describing an operating method of the main memory 540b to update the register 532 according to some embodiments of the present inventive concept.

FIG. 62 is a flowchart for describing an operating method of the main memory 540b to update the register 532. Referring to FIG. 60 to FIG. 62, in operation S531, the media controller 1330 may detect a power on. In operation S532, the register updater 1332 of the media controller 1330 may update information stored in the register 532 through the system management bus SMBus.

For example, the register updater 1332 may invalidate or remove times limit stored in the register 532. The register updater 1332 may update the third time T3 stored in the register 532 according to a read time of the nonvolatile memory device 1320. For example, the register updater 1332 may update the register 532 so that the third time T3 is longer than the read time.

Figure 63:
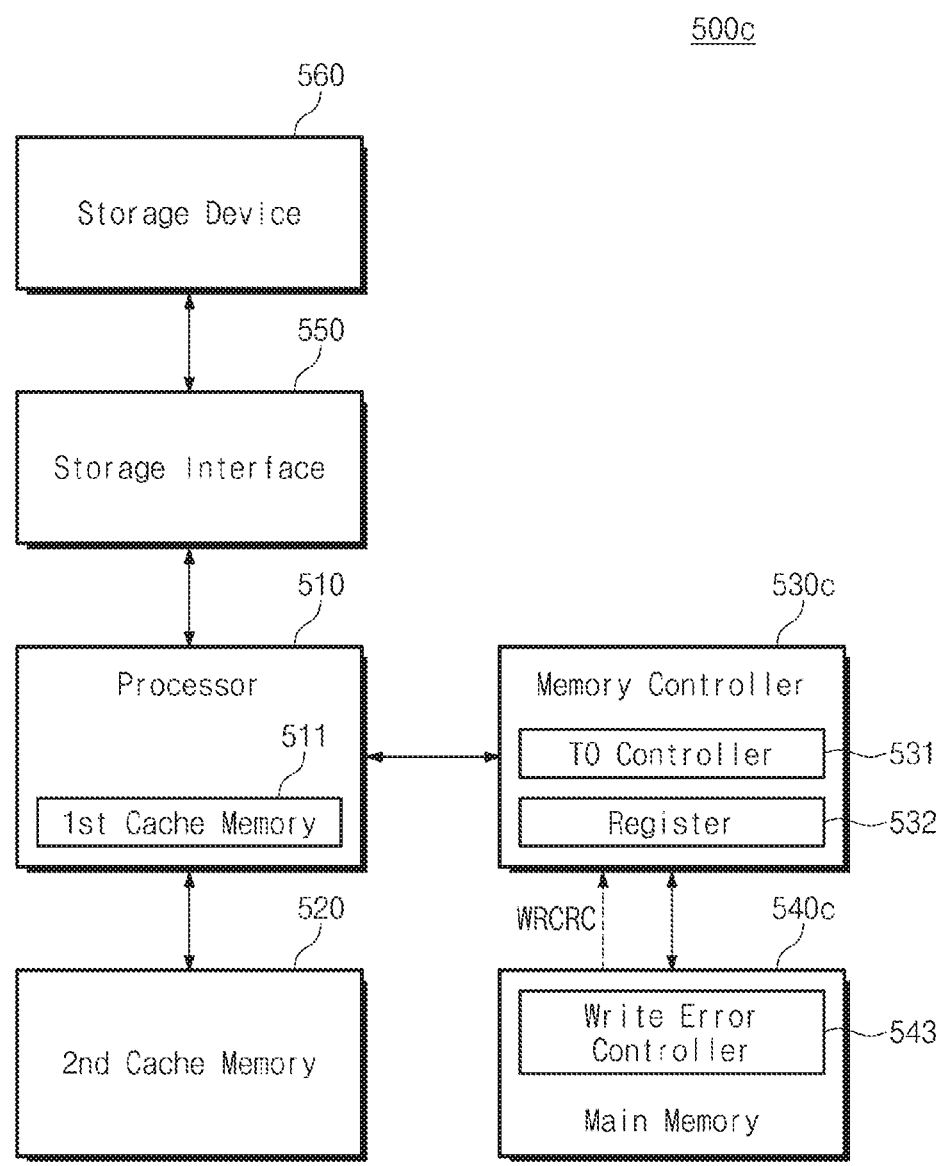
FIG. 63 is a block diagram illustrating a computing device according to some embodiments of the present inventive concept.

FIG. 63 is a block diagram illustrating a computing device 500c according to some embodiments of the inventive concept. Referring to FIG. 26 or 40 and FIG. 60, the computing device 500c may include a processor 510, a second cache memory 520, a memory controller 530c, a main memory 540c, a storage interface 550, and a storage device 560.

Operations of the processor 510, the second cache memory 520, the storage interface 550, and the storage device 560 may be the same as or similar to those of the processor 510, the second cache memory 520, the storage interface 550, and the storage device 560 described with reference to FIG. 49. Therefore, detailed description thereof will be omitted.

Compared with FIG. 49, the main memory 540c may output a write error signal WRCRC to the memory controller 530c. For example, the memory controller 530c may transmit a write request to the main memory 540c. A write data of the write request may be transmitted with a parity generated by an error correction code.

The main memory 540c may check whether an error exists in the write data by using the parity. When the error exists in the write data, the main memory 540c may enable (e.g., a low level) the write error signal WRCRC. When the write error signal WRCRC is enabled, the memory controller 530c may retransmit the write request.

The main memory 540c may include a write error controller 543. As described with reference to FIG. 61, the write error controller 543 may be included in the media controller 1230. When a write to the nonvolatile memory device 1220 is performed, the write error controller 543 may control the write error signal WRCRC. For example, the write error signal WRCRC may include ALERTn signal.

Figure 64:
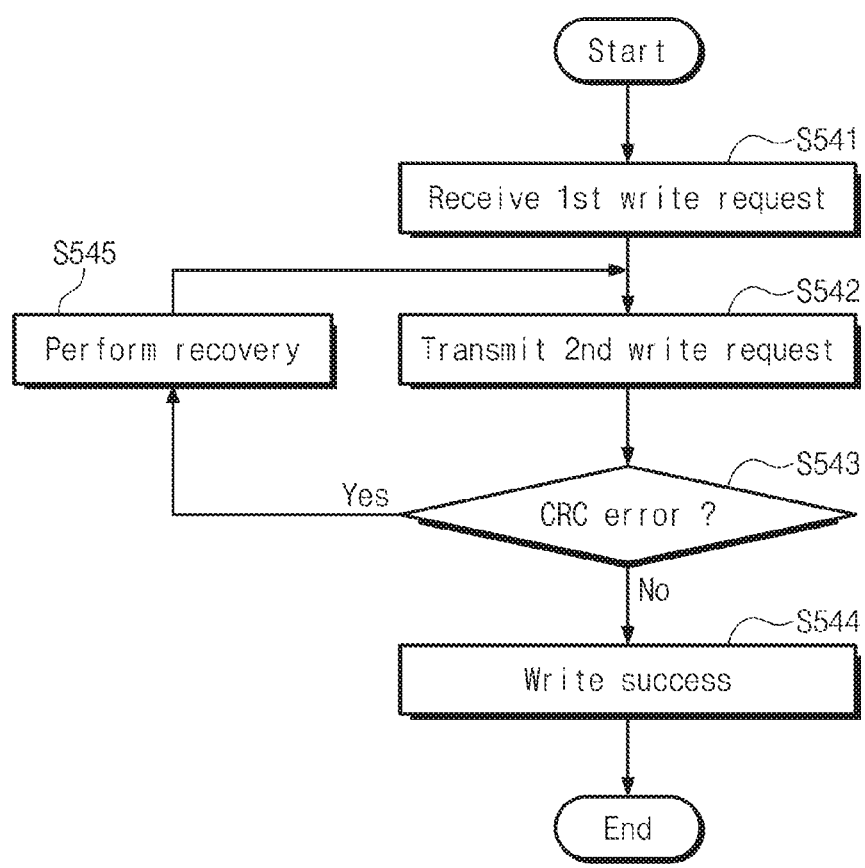
FIG. 64 is a flowchart for describing a write operation of the memory controller 530c according to some embodiments of the present inventive concept.

FIG. 64 is a flowchart for describing a write operation of the memory controller 530c. Referring to FIG. 26 or 40, FIG. 63, and FIG. 64, in operation S541, the memory controller 530c may receive a first write request. For example, the memory controller 530c may receive the first write request from the processor 510.

In operation S542, the memory controller 530c may transmit a second write request to the media controller 1230. For example, the memory controller 530c may generate the second write request using the first write request. A format of the first write request may be the same as or different from a format of the second write request. One or more the second write requests may be generated from one first write request.

In operation S543, the memory controller 530c may check whether the write error signal WRCRC is enabled. When the write error signal WRCRC is disabled, in operation S544, the memory controller 530c may determine a write success.

When the write error signal WRCRC is enabled, in operation S545, the memory controller 530c may perform a recovery. For example, the memory controller 530c may perform a recovery of a communication link between the memory controller 530c and the main memory 540c. The recovery may include ZQ calibration, a write training, and/or a read training.

In operation S542, the memory controller may retransmit the second write request. That is, the memory controller 530a may perform a write retry without the limitation to the number of times.

Figure 65:
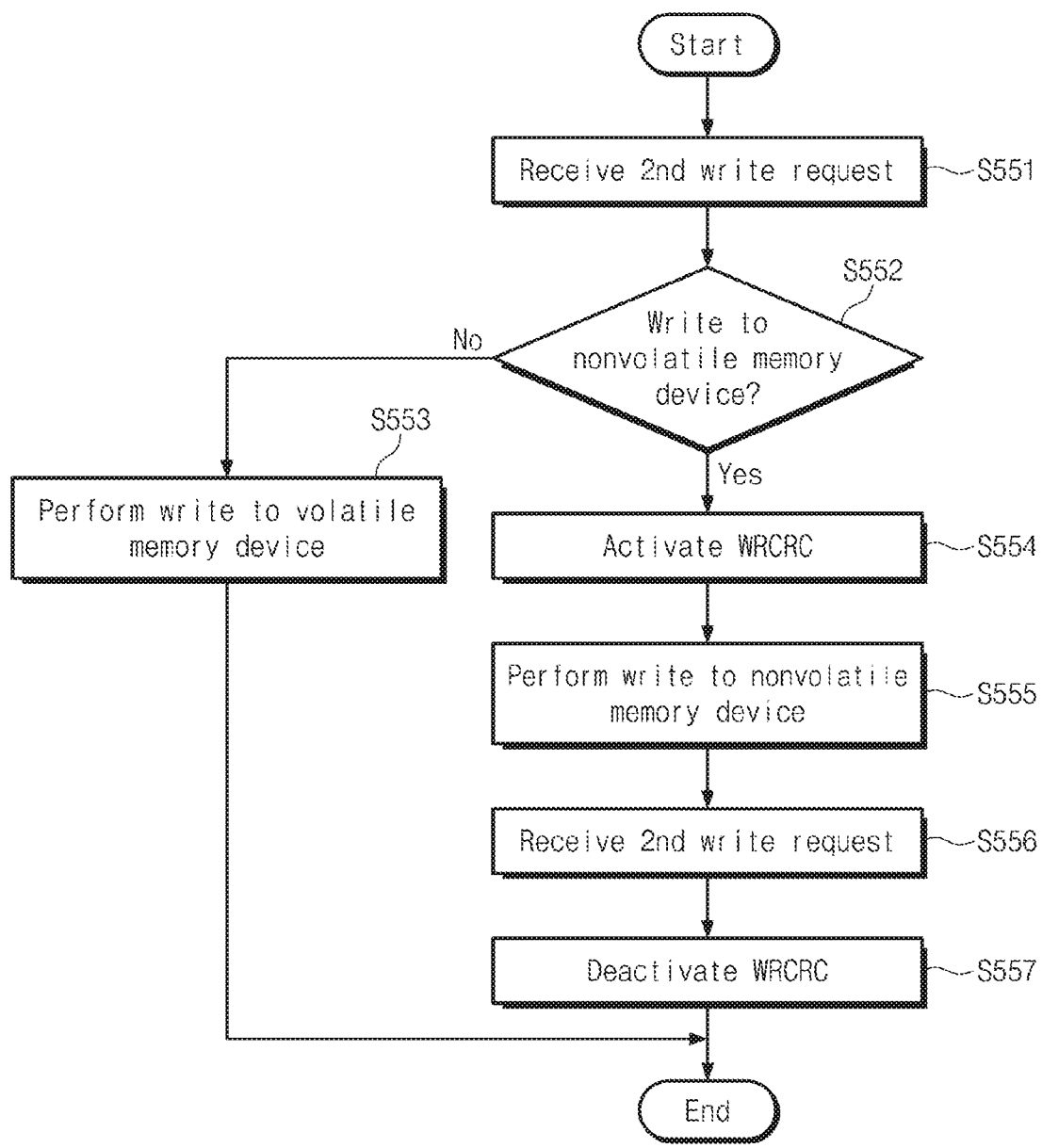
FIG. 65 is a flowchart for describing a write operation of the main memory 540c according to some embodiments of the present inventive concept.

FIG. 65 is a flowchart for describing a write operation of the main memory 540c. Referring to FIG. 26 or 40, FIG. 63, and FIG. 65, in operation S551, the media controller 1230 may receive a second write request. For example, the media controller 1230 may receive the second write request as the first command and address CA1 from the memory controller 530c.

In operation S552, the media controller 1230 may determine whether the second write request causes a write to the nonvolatile memory device 1220. When the second write request does not cause the write to the nonvolatile memory device 1220, in operation S553, the media controller 1230 may perform a write operation to the volatile memory device 1210 according to the second write request.

When the second write request causes the write to the nonvolatile memory device 1220, in operation S554, the media controller 1230 may activate the write error signal WRCRC. In operation S555, the media controller 1230 may perform a write operation to the nonvolatile memory device 1220.

After the write operation to the nonvolatile memory device 1220 is completed, when the second write request is received in operation S556, in operation S557, the media controller 1230 may deactivate (e.g., a high level) the write error signal WRCRC.

As described with reference to FIG. 53, the write operation to the nonvolatile memory device 1220 may require a longer time than the write operation to the volatile memory device 1210. The memory controller 530c may be configured to control the main memory 540c based on a write speed of the volatile memory device 1210.

For example, the memory controller 530c may transmit the second write request to the main memory 540c, and may determine that the write operation is completed when there is no reply from the main memory 540c (e.g., the write error signal WRCRC is disabled).

When the write operation to the nonvolatile memory device 1220 is not completed and the memory controller 530c determines a write completion, a write fail may occur. To solve this problem, the main memory 540c according to the embodiment of the inventive concept may hold the write error signal WRCRC as an enabled state (e.g., a low level) until the write operation to the nonvolatile memory device 1220 is completed.

Figure 66:
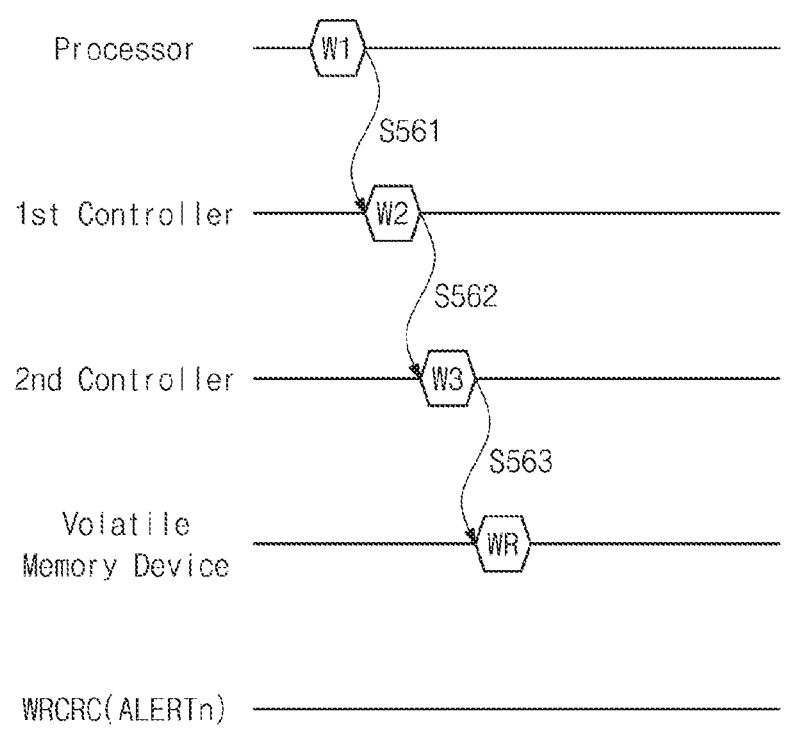
FIG. 66 is an example timing diagram for a write operation according to the operating method illustrated in FIG. 65 according to some embodiments of the present inventive concept.

FIG. 66 is an example for describing a write operation according to the operating method illustrated in FIG. 65. For example, the first command and address CA1 may not be associated with the volatile memory device 1210, and a write operation performed in the volatile memory device 1210 is illustrated in FIG. 66.

Referring to FIG. 26 or 40, FIG. 63, FIG. 65, and FIG. 66, the processor 510 may generate a first write request W1. In operation S56, the processor 510 may transmit the first write request W1 to the memory controller 530c. The memory controller 530c may generate a second write request W2 according to the first write request W1.

In operation S562, the memory controller 530c may transmit the second write request W2 to the media controller 1230. The second write request W2 may be transmitted to the media controller 1230 as the first command and address CA1.

The media controller 1230 may generate a third write request W3 according to the second write request W2. In operation S563, the media controller 1230 may transmit the third write request W3 to the volatile memory device 1210. The third write request W3 may be transmitted to the volatile memory device 1210 as the second command and address CA2.

For example, the media controller 1230 may not process the second write request W2 and may transmit the unprocessed second write request W2 to the volatile memory device 1210 as the third write request W3. In some embodiments, the media controller 1230 may process the second write request W2 into a form appropriate to the volatile memory device 1210, and may transmit the processed second write request W2 to the volatile memory device 1210 as the third write request W3.

The volatile memory device 1210 may perform the write operation WR in response to the third write request W3. In some embodiments, as described with reference to FIG. 52, the memory controller 530c may directly write data to the volatile memory device 1210 through the media controller 1230 and the first to eighth data buffers 1241 to 1248 without a control or a buffering of the media controller 1230.

When an error does not exist in the write data, the media controller 1230 may hold the write error signal WRCRC as a disabled state which is the high level. When the error exists in the write data, the media controller 1230 may control the write error signal WRCRC as the enabled state which may correspond to the low level. The memory controller 530c may retransmit the second write request W2 according to the enabled write error signal WRCRC.

In some embodiments, the media controller 1230 or the volatile memory device 1210 may check whether an error exists in the write data. The media controller 1230 or the volatile memory device 1210 may enable the write error signal WRCRC to the low level when the error exists in the write data.

For example, the write error signal WRCRC output from the volatile memory device 1210 may be included in the second control signal CTRL2, and may be transmitted to the media controller 1230. The media controller 1230 may transmit the write error signal WRCRC received from the volatile memory device 1210 to the memory controller 530c.

Figure 67:
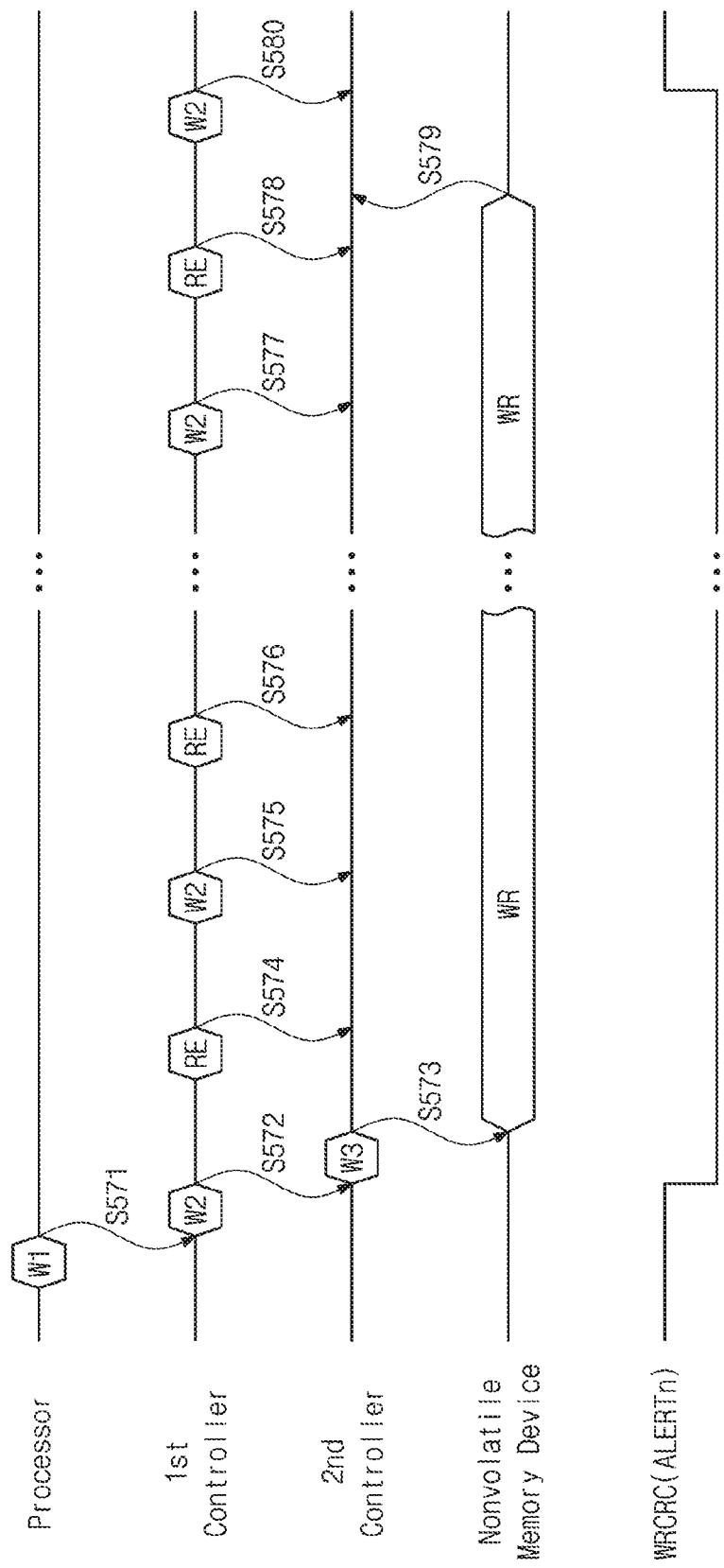
FIG. 67 is an example timing diagram for write operation according to the operating method illustrated in FIG. 65 according to some embodiments of the present inventive concept.

FIG. 67 is an example for describing a write operation according to the operating method illustrated in FIG. 65. For example, a write operation to the nonvolatile memory device 1220, which is performed according to the first command and address CA1, is illustrated in FIG. 67.

Referring to FIG. 26 or 40, FIG. 63, FIG. 65, and FIG. 67, the processor 510 may generate a first write request W1. In operation S571, the processor 510 may transmit the first write request W1 to the memory controller 530c. The memory controller 530c may generate a second write request W2 according to the first write request W1.

In operation S572, the memory controller 530c may transmit the second write request W2 to the media controller 1230. The second write request W2 may be transmitted to the media controller 1230 as the first command and address CA1. The second write request W2 may cause the write operation to the nonvolatile memory device 1220. Therefore, when the second write request W2 is received, the media controller 1230 may enable the write error signal WRCRC to the low level.

The media controller 1230 may generate a third write request W3 according to the second write request W2. In operation S573, the media controller 1230 may transmit the third write request W3 to the nonvolatile memory device 1220. The third write request W3 may be transmitted to the nonvolatile memory device 1220 as the third command and address CA3.

For example, the media controller 1230 may not process the second write request W2 and may transmit the unprocessed second write request W2 to the nonvolatile memory device 1220 as the third write request W3. In some embodiments, the media controller 1230 may process the second write request W2 into a form appropriate to the nonvolatile memory device 1220, and may transmit the processed second write request W2 to the nonvolatile memory device 1220 as the third write request W3.

The nonvolatile memory device 1220 may perform a write operation WR in response to the third write request W3. When the write error signal WRCRC is enabled, in operation S574, the memory controller 530c may perform a recovery RE. After the recovery RE is performed, in operation S575, the memory controller 530c may retransmit the second write request W2 to perform the write retry.

While the write operation WR is performed in the nonvolatile memory device 1220, the memory controller 530c may repeatedly perform the recovery RE and the write retry in operation S576 to operation S578 according to the enabled write error signal WRCRC.

In operation S579, the nonvolatile memory device 1220 may inform the media controller 1230 that the write operation WR is completed. For example, the nonvolatile memory device 1220 may control a ready/busy signal (R/nB) so that the ready/busy signal (R/nB) indicates a ready condition. When the ready/busy signal (R/nB) indicates the ready condition, the nonvolatile memory device 1220 may inform the media controller 1230 that the write operation WR is completed.

In operation S580, the memory controller 530c may transmit the second write request W2 to the media controller 1230 to perform the write retry. In operation S580, as the second write request W2 is received, the media controller 1230 may disable the write error signal WRCRC to the high level. As the write error signal WRCRC is disabled, the memory controller 530c may determine that the write operation WR is completed.

As described above, when the write operation WR to the nonvolatile memory device 1220 is performed, the media controller 1230 may enable the write error signal WRCRC even though no error occurs. As the write error signal WRCRC is enabled, the memory controller 530c may retransmit the write request without a limitation on the number of times. Therefore, the memory controller 530c is held and the write error is prevented until the write operation WR to the nonvolatile memory device 1220 is performed.

Figure 68:
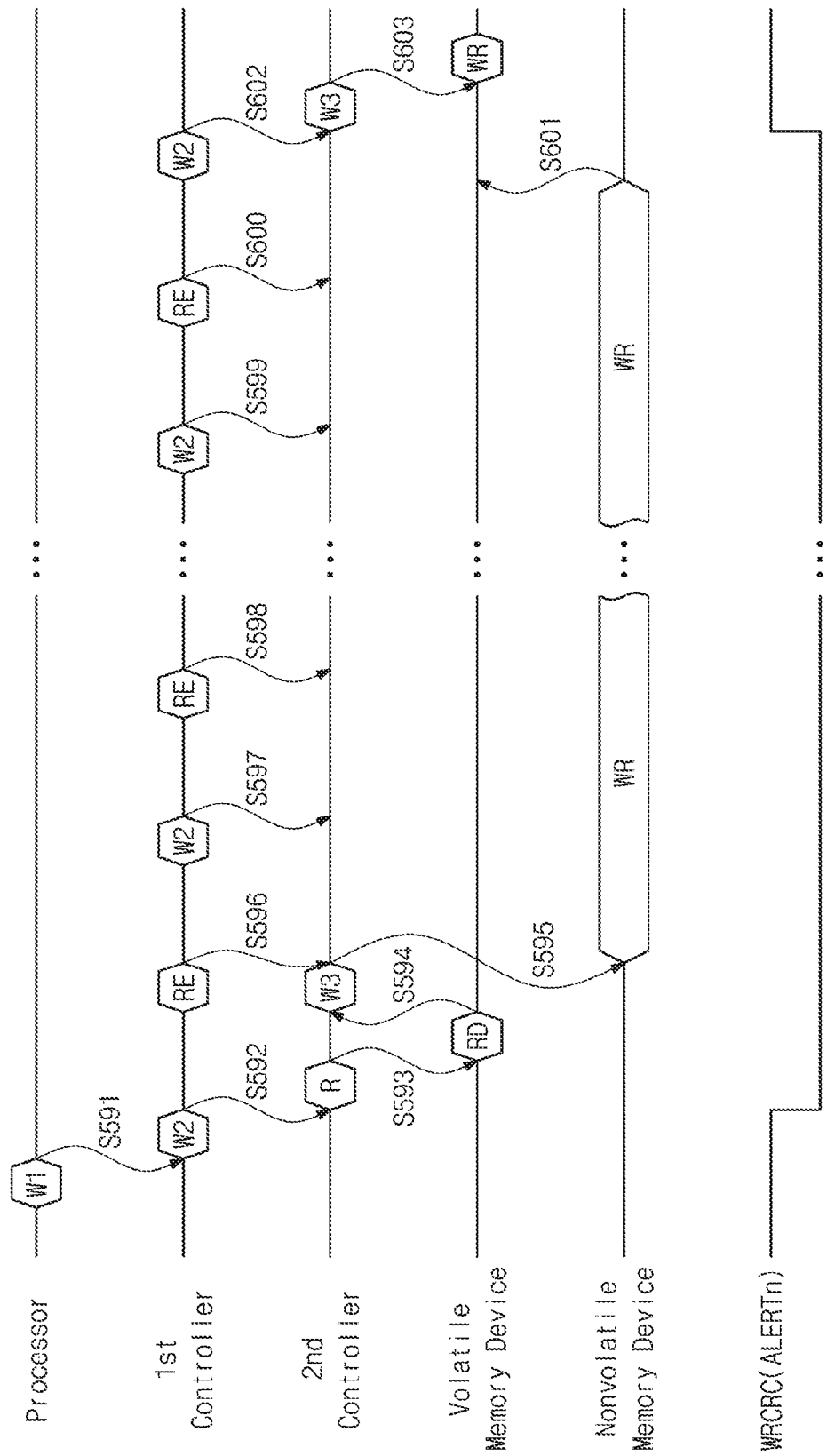
FIG. 68 is an example timing diagram for a write operation according to the operating method illustrated in FIG. 65 according to some embodiments of the present inventive concept.

FIG. 68 is an example for describing a write operation according to the operating method illustrated in FIG. 66. For example, the first command and address CA1 may be associated with the nonvolatile memory device 1220, and an example in which the volatile memory device 1210 is used as the cache memory of the nonvolatile memory device 1220 is illustrated in FIG. 68.

Referring to FIG. 26 or 40, FIG. 63, FIG. 66, and FIG. 68, the processor 510 may generate the first write request W1. In operation S51, the processor 510 may transmit the first write request W1 to the memory controller 530c. The memory controller 530c may generate the second write request W2 according to the first write request W1.

In operation S592, the memory controller 530c may transmit the second write request W2 to the media controller 1230. The second write request W2 may be transmitted to the media controller 1230 as the first command and address CA1. The media controller 1230 may determine whether a storage space associated with the first command and address CA1 is mapped to the volatile memory device 1210.

For example, the storage space associated with the first command and address CA1 may not be mapped to the volatile memory device 1210. Additionally, the write operation to the nonvolatile memory device 1220 may be caused when a free storage space of the volatile memory device 1210 is insufficient to provide the storage space associated with the first command and address CA1.

The media controller 1230 may select a particular storage space of storage spaces mapped to the volatile memory device 1210, and may eliminate the selected storage space. For example, the selected storage space may be a dirty storage space that has been previously utilized. The media controller 1230 may cause the write operation to the nonvolatile memory device 1220 by returning the selected storage space to the nonvolatile memory device 1220.

In operation S593, the media controller 1230 may transmit a read request R for the selected storage space to the volatile memory device 1210. The read request R may be transmitted to the volatile memory device 1210 as the second command and address CA2 or the second control signal CTRL2.

For example, the read request R2 may be transmitted to the volatile memory device 1210 as the second command and address CA2. In some embodiments, the read request R may be transmitted to the volatile memory device 1210 as the second control signal CTRL2. For example, the media controller 1230 may activate a particular control signal such as SAVEn.

When the particular control signal is activated, the volatile memory device 1210 may output a stored data such as data at a location (e.g., a bank) designated by an internal schedule, and/or all data. The media controller 1230 may store data received from the volatile memory device 1210.

The volatile memory device 1210 may perform the read operation RD in response to the read request R. Data read from the volatile memory device 1210 may be transmitted to the media controller 1230 in operation S594. As data of the selected storage space is read from the volatile memory device 1210, in operation S594, the media controller 1230 may transmit the third write request W3 to the nonvolatile memory device 1220. The third write request W3 may be transmitted to the nonvolatile memory device 1220 as the third command and address CA3 or the third control signal CTRL3.

The nonvolatile memory device 1220 may perform the write operation WR in response to the third write request W3. While the nonvolatile memory device 1220 performs the write operation WR, the write error signal WRCRC is enabled. Therefore, while the nonvolatile memory device 1220 performs the write operation WR, the memory controller 530c may repeatedly perform the write retry to transmit the recovery RE and the second write request W2 in operation S596 to operation S600.

In operation S601, the nonvolatile memory device 1220 may inform the media controller 1230 that the write operation WR is completed. After the write operation WR is completed, in operation S602, the memory controller 530a may transmit the second read request R2 to perform the write retry.

After the write operation WR to the nonvolatile memory device 1220 is completed, when the second write request W2 is received (operation S602), the media controller 1230 may disable the write error signal WRCRC. The media controller 1230 may map the storage space associated with the first command and address CA1 to the volatile memory device 1210 according to the second write request W2 in operation S602.

In operation S603, the media controller 1230 may transmit the third write request W3 to the volatile memory device 1210. The third write request W3 may be transmitted to the volatile memory device 1210 as the second command and address CA2 or the second control signal CTRL2. The volatile memory device 1210 may perform the write operation WR in response to the third write request W3.

Figure 69:
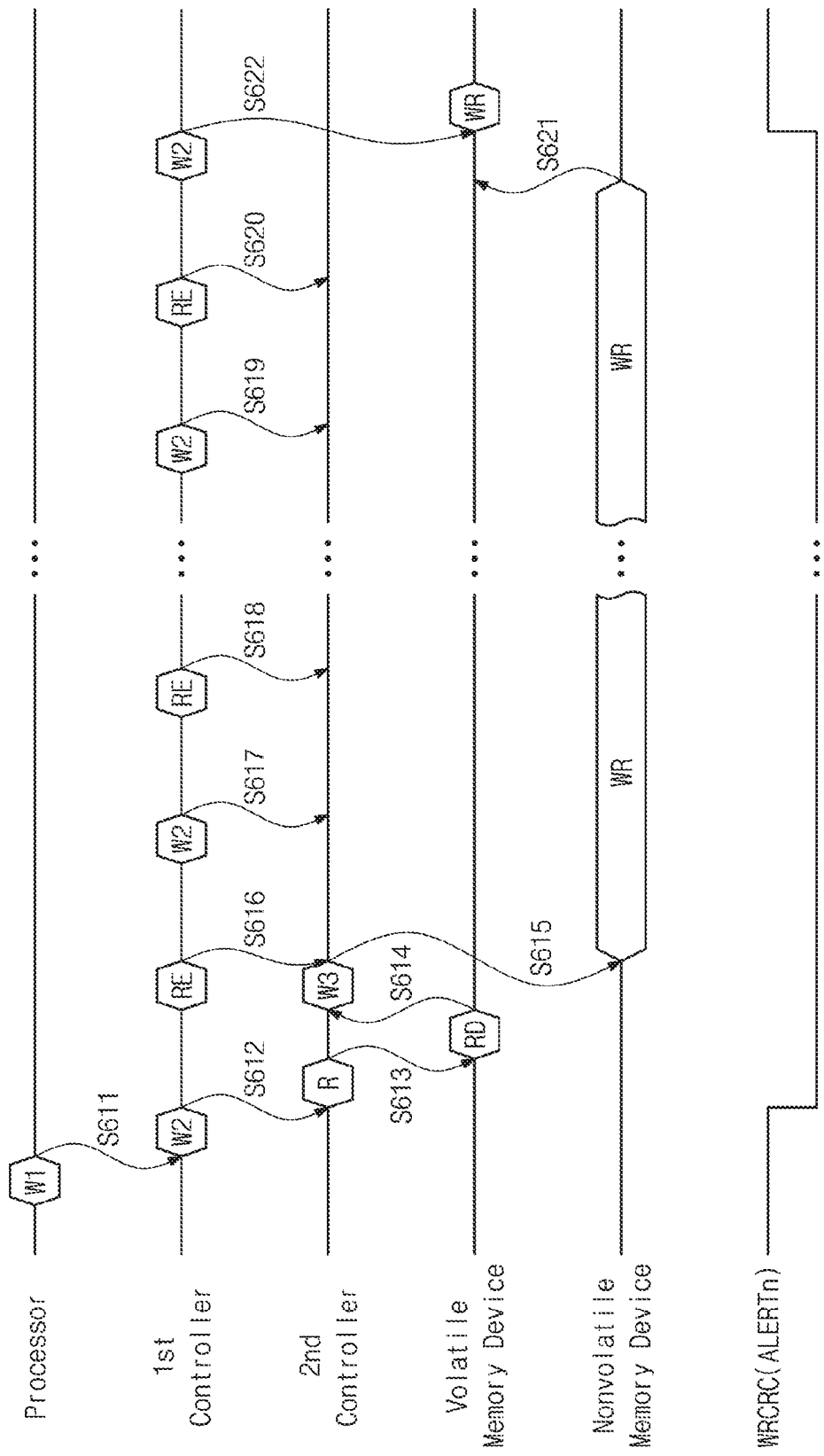
FIG. 69 is an example timing diagram for the write operation illustrated in FIG. 65 according to some embodiments of the present inventive concept.

FIG. 69 is an example for the read operation illustrated in FIG. 68. Referring to FIG. 26 or 40, FIG. 63, FIG. 66, and FIG. 69, since operation S611 to operation S62 correspond to operation S591 to operation S601 shown in FIG. 68, detailed description thereof will be omitted.

After the write operation WR is completed in the nonvolatile memory device 1220, in operation S622, the memory controller 530c may transmit the second write request W2 to the media controller 1230. The media controller 1230 may transmit the second write request W2 to the volatile memory device 1210 as the third write request W3.

Data transmitted from the memory controller 530c may be directly transmitted to the volatile memory device 1210 through the media controller 1230 and the first to eighth data buffers 1241 to 1248 without being controlled and buffered by the media controller 1230. Since LRDIMM is based on the dynamic random access memory (DRAM), the volatile memory device 1210 may communicate directly with the memory controller 530a.

Figure 70:
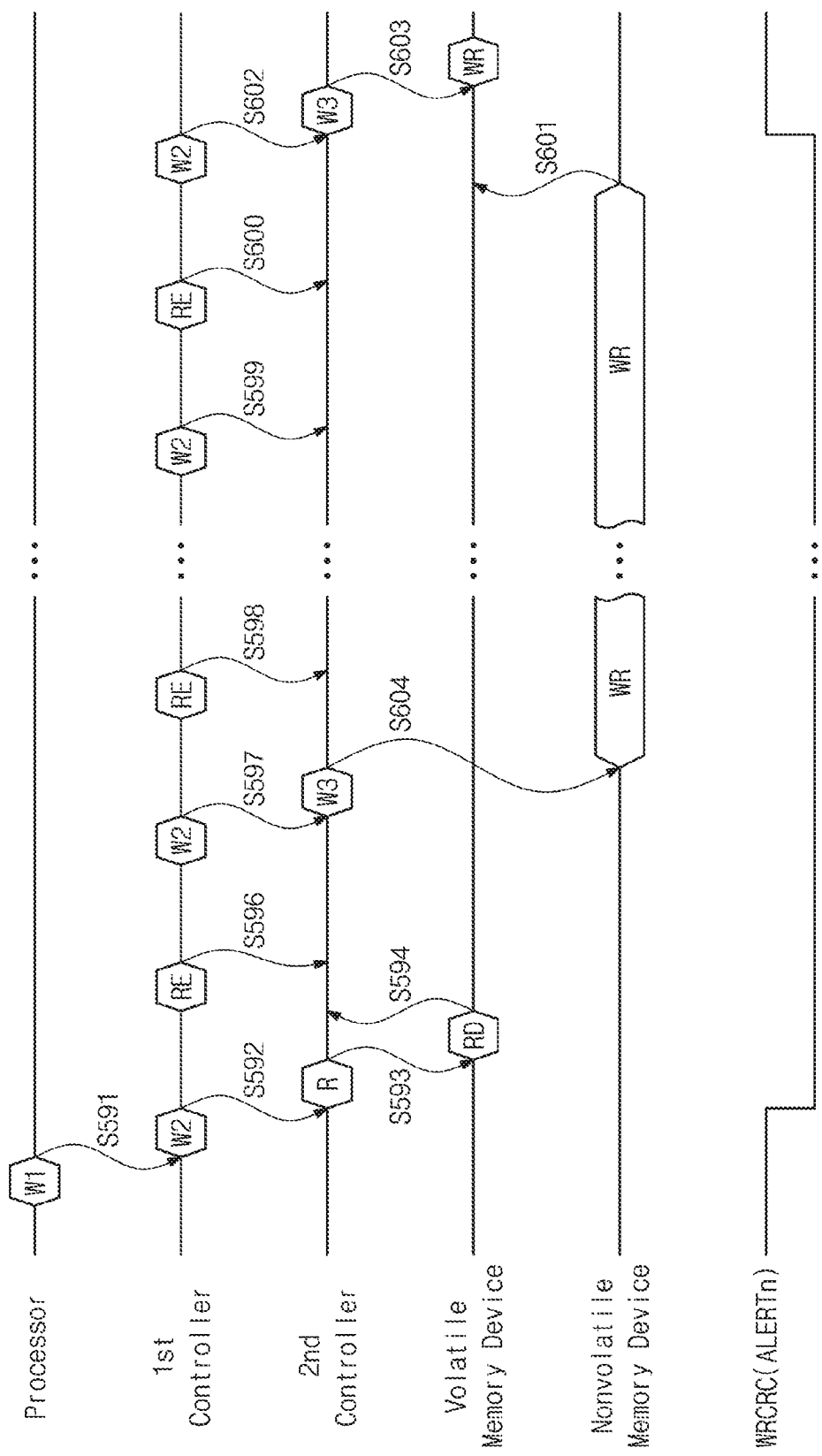
FIG. 70 is an example timing diagram for the write operation illustrated in FIG. 65 according to some embodiments of the present inventive concept.

FIG. 70 is an example for the read operation illustrated in FIG. 68. Referring to FIG. 26 or 40, FIG. 63, FIG. 66, and FIG. 70, the media controller 1230 may wait without transmitting the third write request W3 to the nonvolatile memory device 1220 when the read operation RD is completed. After the read operation RD is completed, in operation S597, the second write request W2 may be transmitted from the memory controller 530c. The media controller 1230 may transmit the third write request W3 to the nonvolatile memory device 1220 in response to the second write request W2 in operation S604.

In some embodiments, in FIG. 60 and FIG. 61, the media controller 1330 is described as including the SPD device 1331 and the register updater 1332. Also, in FIG. 63, the media controller 1230 is described as including the write error controller 543. However, it is not limited thereto, the media controller 1230 according to an exemplary embodiment of the inventive concept may include the SPD device 1331, the register updater 1332, and the write error controller 143.

The register updater 1332 may update the register 532 of the memory controller 530a, 530b, and 530c to perform the read retry without the limitation to the number of times. Additionally, the register updater 1332 may update the register 532 of the memory controller 530a, 530b, and 530c to perform the write retry without the limitation to the number of times.

The embodiments and the drawings described above according to the inventive concept may be combined each other. At least one embodiment among the embodiments or at least one drawing among FIG. 1 to FIG. 70 according to the inventive concept may be combined with another embodiment or another drawing to implement still another embodiment or drawing according to the inventive concept.

While the inventive concept has been particularly shown and described with reference to exemplary embodiments thereof, it will be understood by one of ordinary skill in the art that variations in form and detail may be made thereto without departing from the spirit and scope of the inventive concept as set forth by the following claims.

What is claimed is:

1. A semiconductor memory module, comprising:
   a random access memory;
   a nonvolatile memory;
   a buffer memory; and
   a controller configured to execute a reading operation on the buffer memory in response to an activation of a control signal,
   wherein the controller is further configured to execute a flush operation of storing first data, which are stored in the random access memory, in the nonvolatile memory, according to a result of the reading operation executed on the buffer memory.

2. The semiconductor memory module of claim 1, wherein, when writing the first data into the random access memory in accordance with a request from an external host device, the controller is further configured to store information of the first data in the buffer memory.

3. The semiconductor memory module of claim 2, wherein, during the reading operation, the controller is further configured to read the information from the buffer memory, and
   the first data are selected from data, which are stored in the random access memory, according to the information.

4. The semiconductor memory module of claim 3, wherein the controller is further configured to remove the information from the buffer memory, after storing the first data in the nonvolatile memory.

5. The semiconductor memory module of claim 1, wherein data stored in the random access memory further comprise second data, which are not written by an external host device, and
   the second data is not stored in the nonvolatile memory during the flush operation.

6. The semiconductor memory module of claim 1, wherein the random access memory is a cache memory of the nonvolatile memory.

7. The semiconductor memory module of claim 1, wherein the flush operation comprises a first operation, which is executed to read the first data stored in the random access memory and then to store the first data in the buffer memory.

8. The semiconductor memory module of claim 7, wherein the flush operation further comprises a second operation of writing second data, which are stored in the buffer memory, into the nonvolatile memory.

9. The semiconductor memory module of claim 8, wherein the controller is configured to execute the second operation prior to the first operation.

10. The semiconductor memory module of claim 7, wherein the controller is further configured to execute a background operation of writing second data, which are stored in the buffer memory, into the nonvolatile memory.

11. The semiconductor memory module of claim 7, wherein, when a free storage capacity of the random access memory is decreased below a threshold value, the controller is further configured to execute the flush operation.

12. The semiconductor memory module of claim 7, wherein the first data are a part of data stored in the random access memory.

13. A semiconductor memory module, comprising:
    a random access memory;
    a nonvolatile memory;
    a buffer memory; and
    a controller configured to execute a reading operation on the buffer memory and the random access memory, and to execute a flush operation of storing first data, which are read from the buffer memory, in the nonvolatile memory and of storing second data, which are read from the random access memory, in the buffer memory, in response to an activation of a control signal.

14. The semiconductor memory module of claim 13, wherein the controller is further configured to store the second data, which are stored in the buffer memory, in the nonvolatile memory, through a background operation.

15. The semiconductor memory module of claim 13, wherein the controller is further configured to read a write table from the buffer memory, in response to the activation of the control signal, and
    the second data are selected from data, which are stored in the random access memory, using the write table.

16. The semiconductor memory module of claim 15, wherein the write table contains information on data, which are written in the random access memory in accordance with a request from an external host device.

17. The semiconductor memory module of claim 15, wherein, when the flush operation is finished, the controller is further configured to initialize the write table.

18. A memory system, comprising:
    a semiconductor memory module including a random access memory, a nonvolatile memory, a buffer memory, and a controller; and
    a central control block configured to activate a control signal to be transmitted to the controller when an access error is detected during an attempt to access the semiconductor memory module,
    wherein the controller is configured to read first data, which are a part of data stored in the random access memory, and then to store the first data in the nonvolatile memory as second data, in response to an activation of the control signal,
    wherein the controller is further configured to store the first data, which are read from the random access memory, in the buffer memory as third data, and to store the third data, which are read from the buffer memory, in the nonvolatile memory as the second data, in response to the activation of the control signal.

19. The memory system of claim 18, wherein a write table is stored in the buffer memory,
    the first data are selected from the data, using the write table, and
    the controller is further configured to store information of write data, which are written in the random access memory in accordance with a request of the central control block, in the write table.

\* \* \* \* \*